US008001013B2

(12) United States Patent
Serbanescu

(10) Patent No.: US 8,001,013 B2
(45) Date of Patent: Aug. 16, 2011

(54) SYSTEM AND METHOD FOR ELECTRONIC COMMERCE AND OTHER USES

(76) Inventor: Razz Serbanescu, New York, NY (US)

( * ) Notice: Subject to any disclaimer, the term of this patent is extended or adjusted under 35 U.S.C. 154(b) by 848 days.

(21) Appl. No.: 11/958,567

(22) Filed: Dec. 18, 2007

(65) Prior Publication Data

US 2008/0154625 A1 Jun. 26, 2008

Related U.S. Application Data

(60) Provisional application No. 60/870,582, filed on Dec. 18, 2006, provisional application No. 60/938,079, filed on May 15, 2007.

(51) Int. Cl.
*G06Q 30/00* (2006.01)
(52) U.S. Cl. .................. 705/26.4; 705/27.1; 705/37
(58) Field of Classification Search .............. 705/26, 705/27, 37
See application file for complete search history.

(56) References Cited

U.S. PATENT DOCUMENTS

| | | | |
|---|---|---|---|
| 6,226,619 B1 | 5/2001 | Halperin et al. | |
| 6,246,778 B1 | 6/2001 | Moore | |
| 6,718,535 B1 | 4/2004 | Underwood | |
| 7,103,580 B1* | 9/2006 | Batachia et al. | 705/80 |
| 7,260,552 B2 | 8/2007 | Riera Jorba et al. | |
| 7,584,208 B2* | 9/2009 | Spivack et al. | 1/1 |
| 7,698,683 B1* | 4/2010 | Miller et al. | 717/104 |
| 2002/0161745 A1* | 10/2002 | Call | 707/1 |
| 2003/0212640 A1* | 11/2003 | Andresen et al. | 705/64 |
| 2004/0107125 A1 | 6/2004 | Guheen et al. | |
| 2004/0245332 A1* | 12/2004 | Silverbrook et al. | 235/380 |
| 2006/0230064 A1 | 10/2006 | Perkowski | |

OTHER PUBLICATIONS

Doyle et al.: "Auto-ID technology . . . ," Journal of Database Marketing & Customer Strategy Management, Apr. 2004, Proquest #674211971, 9pgs.*
Thiesse et al.: "An Overview of EPC Technology," Sensor Review, 2006, v26i2pg 101, Proquest #1036340471, 10pgs.*
Brock et al.: "An introduction to semantic modeling for logistical systems," Journal of Business Logistics, 2005, v26i2,pg97, Proquest #914824821, 19 pgs.*
Chang, Yoon et al. "Methodologies for Integrating Auto-ID Data with Existing Manufacturing Business Information Systems". White Paper published by the Institute for Manufacturing, University of Cambridge, Mill Lane, Cambridge, UK. Published Nov. 1, 2002.
International Search Report for International Application No. PCT/US07/87916 dated Jun. 2, 2008.

* cited by examiner

*Primary Examiner* — Robert M. Pond
(74) *Attorney, Agent, or Firm* — Greenberg Traurig, LLP

(57) ABSTRACT

A computer implemented method including steps of: storing, at a central server, an initialize business rule associated with a vendor and a DNS associated with the vendor; receiving, from a user a first user query for a product or service of the vendor; dynamically forming a universal code sequence forming a DNA field, having at least fields for a user identity, a transaction scope and a product definition; receiving, from the vendor a first vendor response based upon execution by the vendor of the initialize business rule; receiving, from the user a second user query; dynamically adding to the universal code sequence to form a request DNA; receiving from the vendor a second vendor response; dynamically forming an offer DNA; determining if the offer DNA matches the request DNA; and sending to the user and to the vendor a notification that the offer DNA matches the request DNA.

8 Claims, 30 Drawing Sheets

OFFER DNA ROBOT DETAILS

Dear Razz Van Serbanescu,
In order to obtain the contact information for the creator of this active Offer DNA Robot you will need to activate your own DNA Request Robot below.
This Offer DNA Robot was created on 9/14/2007 at 9:37:43PM Offer − Business to Consumer−Dell−Laptops−XPS M1710 Mobilize and Conquer− Processor Up to Intel CoreTM Duo Processor T2500 (2MB Cache/2GHz/667MHz FSB)− Memory Up to 2GB DDR2 SDRAM at 667MHz 2 DIMM− Display 17 inches Wide−Aspect UltraSharp TFT Active Matrix WUXGA (1920x1200) display with TrueLife− Hard Drive Up to 100GB 7200rpm SATA
Hard Drive− Optical DVD Burner Upgrade Included− Graphics 256MB NVIDIA GeForce Go 7900 Graphics Card− Battery 80 WHr 9−cell Lithium Ion Primary Battery

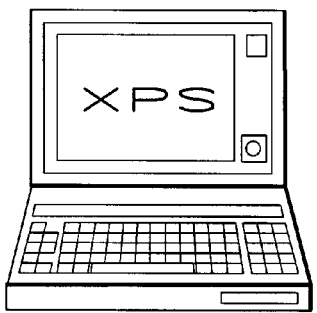

0723750010.2.211.1.1111111

Activate Instant DNA Request Robot

FIG.7 http://dev/bds/demo/RobotsWeb/0723750010.1.31.1.00100101060222090500.asp?sDNA=0723750010.1.31.1.00100101060222090_500&sUser_ID=0723750010

ACTIVE OFFER WEB ROBOT

My name is:
Razz Van Serbanescu
My email address is:
Razz@OneMany.com
My mobile phone number is:
0723750010
This offer Web Robot was created on 9/17/2007 12:15:12 AM Web Robot Scope:
Offer — Consumer to Consumer — Real Estate — Apartment —Country USA — City New York — Borough Manhattan — Street East 20 — Floor 6 — Bedrooms 2 — Bathrooms 2 — Balconies 2— Square meters 90 — Price $500K

FIG.12

User Name:

Razz Van Serbanescu

Select Category

******** DOUBLE-CLICK BELOW TO SELECT ***********
Hetero Singles
Gay Singles
Married Couples

FIG.17

User Name:

Razz Van Serbanescu

My Profile:

Preferred Hair Style

Values:

******** DOUBLE-CLICK BELOW TO SELECT ***********
I Love Blondes
Redneds are my Type
Brown hair is more Intriguing
Black hair means Excitment
Other

FIG.18

```
User Name:
┌─────────────────────────┐
│ Shakira                 │
└─────────────────────────┘

My Profile:
┌─────────────────────────┐
│ My Hair Style           │
└─────────────────────────┘
Values:
┌───────────────────────────────────────────────┐
│ *********** DOUBLE-CLICK BELOW TO SELECT ************ │
│ Blondes have more Fun                          │
│ Red and Wild                                   │
│┌─────────────────────────────────────────────┐│
││ Brown and unpredictable                     ││
│└─────────────────────────────────────────────┘│
│ Black like a Panther                           │
│ Other                                          │
└───────────────────────────────────────────────┘
```

FIG.19

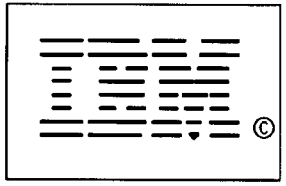

FIG.23

Offer Phone Number: 0723750010
Request Phone Number: 9999999999
Product or Service: Dell, XPS 600 Raw Power Unleashed from $1790
Click here to view details
FIG.20
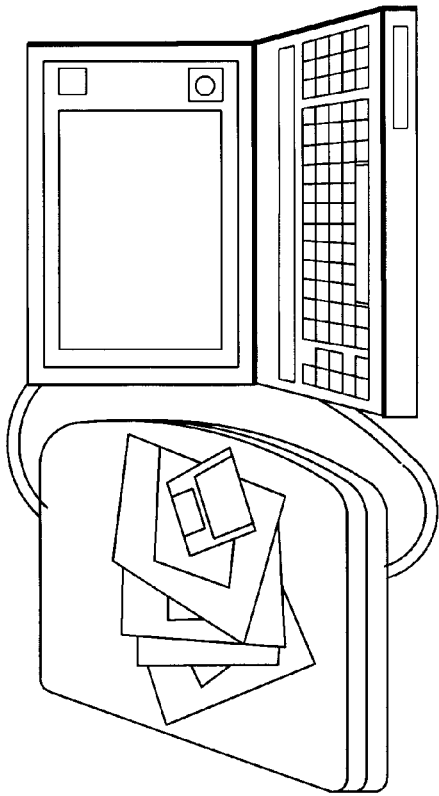
FIG.25
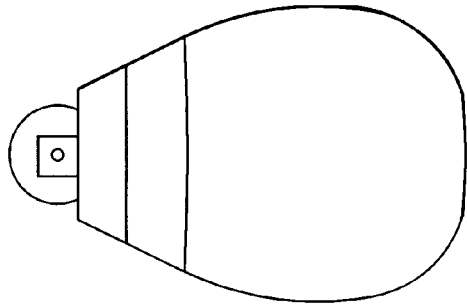
FIG.22

SYSTEM AND METHOD FOR ELECTRONIC COMMERCE AND OTHER USES

RELATED APPLICATIONS

This application claims the benefit of U.S. Provisional Application Ser. No. 60/870,582, filed Dec. 18, 2006 and U.S. Provisional Application Ser. No. 60/938,079, filed May 15, 2007. Each of the aforementioned applications is incorporated herein by reference in its entirety.

FIELD OF THE INVENTION

One embodiment of the present invention relates to a system for electronic commerce.

Another embodiment of the present invention relates to a method for electronic commerce.

For the purposes of describing the present invention, the term "robot" is intended to refer to a server, a process, executable software and/or computer-implementable instructions (e.g., in the form of an executable computer program and/or a set of web-page generation instructions). A robot may also comprise a server, a process, executable software and/or computer-implementable instructions extended with a mechanical device.

Of note, various embodiments of the present invention may be described in connection with a provider, architecture, service, system, apparatus, process and/or method sometimes identified herein as "OneMany" or "OM".

BACKGROUND OF THE INVENTION

The internet has been used for many purposes, including shopping, advertising and dating.

BRIEF DESCRIPTION OF THE DRAWINGS

FIGS. 6-23 show various application and use case concepts as may be applied in the context of various embodiments of the present invention;

FIGS. 24 and 25 show an example Offer/Request Prototype for Network Operator.

Figure 1:
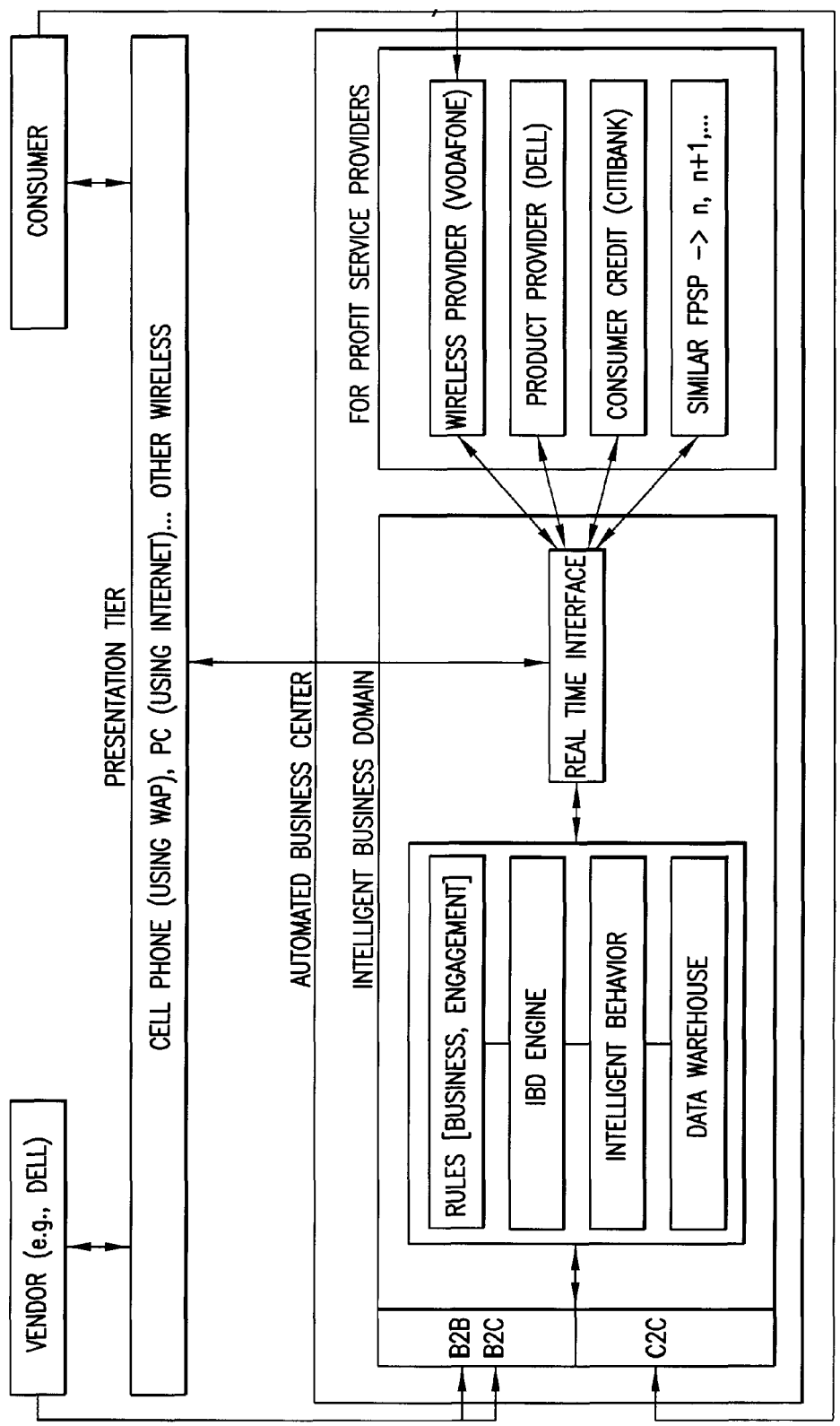
FIGS. 1-5 show various architecture concepts as may be applied in the context of various embodiments of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications, company names, trademarks, servicemarks, proper nouns, dates, locations, internet addresses, identifiers and the like discussed herein are intended to be illustrative, and not restrictive. Therefore, specific structural and functional details disclosed herein are not to be interpreted as limiting, but merely as a representative basis for teaching one skilled in the art to variously employ the present invention.

Reference will now be made to various concepts of semantic web, ontology, relations, and artificial intelligence fundamentals as may be applied in the context of various embodiments of the present invention:

Artificial Intelligence

The modern definition of artificial intelligence (or AI) is "the study and design of intelligent agents" where an intelligent agent is a system that perceives its environment and takes actions which maximizes its chances of success. OneMany DNA with Intelligent Behavior Settings; OneMany DNA Robots; Related Special Purpose functionality OneMany-resident, and Remote Vendor-resident.

The term artificial intelligence is also used to describe a property of machines or programs: the intelligence that the system demonstrates. Among the traits that researchers hope machines will exhibit are reasoning, knowledge, planning, learning, communication, perception and the ability to move and manipulate objects. General intelligence (or "strong AI") has not yet been achieved and is a long-term goal of AI research.

OneMany DNA: Temporal Dimension; Creator Identity; Transaction Scope; Transaction Type; Product Definition; Product Description; Intelligent Behavior Settings; Ability to Evolve through Interaction; Ability to drive the Behavior of a Digital or Mechanical Robot.

Ontologies: a theory about the nature of existence, of what types of things exist. Fundamental to OneMany is Ontology based on Taxonomy, Attributes, Relations, Metadata.

Among the things that AI needs to represent are: objects, properties, categories and relations between objects; situations, events, states and time; causes and effects; knowledge about knowledge (what we know about what other people know); and many other, less well researched domains. A complete representation of "what exists" is an ontology.

Ontology is the fundamental building block of OneMany methodology, and is directly related to the formation of OneMany DNA's and Pseudo NLT Objects.

Properties, Categories and Relations are used by OneMany to enable users to interact with the system and project well defined intentions for Offers or Requests for Products or Services. On a human-interaction level, this will result with the formulation of a structured Pseudo Natural Language Text projecting a power-summary representation of the Offer/Request for the Product or Service, while on the computer-internal level, this will result with an associated Offer/Request DNA with a logical structure, in microformat, enabling efficient and advanced functionality through interaction with other similar-format compatible structures within the scope predetermined by the user creator, and until the scope is realized, or for the duration of a predetermined time period, or until termination occurs.

Ontologies

In both computer science and information science, an ontology is a data model that represents a set of concepts within a domain and the relationships between those concepts. It is used to reason about the objects within that domain. Ontologies are used in artificial intelligence, the Semantic Web, software engineering, biomedical informatics and information architecture as a form of knowledge representation about the world or some part of it. Ontologies generally describe:

Individuals: The basic or "ground level" objects
    User-selection Option, associated Universal Code;
Classes: Sets, collections, or types of objects
    Taxonomy of Categories Defining a Product;
Attributes: Properties, features, characteristics, or parameters that objects can have and share Universal Codes associated with Individuals;
    Metadata Describing the Product;
Relations: Ways that objects can be related to one another
    "this" Individual determines the collection of next;
Events: The changing of attributes or relations
    Offer/Request DNA Robot interaction=>DNA Evolution.

Decision Trees
    A decision tree is a graph of choices and possible consequences.
    OneMany Categories Defining a Product, the associated Next Data Location Wormhole settings
    Rational choice has been held as a sign of intelligence.
    "This" Data selection will determine the next set of Data Options, Collective Intelligence
    Information seeking and insight through pattern recognition are closely linked with intelligence, innovation and success.
    OneMany Logical Fields, OneMany DNA, OneMany DNA Web page Robots, OneMany DNA IP.
    Tom Atlee feels that collective intelligence can be encouraged "to overcome 'grounthink' and individual cognitive bias in order to allow a collective to cooperate on one process—while achieving enhanced intellectual performance." CI pioneer, George Pór, defined the collective intelligence phenomenon as "the capacity of human communities to evolve towards higher order complexity and harmony, through such innovation mechanisms as differentiation and integration, competition and collaboration."[1] Tom Atlee and George Pór state that "collective intelligence also involves achieving a single focus of attention and standard of metrics which provide an appropriate threshold of action". In one embodiment of "Collective Intelligence", the User, OneMany, and the Vendor (e.g., Dell) will enable and participate in a collective intelligence process driven by some of the same goals. The consumer will want to obtain the lowest price for a Dell Laptop. The consumer can contribute to this event, but it cannot determine it on his own. The Vendor, Dell will want to offer—discriminately—a special price to some qualified consumers. However, Dell cannot determine the degree of eligibility for such an offer without at least some third-party information. OneMany will want to create the medium, and enable the functionality such that the Consumer and the Vendor will be able to accomplish their goals by being able to communicate and respectively process information such that Consumer can be certain that the Vendor has all that it needs to satisfy the Consumer's goal, and the Vendor will have the information it needs in order to process and decide based on merits as determined by the Vendor. OneMany will enable the Consumer to make its intention known, and to provide data (e.g., Identity) necessary for the Vendor's decision process. OneMany will also enable the Vendor through general or special purpose functionality to receive the critical information in an efficient and timely manner. The Vendor will have OneMany-compatible functionality that will be able to receive the critical information, and process it locally. Based on this information, the vendor will be able to decide on the merits that the Consumer will be offered a 20% discount as a result of being a $1^{st}$ time buyer with "this" Vendor. Vendor-local functionality will communicate this information to OneMany, which will in turn process and communicate to the Consumers enabling the environment for a transaction.

Accessibility
    Accessibility is the single most important variable governing the use of information. OneMany enables LCD methodology for Accessibility. User friendly, low learning curve. OneMany enables Vendors to modify their data in real time, while allowing other users to interact with the modified data in real time.
    What we find influences what we do. The first step is deciding to search, and the smallest of barriers will deter us.
    OneMany minimizes the time devoted to searching, enabling efficient, to the point no-nonsense results. OneMany enables functionality such that if "it" exists you will know immediately, if it doesn't exist yet, you will be made aware by OneMany as soon as it becomes available: Information will "look" for you.

Relationship Between the Volume of Information and Decision Quality
    When it comes to information, sometimes less is more=>inverted-U relationship between the volume of information and decision quality. Information overload harms concentration more than marijuana.
    OneMany enables Active Offers or Requests. All the information represented in OneMany is actively being Offered or Requested. DNA Offer/Request Robots, and the associated Pseudo NLT represent the power format for information processing and representation. Considering Ontology and Metadata Attributes as the fundamental block of OneMany Architecture, AND considering that through an intuitive process the User determines the specificity and the level of abstraction at which information becomes relevant to the User, AND considering the automated functionalities and Intelligent Behavior OneMany is able to associate with OneMany DNA Robots, it becomes justified to assume that OneMany fully considers the relationship between the volume of information and decision quality, and enables the medium and the methodologies for an efficient relationship.
    Barry Schwartz, the Paradox of Choice: 'Clinging tenaciously to all choices available to us contributes to bad decisions, to anxiety, stress, and dissatisfaction—even to clinical depression.'
    OneMany enables "Best Price" functionality such that you are guaranteed to receive an absolute best price from participating vendors custom-made for you in real time, in 5 minutes for example. At the end of the 5 minutes you will be convinced that "this" is the absolute best possible offer. You will not search anymore.
    We pay attention only to messages that find us.
    OneMany emphasizes functionality such that if "it" is being offered you will know about it immediately. Otherwise, the information will seek you as soon as "it" will be offered. This is enabled by DNA Robot functionality, Matching Rules, Pseudo NLT, DNA Web page Robot, SMS communication for instance.

Memory-Prediction Framework

The brain doesn't compute answers to problems; it retrieves the answers from the memory.

The neocortex stores hierarchical sequences of patterns in invariant form, and recalls those patterns auto-associatively. This lets us recall complete patterns when given only partial or distorted inputs. In one embodiment of the solution, OneMany enables "Stimulation" functionality, and the formation of "Stimulation DNA's". Consider the case when the OneMany Stimulation Engine will parse a text sentence within the scope of physical stimulation that is also displayed onto the user's cell phone screen. While a well defined text sentence may not project a clear Ontology with Categories in the proper hierarchical order, the OneMany Stimulation Engine will be able to identify the Categories composing the Ontology projected by the sentence, place them in their proper order where necessary, as well as the Metadata Describing "about" the stimulation. The Stimulation Engine will make use of Equivalence and Associative Relationships in realizing its goal. At the end of the task, you will have evolved a regular natural language text sentence into a Hierarchical Ontology composed of Related Categories in their proper order, including "aboutness" relevant to the stimulation in the Metadata Attributes. In turn, This Logical Stimulation Ontology with Metadata will have an associated Stimulation DNA composed by the Stimulation Engine, which in turn, can be parsed and interpreted to drive the behavior of a mechanical device.

Prediction is the foundation of intelligence!

Considering that a OneMany DNA is in most cases the dynamic projection of some of the following—User Identity, User Transaction Scope, Product Definition, Product Description—it becomes obvious how in addition to these fields, a OneMany DNA can also encapsulate settings for user-desirable behavior. That is, the user or the OneMany staff can determine that a number of related or non-related automated solutions to specific case scenarios can be helpful in improving efficiency, and minimizing unnecessary user-participation in handling different possible events as identified and predicted as potential. OneMany architecture will enable the programming of such solutions, resident within the OM IBD, and executable upon request by OneMany DNA Robots, due to OneMany DNA settings. The request for execution for such automated solutions can be set interactively by the user in the OneMany DNA, in effect adding a form of Prediction and Event Handling capabilities to the OneMany DNA Robot. Hence, upon the user's OneMany DNA triggering an event, or being involved in an event which has been predicted in advance, and for which there is automated functionality programmed, and which has an activation setting in the OneMany DNA—it can be concluded that "this" OneMany DNA Robot will have predicted in advance the possibility of the triggering event, and will be able to decide to execute a process to handle the event, without having to query the user for instructions.

We draw upon experience to make predictions. We use the past to see the future. Input begets output. Information shapes behavior.

Findability

The quality of being locatable or navigable;

OneMany Offer/Request DNA's have associated Pseudo NLT and Web page Robots. DNA Web page Robots especially, play a significant role in enabling OneMany DNA Offers/Requests to be locatable, navigable.

The degree to which a particular object is easy to discover or locate;

A simple Search will enable the user to obtain listings of active, relevant-to-search-criteria DNA Links/Semantic Links, which in turn will lead to DNA Web page Robots, at the least projecting the DNA Offer/Request.

The degree to which a system or environment supports navigation and retrieval.

Navigation in OneMany is fundamental to the solution, especially when considering the medium (e.g., cell phone). The construction of Offers/Requests relies on interactive communication/navigation, as does the procedure following successful Offer/Request DNA Robot matches/positive interactions, when users are provided DNA Semantic Links through SMS, enabling them to review DNA Web page Robots associated with the product being offered for example. OneMany also provides for a comprehensive retrieval of information through searching, review of a DNA Web page Robot, and instantiation of a User-Identity matching DNA Request Robot for example—all as a result of a OneMany enabled search-navigate-retrieve functionality with enhanced AI features.

Ambient Findability

Ambient findability describes a fast emerging world where we can find anyone or anything from anywhere at anytime.

OneMany architecture enables identical functionality whether using the Internet, or WAP, or a wireless device using a propriety platform. Furthermore, OneMany architecture is a industry-unifier. This means that a wireless device will be able to participate in the OneMany solutions whether using a WAP-enabled standard device, or a smartphone employing the Android Platform, further addressing the industry benchmark—"anything from anywhere at anytime".

In matters of findability, although our attention is drawn to the fast layers of hi-tech, the map to this maze is buried in the slow layers of human behavior and psychology.

Mobile devices will unite our data streams in an evolving dance of informed consumers seeking collective intelligence and inspiration.

OneMany emphasizes the ideal of participation, and data communication, making available volumes of intelligent behavior—OneMany local, and]or Vendor local, while enabling "all" remote data (Vendor or otherwise) to participate in the OneMany solutions in a manner such that the impression one would get, would be that the data was centralized, OneMany-resident, when in fact it is being served straight from the Vendor's location.

Artificial Intelligence, Digital Agents and Smart Services

Current Issue/Problem:

"Prophets claim that artificial intelligence will make it easy for us to find what we need, or better yet, for our digital agents and smart services to find us."

"Indeed, progress will come, but it won't come easy" (p. 14-15) "We will spend more time, rather than less, searching for what we need."

OneMany Offer/Request DNA Robots: OneMany enables the transformation of a well defined Product or Service into an Ontological truth related through Hierarchy, Relations, Definition and Metadata Description, projected through a logical common denominator format, the OneMany DNA. With additional dimensions, such as Time, Identity, Scope, Intelligent Behavior, to name a few, the OneMany DNA becomes the fundamental component of Artificial Intelligence and the ability to deliver smart services. The OneMany DNA Robots will be able to host OneMany DNA, and act on DNA intelligent settings. OneMany DNA Robots will minimize the need for user involvement, substituting predictable behavior through automation, and will provide the real potential to deliver intelligent functionality—OneMany resident and/or Vendor resident—bounded only by imagination and technical limitations.

The Medium is the Message

Information is ultimately about communication.

OneMany methodology, architecture enables the usage of the widest array of communication devices, ranging from PC, to cell phones, to any other type of wireless device capable of receiving simple text information, presenting options to the user, and sending user selection back to the OneMany Intelligent Business Domain. There will be situations where the cell phone will be the only link between the user and the Internet, and OneMany enables the same type of advanced functionality to be accessed with ease of use and efficiency through WAP using the cell phone, as it would be accessed through the Internet with the laptop at home. OneMany technology is an open standard, platform independent.

No Need for Information if Painful to Get

Sometimes, less is more.

OneMany Pseudo Natural Language Text: Power information in a well structured user friendly presentation.

Mooers' Law: Information will be used in direct proportion to how easy it is to obtain it.

OneMany emphasizes on the principle of "least effort, least cost, largest audience". OneMany innovation-edge solution enables the delivery of such a solution, where if the information exists you will be guaranteed to know, or the information will seek you as soon as it become available.

An information retrieval system will tend not to be used whenever it is more painful and troublesome for a customer to have information than for him not to have it.

OneMany is able to deliver "Semantic Link" functionality straight to your wireless device.

Make it simple, make it easy, don't make me think!

OneMany Pseudo NLT and DNA Web page Robots provide the best example of concentrated powerful information in a limited space, and the ability for advanced user-interactive functionality capable to deliver mission critical results.

Precision

Precision measures how well a system retrieves only the relevant documents. OM emphasis on Ontology, Relations, and Metadata Keywords/Attributes, as well as the direct relation between the OneMany DNA and Pseudo NLT—itself a projection of the Ontology/Metadata, and the primary content used for searching, and through the use of related OneMany DNA Web Page Robots, OneMany Active Offers/Requests for Products/Services will be locatable, and accessible with a high if not the highest degree of Precision. OneMany Architecture enables the realization of "highest" degree of Precision.

Recall

Recall measures how well a system retrieves all the relevant documents.

Note: Recall falls as collection increases in size.

OneMany employs Ontology, Metadata, and Associative Relationships in Defining and Describing a Product or Service. For OneMany Generic projections for Products/Services, Recall can be maximized as it is directly a function of the OneMany Ontology, Metadata, and the Associated Keywords/definitions.

Power Laws Description & Discrimination

In the context of retrieval, we might interpret these as the forces of description and discrimination. The force of description dictates that the intellectual content of documents should be described as completely as possible.

OneMany Pseudo NLT is a natural projection of Ontology, projecting the most relevant-to-scope description.

The force of discrimination dictates that documents should be distinguished from other documents in the system.

Each OneMany Pseudo NLT will have a Unique OneMany DNA associated with it, that within the scope of uniqueness, can be considered as a Universal Primary Key.

Hierarchical, Equivalence, Associative Relationships

Metadata tags can indicate aboutness thereby improving precision.

Metadata is a fundamental building block of OneMany solutions, and it is primarily visible in the Pseudo NLT associated with OneMany Offer/Request DNA's, based on which Searches are conducted and search results are made available.

The specifications of equivalence, hierarchical and associative relationships can enhance recall. Hierarchy is a fundamental building block of OneMany solutions, while associative relationships within the metadata can be determinant with respect to the degree of recall.

The Principle of Least Effort

Users are often willing to sacrifice information quality for accessibility.

OneMany enables access to highly advanced functionality through wireless devices such as cell phones. With least effort, a consumer can respond to an instant advertising promotion delivered through radio in the car pool to work, by simply executing a DNA Request as advertised, thus instantly creating a well defined request for a limited time offer for a special price on a product. This will enable additional user-friendly functionality between the consumer and the Vendor, possibly leading to a transaction—all through the cell phone, using a graphical interface where warranted, and no-nonsense well structured power-information—Pseudo NLT being an example of such "to-the-point" power-information.

Relentless migration to more accessible usable information system.

OneMany will deliver to the user functionality and accessibility such that the user will be drawn to make his/her wireless device the principle medium for engaging information, when time and efficiency are a priority.

Usability vs. Marketing

Useful—Define innovative solutions that are more useful.

OneMany enables a number of solutions, some of which bring special value especially because they bring innovation and enable advancement in real life business cases. The Solution "Best-Brice Comparison" provides for a unique functionality that will enable a shortest path to vendor efficiency, and consumer satisfaction. OneMany will enable the Vendor to play a reactive role—that is, the vendor should first become aware in real time of a User Best-Price Request, and the Product Specifics, and the vendor should have a User-decided timeframe during which time to project (or not) a Best-Price Offer to the User. Similarly, all other vendors who qualify to address the User's Request for "this" product should be informed of the Best-Price Request, have the time frame to respond with a Best-Price Offer. The User will be able to obtain in real time a Best-Price Offering, from all those Vendors qualified to make the Offer, and the User will know that, and not be concerned over the possibility that a Better Price may still be possible from another Vendor not participating. The User will be convinced that all those Vendors participating in one or the other Price Comparison solutions, will most likely participate in totality in the OneMany ABC.

Furthermore, and perhaps of most use to a vendor—OneMany Architecture provides for Unlimited Vendor Participation, and Unlimited Data Participation with little or no storage impact on OneMany. Moreover, the OneMany methodology allows for real time Vendor-data modification, and presentation to user.

Usable—Ease of use remains vital, however, usability is necessary but not sufficient. OneMany enables a number of venues for accessing OM functionality, solutions:

Internet based, WAP/wireless device. The user can engage in OM Request functionality by as simply as executing the OM DNA for a Vendor Offer advertised during a TV commercial.

Desirable

Findable—Design navigable web sites and locatable objects.

Accessible—Standard based design for accessibility also supports access via mobile devices. OneMany provides a unique design enabling the convergence of Internet and WAP, allowing for Internet-rich functionality to be accessible from the wireless device, regardless of the platform used by the device, or whether it is a smartphone, or a standard WAP-enabled device.

Credible

Valuable—Deliver value . . . Contribute to the bottom line & improve customer satisfaction.

In one embodiment of the solution OneMany enables business functionality unavailable yet. OneMany will enable GUI wireless voting functionality with the ability to host user-interactive advertisement. This is a quantum leap for the user experience with respect to user interface when considering that current methodology allows for SMS-only voting for voting events; It is a quantum leap for the event organizer, as OneMany methodology will enable the event organizer to control and determine in real time what the user is able to review/select with respect to the voting event; and it is a quantum leap for the Advertising industry as up to this point the advertising industry could not benefit from visual graphical interactive advertising associated to the current practice of SMS voting. OneMany Architecture will enable a WAP-based graphical user interface, accompanied by dynamic user-interactive advertisement.

Metadata ("Aboutness")

Descriptive information, accompanies, but it is not essential, to the data itself.

Metadata (keywords, attributes, description) are an essential component of Ontology, and OneMany solutions functionality, Architecture. Metadata is an essential component of OneMany Pseudo NLT.

Interwoven with hierarchy, and knowledge representation.

The Attributes data of an Ontology in OneMany are closely related to the "Describing" of at least one hierarchical Class (e.g., "Product Identifier"). The Metadata composing the Ontology, but especially the Attributes, provide a special insight, telling the computer how the data items are related, and how these relations can be evaluated automatically, a significant aspect of knowledge representation.

Taxonomies

Properties flow from class to subclass through the principle of inheritance. Each object and category is assigned a single location within the taxonomy: we live at an address, with a nested hierarchy of streets, cities, states, etc.

Taxonomy as part of Ontology enables functionality in the sense of "Controlled Vocabulary" in certain aspects. Faceted Classification can be observed resulting from OneMany Ontology where in addition to Taxonomy, and Relations, Attributes-Metadata further contribute to a wider range of classifications, functionalities, and solutions.

It is impossible to conceive intelligence without the parent-child relationship. Taxonomy is a fundamental aspect of OneMany Architecture, within this scope. There is a parent-child relationship between the Categories of the relationship presented to the user for property selection, and each node has at least one property set to the associated Universal Code, while another property associated with it, determining at least one next data location, thus Category. In traversing the nodes, the "current" user selection determines the next child-category of options to be presented to the user.

Disciplined Polyhierarchy

Allowing a limited set of objects and classes to be cross-listed in multiple categories. Disciplined Polyhierarchy can be observed in OneMany design when considering that certain classes such as "Countries" will be defined locally in OneMany, and may be cross-listed in a Vendor/Brand Ontology, or in a OneMany Generic Ontology.

Controlled Vocabularies

Develop controlled vocabularies to manage the ambiguity of language.

Controlled Vocabulary enable OneMany to insure Standardization, and a uniform participation by a large number of distinct, non-homogeneous participants. Controlled Vocabularies will also enable OneMany to apply the proper rules leading to the formation of Logical DNA. Controlled Vocabularies are the Taxonomy component of a OneMany well defined Ontology, with the associated Universal Codes.

OneMany Generic transactions will rely entirely on Generic Ontology and OneMany-determined Controlled Vocabularies. OneMany Brand Ontologies will rely at least in part on OneMany-developed Ontology. OneMany DNA's will be the logical common denominator projection which can also have a Pseudo NLT in any participating language, through the use of powerful Controlled Vocabularies.

Equivalence Relationships, Associative Relationships

Equivalence relationships are defined to handle synonyms (variant terms that are equivalent for the purposes of retrieval).

OneMany Metadata within the scope of Ontology enables the keyword/description of data, providing for the possibility of Equivalence Relationships.

Associative relationships are defined to support links that lead beyond hierarchy.

Classification Systems

Facilitate understanding;

Influence identity;

Claim authority;

Product taxonomies, brand architecture, and enterprise vocabularies are intimately connected to strategy and competitive advantage.

OneMany Architecture relies primarily on the concept of "Classification Systems" and Relations to enable the formation of DNA, associated Pseudo NLT, Robots, and Web Page Robots, allowing for a countless number of useful services and intelligent applications. Through the use of Generic Ontologies, and the enablement of Brand Ontologies, OneMany enables the Brand companies to maximize their audience and potential for transactions, when considering that one specific product can be offered through a range of projections, enabling the vendor to offer the same item under a Brand classification for its loyal brand customers, also as a Generic Best Price classification for those looking for the "deal" rather than the Brand, and as a 20% off special offer for the $1^{st}$ time buyer or the VIP customer, to name a few. OneMany employs the methodology, and enables the environment for such transactions Standardization: One Solution, Multiple Functionality Considering Ontology at the foundation of OneMany Business Model, Architecture—OneMany is able to project One Solution ⇔ Multiple Functionality:
1. Leads Generator
2. Social Networking
3. Instant Robot Functionality
4. Offer/Request Functionality
5. Wireless Voting (i.e., WAP-based)
6. Intelligent Automated Auction/Bidding
7. Searching: Internet/Mobile Homogenous
8. Mobile Marketing—Interactive, User-driven
9. Intelligent Automated Best Price Comparison
10. Graphical Interface, VR-like Functionality
11. Removable Media as OM ABC Data Warehouse
12. Consumer Product-Authenthentication Merging Internet and WAP Method and a system to allow a Vendor and a Consumer to engage in real time transactions through a unified interface, using either a PC and the Internet, or a Wireless Device such a cell phone under WAP.

OneMany Temporal DNA and Logical IP

OneMany enables the projection of 3D Time+User Identity+Product/Service Definition+Product/Service Description+Product/Service Identifier+Intelligent Behavior as a Logical IP in the OneMany ABC (Automated Business Center):

"0.1.0.1234567690.8.11.1.114.000.000"

A Product or a Service can be Defined through Categories, and Described with Attributes At a high level, the transaction will be defined by the explicit intention to Offer by a Vendor, or by the explicit intention to Request by a Consumer. Using OneMany methodology, the Product or Service Offered or Requested will be Defined and Described through Pseudo NLT (Natural Language Text).

Ontology

Each Product and Service can be Defined through an Ontology:

Brand-Category 1-Category 2- . . . -Category n

Each Ontology can also be Described:

Brand-Category 1-Category 2- . . . -Category n-Attribute 1-Attribute 2- . . . -Attribute n Each Ontology can have a Scope (Offer/Request):

Offer-Brand-Category 1-Category 2- . . . -Category n-Attribute 1-Attribute 2- . . . -Attribute n OneMany DNA Web Robot, Findability (Ambient)

Note the IP-like projection of a Product or a Service through a OneMany DNA such as 0723750010.1.211.1.1111111 Upon completing the Defining and Describing steps for a Product that is being Offered, the Vendor (e.g., Dell) will be enabled to upload media flies (images, videos) related to the Product it is Offering. The name of the web page in this example will be 0723750010.1.211.1.1111111.asp This will make the Product Searchable, Navigable, Locatable, and Accessible/Retrievable Unlimited Data Participation, Minimal Storage Impact The Vendor will be able to store its data that will be made available to consumers through the OneMany Intelligent Business Domain in its own Vendor-resident Data Domain.

Metadata, Hierarchy, Taxonomies, Relations

Vendor Data will be formatted using hierarchy, relations, keywords, and Universal Codes. A significant benefit to OM data formatting, is it's open-ended ability to further assimilate relations. Furthermore, OneMany will be able to support data formatted low-level text formatting such as:

|ATT:[Num_Of_Attributes=7][Attributes_Total_Num_Of_Digits=7]|
  1[Name=Processor][Values-Up to Intel Core™ Duo Processor T2500 (2 MB Cache/2 GHz/667 MHz FSB), Up to Intel Pentium M Processor 765 (2.10 GHz 2 MB Cache 400 MHz FSB) with Intel Centrino Mobile Technology, Up to Intel Dual Core Processor T2500 (2 GHz 2 MB Cache 667 MHz FSB) with Intel Centrino Mobile Technology, Up to Intel Pentium M 745 Processor (1.73 GHz 2 MB Cache 533 MHz),Others,][Units=String][UC_Order_In_String=1][UC_Length_In_Digits=1][Num_Of_Digits_Before_This_UC=0][UC_Range_Values=1-5]| . . . 7| . . . | as well as any other formatting such as XML, or other Vendor-suggested, for as long as the formatting can sustain automated processing, and enable the same level of functionality as OM's.

Consumers and other Vendors will be able to create Request-DNA's for Products and Services, and in effect virtually interact with a Vendor's Data through the OneMany Intelligent Business Domain.

OneMany DNA Interaction, SMS/Email Notification

In a most comprehensive embodiment, the Rule for engagement can be "Matching". In other enhanced implementations, engagement under "Evolution Rule with Wild Cards" can allow for "No Selection" options, along with special purpose options symbolized by Wild Card place holders, enabling automated functionality such as "Make me an Offer". In yet a more advanced implementation, in addition to the "Evolution Rule with Wild Cards", there is the "Artificial Intelligence Functionality".

Positive DNA interaction under Matching functionality will determine that compatible DNA's (Offer/Request) have satisfied each other's criteria. In such cases, at a minimum, User-Creators for the Offer/Request DNA's are notified through SMS and/or Email. An SMS notification can enable the User to review for example the DNA Web Robot for the other User(s) Creator. In more advanced functionality, a DNA Web Robot can entail a range of functionalities, such as Input to the wild card request "Make me an Offer", in effect enabling a perpetuation of automated interaction between the Offer/Request DNA Robots, shifting the burden of User-time-expenditure to the efficiency of automated functionality, in as much as automated functionality and Intelligent Behavior is enhanced and enabled by the Intelligent Business Domain, and the participating Vendor.

NOTE: It is very important to understand the added dimension of a Product DNA Web page Robot. Below is a high level outline of some of the functionalities and added benefits:

- A Web Robot will enable the Vendor to associate a visual power summary to its Offer projection for a Product/Service.
- A Web Robot will enable the Vendor to project a web-like presence for its Product along with most powerful and relevant keywords Defining and Describing the Product.
- A OneMany Web Robot will make the Product SEARCHABLE! There will be the cases when potential clients will not launch Requests for a Product. However, they may engage in Searches. OneMany Searching will enable powerful, no non-sense results.
- A OneMany Web Robot can enable the User to instantiate a DNA Request Robot just by clicking on a link or on a button!
- OneMany Web Robots will project ONLY Active Offers/Requests! This will make OneMany Web Robots the most Dynamic, living "entities" on the web.
- A OneMany Web Robot can have Intelligent Behavior associated with it—this a function of User DNA creation.

A founding block of Artificial Intelligence as it relates to the Internet, is the principle of "Findability". OneMany Offer/Request DNA Web page Robots satisfy the following components of Findability:

The quality of being locatable or navigable;

The degree of ease for a Product/Service can be discovered/located,

The degree to which the environment supports navigation;

The degree to which the environment supports retrieval.

NOTE: OneMany Web Robots is just one of the solutions-implementation where the Intelligent, Semantic Web characteristics apply with a high degree of value.

OneMany will give you the possibility to project a product or a service to a multi-functionality common denominator form (a OneMany DNA such as 0723750010.1.211.1.1111111), where it can interact with other products/services. In the simplest form, at a minimum you can have matching capabilities. In more advanced embodiments, there can be a range of functionalities, utilizing advanced Business Rules, wild cards, 3-D time, intelligent behavior, user-vendor interaction at multiple stages.

Reference will now be made to various concepts of data structures and access (categories, relations, hierarchy, metadata and data "wormholes") as may be applied in the context of various embodiments of the present invention:

Sample Data Logical Representation

OneMany Intelligent Business Domain, Data Store

Table Transaction Type
1. Offer
2. Request

Table Offer
1. B2B
2. B2C
3. C2C

Table B2C
1. Products
2. Services

Table Products
1. Consumer Electronics
2. Automotive

Table Consumer Electronics
1. Computers
2. TV

Table Computers
1 Generic
2 Dell
3 IBM

Local OneMany Initialize WormHole setting for Dell:
|DNS=Dell|NDL=GetNextData|ATT=DNA|

Dell Computers, Data Store

Table Dell
1. Laptops
2. Desktops

Table Laptops
1. XPS1
2. XPS2

Table XPS1
1. AttributeName1
2. AttributeName2
3. AttributeName3

OneMany Categories, Relations and Unlimited Data Participation

Participating Vendor Data in the OneMany solution will reside at the Vendor's location (unless otherwise directed).

Participating Data will be formatted in such a way, that each Data-selection by a Consumer accessing the OneMany service, will have a DNS, and NDL associated with the selection, that will instruct OneMany "Where: Connection String, Credentials" (DNS) to get the next set of Data-options from, and "How: Business Rules/Stored Procedure" (NDL) to get it.

This is where the principle of OneMany "Wormholes" becomes evident. In Physics, the shortest path between two points is a straight line. In Computer Science, Data structures and Algorithms, the shortest path between you and the data that you are interested in is a function of data structures various data storage techniques and search/data retrieval algorithms for getting your data in the shortest possible time. In most cases, data retrieval is still a function of how your data is stored (e.g., Hash Tables), and perhaps the search/data retrieval algorithm (e.g., Hashing). The principal of "Wormholes" in theoretical Physics enables to eliminate the space-time limitations, and be able to get from point A to point B almost instantaneously—in a fraction of the time otherwise required if the laws of Physics and the speed of light were observed. Similarly, OneMany will enable data retrieval in a fraction of the time that would otherwise make the process inefficient. The key elements in this solution is the user and the data. The user will have to know what he wants from the already available set of data options. Each data option will have to "know" exactly where and how to retrieve the next set of data options directly related to "itself".

One example of Relation employed by OneMany is such that If Categories A, B, C are presented for selection through the OneMany Intelligent Business Domain, and if Category A directly determines Category B, and Category B directly determines Category C, then Category A can determine only Category B. More specifically, Data Option "Dell Computers" will determine/imply sub-category options "Desktops, Laptops, Servers", and Data Option "Laptops" will imply/determine sub-category options "Latitude, Inspiron". Therefore, Data Option "Dell Computers" can only determine sub-category "Desktops, Laptops, Servers" and NOT "Latitude, Inspiron".

The Categories and Relations are determined by those concerned "most". In order to enable the desired functionality, the OneMany Intelligent Business Domain will be responsible, therefore concerned "most" to determine the top-most Categories and the hierarchy/relations between them. Vendors participating in the OneMany Automated Business Center, and therefore "servers" of Data will also be responsible, therefore the "next" concerned "most" to determine Categories and the hierarchy/relations between them, with respect to defining and describing the Products or services they are offering through the OneMany Intelligent Business Domain.

There will be cases when the entire set of Categories, Hierarchy, Relations will be determined by the OneMany IBD (e.g., Generic Ontology). There will be cases when the top-most level of Categories, Hierarchy, Relations is determined/defined/implied by OneMany, while the final set of the Categories, Hierarchy, Relations is determined by the participating Vendor.

As a rule, the Vendor's top-most Category (e.g., "Dell") is hosted, and served from to the User for selection, from the OneMany Intelligent Business Domain.

As a rule "this" data option will be the link to the next set of directly related data, and will "know" where and how to retrieve the next set of data options directly related to itself.

This will be accomplished by having DNS (e.g., Connection string, database credentials) and NDL (e.g., Store Procedure name) associated with it at the OneMany Intelligent Business Domain.

In one embodiment of the solution, the Vendor will have defined one constant DNS and one constant NDL for the entire process of user projecting a request for its product. That is, the same Connection string will be used, and the same Vendor-resident procedure will be invoked to return the "next" set of data. As an example consider that the Vendor Dell has defined a DNA for the entire process of creating a product request, and set the Dell-local parameter stored procedure name "GetNextData" to the initialize NDL, which will be invoked for the duration of the process. As a rule, each time it is invoked it will receive a parameter—the "current" user-selection.

Sample Data Access Using Data Wormholes and Simple Logical Format

Sample OneMany Intelligent Business Domain Event Handler
1. INITIALIZE_TRANSACTION_SCOPE
2. INITIALIZE_B2BB2CC2CPFS_SCOPE
3. GET_PRESENT_REGISTERED_VENDORS
4. GET_PRESENT_SELECTEDPROVIDER_CATEGORIES
5. DO_UNTIL_PRODUCTORSERVICE_CATEGORIES_COMPLETE
6. END_DEFINING_START_DESCRIBING
7. DO_UNTIL_ATTRIBUTES_EOF
8. INSERT_DNA_IN_IBD_ROBOT
9. ACTIVATE_DNA_ROBOT OneMany Intelligent Business Domain, Data Store
[ . . . ]
Table Computers
1. Generic
2. Dell
3. IBM OneMany IBD will present the User with Data options "Generic, Dell, IBM" with associated Universal Codes "1, 2, 3".

User will select "Dell".

OneMany IBD will receive user selection "Dell" along with associated Universal Code "2".

OneMany IBD will use DNS Connection string for Dell, and invoke NDL Parameter Stored Procedure "GetNextData" (vendor-local) with parameter "Dell" (through web services/SOA for example)

Dell Computers, Data Store
Table Dell
1. Laptops
2. Desktops

"GetNextData" stored procedure is executed with parameter "Dell" (as invoked by OneMany IBD)

Data options "Laptops, Desktops" along with associated Universal Codes "1, 2" (in this example) are returned to OneMany IBD.

OneMany IBD will present the User with Data options "Laptops, Desktops" with associated Universal Codes "1, 2".

User will select "Laptops".

OneMany IBD will receive user selection "Laptops" along with associated Universal Code "1".

OneMany IBD will use DNS Connection string for Dell, and invoke NDL Parameter Stored Procedure "GetNextData" (vendor-local) with parameter "Laptops" (through web services/SOA for example)

Table Laptops
1. XPS1
2. XPS2

"GetNextData" stored procedure is executed with parameter "Laptops" (as invoked by OneMany IBD)=

Data options "XPS1, XPS2" along with associated Universal Codes "1, 2" (in this example) are returned to OneMany IBD.

OneMany IBD will present the User with Data options "XPS1, XPS2" with associated Universal Codes "1, 2".

User will select "XPS1",

OneMany IBD will receive user selection "XPS1" along with associated Universal Code "1".

OneMany IBD will use DNS Connection string for Dell, and invoke ATT Parameter Stored Procedure "GetAttributesData" (vendor-local) with parameter "XPS1" (through web services/SOA for example) NOTE: Through an internal mechanism, OneMany IBD will "know" when the Categories Defining the Product/Service have been completed, and the "Describing" through Attributes should start.

Table XPS1
1 AttributeName1
2 AttributeName2
3 AttributeName3

NOTE: The projection of a Request for a Product or Service is done through Defining and Describing the Product, and projecting the Definition and Description through the OneMany DNA. The Definition will take place through Hierarchical Related Categories, while the Description will be done through Metadata Attributes, which most often than not will not have a hierarchical relation between one or the other.

The Metadata composing these Attributes will be the Name of the Attribute. The Description of the Product will be projected through the possible values that can be set to a Metadata identifier, and presented for selection by the User. Below is an example of a Metadata Identifier "Processor" with a set of comma-separated set of potential values that can be set to the description of the product by the user:

[Name=Processor]
[Values=Up to Intel Core™ Duo Processor T2500 (2 MB Cache/2 GHz/667 MHz FSB),Up to Intel Pentium M Processor 765 (2.10 GHz 2 MB Cache 400 MHz FSB) with Intel Centrino Mobile Technology, Up to Intel Dual Core Processor T2500 (2 GHz 2 MB Cache 667 MHz FSB) with Intel Centrino Mobile Technology, Up to Intel Pentium M 745 Processor (1.73 GHz 2 MB Cache 533 MHz),Others,]

In one embodiment of the solution, the OneMany IBD can loop through the XPS1 Attributes Table, presenting to the User the Metadata Identifier and the associated option-values one by one, by utilizing the Dell DNS, and recalling the ATT (which has assigned to it the name of the Parameter Stored Procedure "GetAttributesData", until all Metadata has been set, in as far as the user wants to.

Table XPS1
1 AttributeName1
2 AttributeName2
3 AttributeName3

"GetAttributesData" stored procedure is executed with parameter "XPS1" (as invoked by OneMany IBD)

Metadata Identifier "AttributeName1" along with the option values assigned to it, along with the associated Universal Codes, along with other relevant information (as it will become apparent in the next section) are returned to OneMany IBD.

OneMany IBD will present the User with Metadata Identifier "AttributeName1, along with the Data options set as possible vales for "this" Metadata descriptor, along with the associated UC's User will select an option.

OneMany IBD will receive user selection option along with associated Universal Code.

OneMany IBD will use DNS Connection string for Dell, and invoke AU Parameter Stored Procedure "GetAttributesData" (vendor-local) with parameter "XPS1, AttributeName1" (through web services/SOA for example)

Sample OneMany "WormHole" Settings

|DNS=Dell|NDL=Initialize_Laptops_Request|ATT=DNA|
|DNS=Dell|NDL=DNA|ATT=Get_Attributes|

OneMany "Wormhole", as it Applies to Data Storage, Data Access

Participating Vendor/Consumer Data in the OneMany solution will reside at the Vendor's location (unless otherwise directed).

Participating Data will be formatted in such a way, that each Data-selection by a User_Agent accessing the OneMany service, will have a DNS Connection definition, as DNS is defined by OneMany that will instruct OneMany "Where" to get the next set of Data-options from, and an NDL associated with the selection that will instruct OneMany and "How" to get the next set of data.

This is where the principle of OneMany "Wormholes" becomes evident: A Product/Service is Defined by Categories, Subcategories. Each Category or Subcategory will determine another set (one or more) of Subcategories. Each Category or Subcategory will have associated with it directly or by association the data location and access information of the Subcategories that it implies or is associated with through a predefined relationship, and "How" to "Get" this Data.

The name of a Stored Procedure can for example be set to NDL, such that in the next State, the Process will "go" to a Specified Data Location, Access the Database, and Execute the Specified Stored Procedure. The Data returned by the Stored Procedure will be consumed/parsed by OneMany, which will present this Data to the User_Agent in the form of set of Text-Options. Upon the User_Agent executing a selection, the procedure will repeat.

This enables the OneMany Solution to offer a New Business Model/Solution where there can be Unlimited Data Participation with limited impact on Data Storage. It also enables OneMany to host ONLY Active Offers/Requests, as each Active Offer/Request represents the explicit, and specific interest of a User_Agent.

With respect to Attributes, which "Describe" a Product/Service, most often there is no "Sequential" relationship between the Attributes. More specifically, one Attribute will not imply/determine the next set of Attributes, as is the case with Product/Service Categories, which "Define" the Product/Service. Consequently, when the User_Agent interaction moves to "Attributes", the entire set of Attributes-Data can be copied and reside temporarily in the OneMany Domain. The User_Agent will complete the Offer/Request DNA, with the Vendor-Attributes being served from OneMany. However, this is not required, and depending on the Vendor option, the Product/Service Attributes Data can also be served from the Vendor's Data Location, Consider the following projection of how Vendor Data is resident at the Vendor Data Location, and is available for consumption by the user through the OneMany Intelligent Business Domain, using OneMany Wormhole methodology:

NOTE: In the Data Logical Representation in the following example, the formatting is such that each selection option will have associated with it a Universal Code, and a WormHole setting. The type of Logical representation, and the complexity of having a distinct WormHole setting for each possible Option, or the simplicity of having one WormHole setting resident at the OneMany Central Server as in the previous section, utilizing one constant DNS setting, and one NDL setting with varying parameters for most possible selection-cycles, is determined by the needs of the Remote Vendor.

A Vendor is registered with the OneMany Intelligent Business Domain.

A Vendor will have an initialize DNS (e.g., DNS="Dell") registered with the OneMany Intelligent Business Domain, The Vendor will have an initialize NDL Rule (e.g., Stored Procedure name: NDL=Initialize_B2C_Request) registered with the OneMany IBD.

In the table below there is data available locally from the OneMany Intelligent Business Domain:

TABLE 1

| | | ServiceProviders | |
|---|---|---|---|
| CID | Category | OptionsAndUCs | NDL |
| 3 | B2CServiceProviders | 2*Dell*1*Hewlette Packard*2* | 2*1*|DNS=Dell|NDL=Initialize_B2C_Request|ATT=DNA|* 2*|DNS=HP|NDL=Initialize_HPB2C_Request|ATT=DNA|* |

As a participant in the OneMany Automated Business Center, the Vendor will also have its top-level Category Data in Natural Language Text for presentation to and selection by the Consumer: "Dell", with the associated Universal Code invisible to the User: "1" for example.

Upon request, the OneMany Intelligent Business Domain will present the Options-data to the consumer for selection.

The Consumer will be able to select the Vendor (e.g., Dell) from the OneMany Presentation Layer (e.g., his cell phone).

Subsequently, the Consumer will be able to project a well defined "Request" by selecting specific Options in successive steps, through the OneMany Intelligent Business Domain.

Each Option will have at least some or all of the following:
A Natural Language Text Description (e.g., "Laptops");
An associated Universal Code (e.g., "1");
An associated OneMany Wormhole setting enabling the "Next Data Location" and the next set of "Data":
|DNS=Dell|NDL=Initialize_Laptops_Request|ATT=DNA|)

The table below projects data available from a Vendor's Data Store, for example:

TABLE 2

| | | Categories | |
| --- | --- | --- | --- |
| CID | Category | OptionsAndUCs | NDL |
| 2 | B2C | 1*Laptops*1* | 1*1*|DNS=Dell|NDL=Initialize_Laptops_Request|ATT=DNA|* |

In the table above, the OneMany Wormhole setting for the selection "Laptops" is:
"|DNS=Dell|NDL=Initialize_Laptops Request|ATT=DNA|"

The OneMany Wormhole setting "|DNS=Dell|NDL=Initialize Laptops Request|ATT=DNA|" will provide the Strong Identity for the Next Data Location—the DNS setting for the next set of Data (in this example, the DNS is set to the name of "Dell" which is defined locally in OneMany Intelligent Business Domain when Dell first registers with the OneMany IBD (Intelligent Business Domain).

The OneMany Wormhole setting "|DNS=Dell|NDL=Initialize Laptops Request|ATT=DNA|" will also provide the Defining Rule for the Next Data Location—the NDL setting (e.g., Stored Procedure/Business Rule) that will be applied to get the next set of Data (in this example NDL is set to the name of a Stored Procedure defined in the Vendor's Database).

The OneMany Wormhole setting "|DNS=Dell|NDL=Initialize Laptops Request|ATT-DNA|" associated to the option "Laptops" will also provide the Describing Rule for the Next Data Location—the ATT setting (e.g., Stored Procedure/Business Rule) that will be applied at the proper time to get the Attributes for "this" Product (when ATT is set to "DNA"-"Does Not Apply", the Product is still being defined, executing only the NDL setting").

In one embodiment, when the User is at the last Category in Defining the Product through the selection of hierarchical related Categories, he/she will be faced with the selection of a "Product Identifier" (e.g., "XPS M1710 Mobilize and Conquer") as the last Defining characteristic before "Describing" can start. The associated OneMany Wormhole setting "|DNS=Dell_OneMany|NDL=Maintain_State_On_Server|ATT=XPS_M1710_Mobilize_and_Conquer|"will have "AT" set to the Stored Procedure XPS_M1710_Mobilize_and_Conquer.

This is data available from the vendor's Data Store, for example:

That is, when the User selects the Product Identifier "XPS_M1710_Mobilize_and_Conquer" the NEXT set of Data that will be presented to the User for consumption will be the Attributes Describing "this" product, using the Stored Procedure "XPS_M1710_Mobilize_and_Conquer":

In this example, "NDL" will is set to "Maintain_State_On_Server". This will tell the OneMany Intelligent Business Domain to use the ATT Rule (e.g., a specific Stored Procedure) and get the entire set of Attributes that can apply to "this" Product (e.g., "XPS M1710 Mobilize and Conque"), for the next set of selections that will be presented to the User.

Notice the DNS setting to "Dell_OneMany". In one embodiment of the solution, Dell_OneMany is the DNS reference to the connection string that will be used to access the table within the OneMany local data store that will be used to temporarily store the Attributes Data as exemplified in the table below, and serve the Attributes to the consumer, until the consumer finishes selecting/setting the Attributes. Then they can be discarded from OneMany temporary storage.

Please note, the Attributes need not be temporarily stored in the OneMany Domain, as the Attributes can be served from the Vendor's location as well. There can be pro's and cons that can apply differently from case to case, making one of these options the most efficient choice, varying from Vendor to Vendor.

Consider the Sample Attributes Data below in Logical Text Format (exportable to XML/XSL for example). This is an example of "Attributes" Data "Describing" the Product. This Attributes Data can be served to the User through OneMany directly from The Vendor's Data Store location, or it can be stored temporarily in the OneMany Data Domain, and discarded after the User is done selecting from it.

TABLE 3

| | | | Products | |
| --- | --- | --- | --- | --- |
| CID | Category | Product | OptionsAndUCs | NDL |
| 1 | B2C | Laptops | 4*XPS M1710 Mobilize and Conquer*1*Product Identifier | 4*1*|DNS=Dell_OneMany|NDL=Maintain_State_On_Server|ATT=XPS_M1710_Mobilize_and_Conquer|* |
| | | | | 2*|DNS=Dell_OneMany|NDL=Maintain_State_On_Server|ATT=Product Identifier |
| | | | 2*2*Product Identifier | 2|*3*|DNS=Dell_OneMany|NDL=Maintain_State_On_Server|ATT=Product Identifier |
| | | | 3*3*Product Identifier 4*4* | 3|*4*|DNS=Dell_OneMany|NDL=Maintain_State_On_Server|ATT=Product Identifier 4|* |

TABLE 4

| CID | Product | ProductIdentifier | Attributes |
|---|---|---|---|
| 1 | Laptops | XPS M1710 Mobilize and Conquer | \|ATT:[Num_Of_Attributes=7][Attributes_Total_Num_Of_Digits=7]\|1[Name=Processor][Values=Up to Intel CoreTM Duo Processor T2500 (2MB Cache/2GHz/667MHz FSB),Up to Intel Pentium M Processor 765 (2.10 GHz 2MBCache 400 MHz FSB) with Intel Centrino Mobile Technology,Up to Intel Dual Core Processor T2500 (2GHZ 2MB Cache 667MHz FSB) with Intel Centrino Mobile Technology,Up to Intel Pentium M 745 Processor (1.73GHz 2MB Cache 533 MHz),Others,][Units=String][UC_Order_In_String=1][UC_Length_In_Digits=1][Num_Of_Digits_Before_This_UC=0][UC_Range_Values=1-5]\|2[Name=Memory][Values=Up to 2GB DDR2 SDRAM at 667MHz 2 DIMM,1GB shared DDR2 SDRAM standard Memory upgradable to 2GB,512MB shared DDR2 SDRAM standard memory upgradable to 2GB,256MB Shared DDR SDRAM standard upgradable to 1 GB,Others,][Units=String][UC_Order_In_String=2][UC_Length_In_Digits=1][Num_Of_Digits_Before_This_UC=1][UC_Range_Values=1-5]\|3[Name=Display][Values=17 inches Wide-Aspect UltraSharp TFT Active Matrix WUXGA (1920×1200) display with TrueLife,12.1 inches Wide Screen XGA display with TrueLife,17 inches Wide Screen display up to an UltraSharp WUXGA resolution with TrueLife,Up to 15.4 inches Wide Screen WSXGA+ Display with TrueLife,Others,][Units=String][UC_Order_In_String=3][UC_Length_In_Digits=1][Num_Of_Digits_Before_This_UC=2][UC_Range_Values=1-5]\|4[Name=Hard drive][Values=Up to 100GB 7200rpm SATA Hard Drive,Up to 80 GB Ultra ATA hard drive,Up to 120 GB Ultra ATA hard drive,40GB Ultra ATA hard drive,Others,][Units=String][UC_Order_In_String=4][UC_Length_In_Digits=1][Num_Of_Digits_Before_This_UC=3][UC_Range_Values=1-5]\|5[Name=Optical][Values=DVD Burner Upgrade Included,8x CD/DVD burner (DVD+/-RW) with double-layer DVD+R write capability,24x DVD/CD-RW Drive,24x/10x/24x CD-RW and 8x DVD-ROM,Others,][Units=String][UC_Order_In_String=5][UC_Length_In_Digits=1][Num_Of_Digits_Before_This_UC=4][UC_Range_Values=1-5]\|6[Name=Graphics][Values=256MB NVIDIA GeForce Go 7900 Graphics Card,Intel Extreme Graphics,Up to 256MB ATI MOBILITY RADEON X1400 HyperMemory,Intel Graphics Media Accelerator 950 (with up to 256MB of shared memory),Others,][Units=String][UC_Order_In_String=6][UC_Length_In_Digits=1][Num_Of_Digits_Before_This_UC=5][UC_Range_Values=1-5]\|7[Name=Battery][Values=80 WHr 9-cell Lithium Ion Primary Battery,4 cell (32Whr) Smart Lithium Ion battery,Up to 9-cell Lithium Ion Primary Battery (80 WHr),4-Cell LiIon (29Whr),Others,][Units=String][UC_Order_In_String=7][UC_Length_In_Digits=1][Num_Of_Digits_Before_This_UC=6][UC_Range_Values=1-5]\| |

The following are reserved-words with special purpose functionality when formatting Attributes Data for a Product/Service:

|ATT:[Num_Of_Attributes=7][Attributes_Total_Num_Of_Digits=7]1[Name=Processor][Values=Up to Intel Core™ Duo Processor T2500 (2 MB Cache/2 GHz/667M Hz FSB), Up to Intel Pentium M Processor 765 (2.10 GHz 2 MB Cache 400 MHz FSB) with Intel Centrino Mobile Technology, Up to Intel Dual Core Processor T2500 (2 GHz 2 MB Cache 667 MHz FSB) with Intel Centrino Mobile Technology, Up to Intel Pentium M 745 Processor (1.73 GHz 2 MB Cache 533 MHz),Others,][Units=String][UC_Order_In_String=1][UC_Length_In_Digits=1][Num_Of_Digits_Before_This_UC=0][UC_Range_Values=1-5]|

ATT:

Tells the processing engine that this is Attributes Data.

Num_Of_Attributes

The number of Attributes in "this" Data-chunk Describing "this" Product (e.g., 7)

Attributes_Total_Num_Of_Digits

This is the sum-total of all the "UC_Length_In_Digits"-values. It is the number of characters used by the Universal Codes of all the Attributes describing "this" Product (e.g., 28).

Each Attribute Composing the Attributes-Data for "this" Product Will be Defined and described with at least the following special purpose descriptors:

Name

The name of "this" Attribute

Values

The selection options values associated and applicable to the "Name" descriptor, as determined by the User_Creator. The values can be defined to be a range, or an enumeration, or other (e.g., 1-100 OR One, Two, Three, Red, Blue)

Units the "type" associated with "Values" defined above, as desired by the User Creator or as required by the process (e.g., Kilograms)

UC_Order_In_String

The sequential order in the Universal Codes Sequence for the Universal Code for "this" Attribute (e.g. 3)

UC_Length_In_Digits

The maximum length in characters for the Universal Code for "this" Attribute.

Num_Of Digits Before_This_UC

The number of "Universal Code" characters occurring before the "Universal Code" characters of "this" Attribute (e.g., 6)

UC_Range_Values

The values of the Universal Codes that will be associated with each selection "Value". These values can be a range, arbitrary or sequential, as determined User_Creator (e.g., 1, 2, 3, 4 OR 1-5, OR 87, 99, 101)

Using the data and following the methodology as described above, through interactive cycles, the User will be able to project a Request for a Product in Pseudo Natural Language such as the one exemplified below:

Request a Product-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery OneMany Pseudo NLT (Natural Language Text)

OneMany Business Model, Architecture, Solutions, are considered within the scope of Wireless Communication first, with efficiency, business use, real time functionality as the primary concern.

Pseudo NLT is targeted to be the essence of any textual representation for a Product, Service, Stimulation. Take for example the Pseudo NLT below. It is convenient to communicate wireless, it is (or could be) made up of no-nonsense Metadata keywords entirely within the scope of the intended transaction/Product, and even more importantly, it will always have these characteristics under the guidelines of OneMany Pseudo NLT—especially important for searching:
Request a Product-Business to Consumer-Dell-Laptops
Product Identifier XPS M1710 Mobilize and Conquer
Processor Up to Intel Core™ Duo Processor T2500 (2 MB Cache/2 GHz/667 MHz FSB)
Memory Up to 2 GB DDR2 SDRAM at 667 MHz 2 DIMM
Display 17 inches Wide-Aspect UltraSharp TFT Active Matrix WUXGA (1920×1200) display with TrueLife
HARD drive Up to 100 GB 7200 rpm SATA Hard Drive
Optical DVD Burner Upgrade Included
Graphics 256 MB NVIDIA GeForce Go 7900 Graphics Card
Battery 80 WHr 9-cell Lithium Ion Primary Battery One embodiment of the present invention relates to a system and method to provide counterparty users (e.g., a seller and a buyer, a consumer and a vendor) the ability to interact (e.g., engage in commerce via a Request DNA Robot and an Offer DNA Robot).

In one example, one or more users may select input information from a drop-down list containing pre-populated information. The pre-populated information may define or describe a product or service being offered or requested. In one example, to be able to Define and Describe a product or service, the user will have to select input information in sequential steps from Related Sets of Options The pre-populated information may be presented to each user in a local language. Each option of pre-populated information may have associated therewith a "universal code".

For example, a user in the United States may be presented (in the English language) pre-populated information including the word "House"; the English language word "House" may have an associated "universal code" of "7"; likewise, a user in Japan may be presented (in the Japanese language) pre-populated information including the Japanese word for "House"; the Japanese language word "House" would also have an associated "universal code" of "7".

Thus, to continue this example, each of the English speaking and Japanese speaking users may engage in commerce (e.g., for the sale of a house in the United States to a buyer in Japan) by using their native languages and the system does not need to perform ad hoc translations between the two languages (of coursed, any desired number of languages may be implemented).

Further, the universal codes may comprise a hierarchy and wildcards may be used in matching. For example, a specific product being requested may be defined by a Request DNA Robot with the following Request DNA: "11111111111.2.11231". The significance of this would be: "John Smith-Request-Business to Consumer-Product-Consumer Electronics-Computers-Laptops". Example Offer DNA Robots that satisfy this Request DNA Robot include:
  "0123456789.1.11231"
  "0123456789.1.112*3"
  "0123456789.1.112**"
  "0123456789.1.1123*"

In one embodiment, a vendor such as Dell could consider an Offer DNA Robot such as this "0123456789.1.112**" within the scope of deriving statistics for market trends for example. Dell might want to be notified with the Product Category-Product Type (e.g., "Computers"—"Laptops", "Video Recorders"—"DVD", "TV"—"Plasma" . . . ) every time someone executes a Request from the category "Consumer Electronics". With additional Temporal DNA settings, Dell can select to receive SMS notifications for 60 minutes for example.

Conversely, example Offer DNA Robots that do not satisfy this Request DNA Robot include:
  "0123456789.1.11232"
  "0123456789.1.11224"
  "0123456789.1.11223"

In another example, the DNA for a well defined projection of a specific laptop computer will be formed from the Universal Codes associated with the selections below (e.g., using a plurality of Categories, and one Product Identifier):
  Category: Consumer Electronics
  Category: Computers
  Category: DELL
  Category: Laptop
  Product Identifier: LATITUDE
  Attributes:
    CPU type
    Amount of RAM
    Etc.
  In another example, the DNA may have attributes-settings for one or more of the following:
  "Life" of DNA Robot
  Can DNA Robot evolve
  Price
  Quantity
  Availability
  Color As described above, one embodiment of the present invention may enable a consumer or vendor to project an offer or a-request for a specific product or service. The "specificity" describing the product/service may, to an extent, be forced by the system, while to another extent, where applicable, the user may be given the freedom to determine the level of specificity or ambiguity. This is in recognition to the fact that the user may be indifferent to certain specifics, or may be willing to consider a range of options. With respect to implementation, the categories/attributes the user is allowed to leave "ambiguous" may have a special representation within the DNA Robot. During "matching" events, the special-purpose switches enabling this functionality may insure that they will not cause a miss-match with an otherwise matching DNA Robot.

Moreover, this functionality may enable in certain embodiments, a "DNAevolution". Such a robot evolution may occur when a DNA Robot with a higher degree of ambiguity satisfies another DNA Robot for the sections (e.g., one category which can take one Universal Code value) which have been explicitly set, with no corresponding section with exclusive settings. In such a case, the DNA robot with ambiguous settings may be directed to contact its "creator" with a query regarding the unspecified value. The "creator" may have the options of updating its, original robot, therefore evolving it to a level of superior specificity, or to activate an additional DNA Robot specific to the querying DNA Robot, while having the previous DNA Robot at the original state of ambiguity. Leaving the original DNA Robot at the initial state, will insure that the user will not loose the functionality intended for the 1st DNA Robot, while addressing the querying DNA Robot.

In the offer/request scope according to one embodiment the consumer may be faced with the following functionalities: 1) Business-to-Consumer; 2) Consumer-to-Consumer, 3) Business-to-Business.

In a Business-to-Consumer example, the consumer may select to engage in two types of transactions: 1) Brand Specific; 2) Generic.

In an example "Brand Specific" transaction, the consumer is interested in constructing a request for a laptop offered by DELL. Provided that DELL is a brand-vendor in the Automated Business Center ("ABC") according to an embodiment of the present invention, the consumer will be able to select the options available from DELL, thus "defining" the product, and then select through the attributes, thus "describing" the product.

In one specific example, all or most of the options viewed by the user and all of the selections made by the consumer may be in the form of data that is available in real-time from the vendor (wherein the data may be stored by the vendor).

As the consumer finishes constructing its request-DNA Robot, as a final step, the consumer may be prompted to upload a media file (e.g., a picture) in order to better describe his/her request. To put this in the proper perspective, an Offer/Request DNA Robot may have a corresponding dynamic offer/request Web Page DNA Robot associated with it.

There are a number of benefits within the scope of the consumer/vendor's interest why this functionality may be desirable, one of which is that pictures/media files will add more description/specificity/identity to the user's DNA Robot.

Of course, those users creating a request need not necessarily upload a picture/media file to describe their request.

Within the scope of user initiated mobile marketing, an interactive advertisement can be inserted through an automated process for each web DNA Robot page that does not have a user-uploaded media file. Consequently, for each Request DNA Robot (or for almost each) there may be an interactive ad, inserted (which could in turn generate interaction with the vendor) in the web-DNA Robot page, and for each Positive Interaction (e.g., "Matching" Rule as defined by OneMany Intelligent Business Domain) with "this" DNA Robot, someone will most likely view the ad.

In any case, once the consumer Request DNA Robot is finalized, there may be at least three types of functionalities offered (and which the vendor could enable):

Automated Offer DNA Robot upon activation of the Request DNA Robot

Automated passive robot within the scope of the vendor becoming aware

Offer activation irrelevant to request.

In the first case, "automated Offer DNA Robot upon activation of the Request DNA Robot", each selection the consumer makes towards constructing its DNA Robot implies that selection is available and Product, Product-Component is being offered. Thus, a finalized DNA Robot describing a specific request means that specific product is available and being offered by the vendor, as otherwise the consumer would not have been able to construct a request for that product. The Positive Interaction (e.g., "Matching" Rule as defined by OneMany Intelligent Business Domain) will take place and the vendor/consumer will be notified.

In the second case, "automated passive robot within the scope of the vendor becoming aware", the difference from the above functionality is that a selection, and hence a Request DNA Robot constructed by the consumer does not imply availability/an automated offer from the vendor. Instead, the vendor, through its "passive" robot, will be informed of consumer requests with respect to its products. The vendor will have the option to activate a matching Offer DNA Robot whenever ready, or may contact the consumer directly within the scope of the initial consumer request.

In the 3rd case, "offer activation irrelevant to request", the consumer can activate a Request DNA Robot based on vendor product, but an Offer DNA Robot will match the Request DNA Robot only when the vendor will activate such an offer, and the offer will happen to satisfy the request specifications, without prior knowledge of the specifications by the vendor.

A Generic Ontology can be the universally accepted matrix for projecting the Definition and Description for a Product/Service. It will have a maximum audience.

A "Generic" transaction differs from a brand-specific transaction principally because of its construction and the implication that it will expose the participants (consumer/vendor) to the widest audience. From the perspective of the consumer, the "Brand" takes second place or becomes irrelevant in favor to a wider selection, better prices/deals. From the perspective of the vendor, its brand-name may not be powerful enough to rely on it to compete with other brands, or, regardless of its brand, the vendor may use the generic format in addition to the brand-specific transaction.

A well known brand can have multiple Product DNA projections, and activate brand specific DNA Robots for its regular customer base, and at the same time it can offer identical in product/service definition and description offer-DNA Robots in generic format, either to capitalize on additional requests neutral to the brand, or taking it a step further, and using the generic format to offer special deals to potentially first-time buyers of "this" brand.

As described herein, various embodiments may provide the functionality to enable a homogenous business model within the scope of B2B, B2C, C2C. That is, various embodiments may enable a "one-to-many" paradigm with respect to one solution to many (distinct in nature and in scope) applications.

Of note, various embodiments may provide one or more of the following functionalities:

Leads Generator;
Social Networking;
Instant DNA Robot Functionality;
Offer/Request Functionality;
Wireless Voting (i.e., WAP-based);
Intelligent Automated Auction/Bidding;
Searching: Internet/Mobile Homogenous;
Best-Price Comparison/Automated Best Price Functionality;
VR Functionality;
Removable Media;
Mobile Marketing/Interactive/User-generated in the context of Searching, Instant DNA Robot, Wireless Voting;
Intelligent Behavior;
Product Authentication, other;

In one embodiment, the architecture may identical in product/service definition and description may become a standard at a global level. In one example, the architecture may encapsulate some or all of the following methodologies (e.g., resulting in a unique functionality/architecture that may allow the architecture to become the least common denominator solution with respect to accessibility):

Hierarchy/Polymorphism;
Categories;
Decision Trees;
Keywords/Metadata;
"Standardization";
Findability (Ambient);
Relations;
Intelligent Behavior;
Ontology;
Transformation of Products/Services/Stimulations into OneMany DNA projections—an LCD homogeneus-to-all logical representation.

In another embodiment of the present invention the functionality may allow for essentially unlimited data participation with minimal or no impact on storage (and may allow for real time data modification of the vendor-data available through OneMany, by the vendor).

Another embodiment of the present invention may provide a unified online transaction-specific intelligent business domain that may be used in harmony with and to enable the functionality of an automated business center ("ABC").

The Automated Business Center may allow multiple vendors to participate in the transactions enabled by an intelligent business domain ("IBD"), For example, vendors may project participation in the automated business center by employing the automated business protocol, allowing exposure of items or services in the ABC in the format of natural language text accompanied by "universal codes", projecting an offer, request or other need.

Vendors' information resident at vendor's location regarding specific items or services, participating in the automated business center may take a corresponding precise form (according to the scope of the transaction, the item/service) and may be available from the "location" where the vendor usually stores its data.

The intelligent business domain may enable users (consumers, vendors) to interact with the active offers/requests for specific items/services as described by corresponding universal code, encapsulated by request/Offer DNA Robots, participating in the ABC, through a unified interface, through an online/wireless marketplace.

In another embodiment, DNA Robots projecting a specific item/service created as a result of an user/vendor projecting an offer/request with the IBD through the ABC, may be hosted by the IBD in a logical manner" (for example: if someone places an offer from the US, and someone else creates a request from Japan for what the person from the US is offering . . . how will those two DNA Offer/Request Robots "meet"? . . . if you apply the logical rule that an Offer from the US for a house in the US will reside in the US real estate table/database, and a Request from anywhere in the world for real estate in the US will reside in the US Real Estate Database/table, then we would be applying a certain logic to make solutions feasible in OM), and may be available for interaction with the other users/vendors, and/or their DNA Robots, through the ABC, and the unified interface.

In one embodiment of the present invention, the following methodology may be utilized:

Enable B2B, B2C, C2C, VOTING, Auction/Bidding, Best-Price Functionality, VR, Product Authentication . . . etc.
Automated Business Center is defined by the Intelligent Business Domain+All Vendors at global level which affiliate with the Intelligent Business Domain, and use IBD protocol.

IBD (Intelligent Business Domain): Based on OFFER/REQUEST, addressing all products/services that can be defined/projected through an OFFER/REQUEST and that can be defined through Ontology and described with Attributes.

Participating Vendors can expose in real time any and all items/services available for sale, from their local data warehouse. 'Data' participation in the Intelligent Business Domain can be "All" the items/services available from vendors participating in the Automated Business Center, without any or minimal storage impact on the Intelligent Business Domain.

One version of the Intelligent Business Domain may enable consumer/vendor interaction for resolving offers/requests relating to products/services, and for contact acquiring of the consumers/vendors who can satisfy offers/requests, within the framework of "Information is Power" and information may be obtained as soon as it is sought, or as soon as it becomes available after it has been requested. In another version of the Intelligent Business Domain, Purchasing, Phone Billing, and Bidding may be added.

Reference will now be made to an example of functionality which may be enabled by the Intelligent Business Domain within the scope of the above example:

Leads for participating Vendors;
Real-time Dynamic Voting;
Social Networking, Locator-less" or "Virtual Locator" (when considering that in one example, the solution may be making a point of not using a Locator) Solution;
Travel & Leisure;
Promoting affiliated-Vendor membership (e.g., E-Bay)
WAP/Mobile Search;
Pay by Phone;
Search Engine Marketing;
Private Marketplace;
Billing Methods;
Fantasy Sports/Interactive;
OneMany DNA, Pseudo Natural Language text and Zero Language Barrier;
Search for Active DNA Robots (Offers/Requests for items, services);
Auction/Bidding;
Removable Media;
Consumer participation in the Automated Business Center, as a "server" of products and services;
Promoting Mobile, Credit Card Usage;
Mobile Marketing.
Best Price functionality Reference will now be made to an example Intelligent Business Domain:

Local Data Warehouse.
Business Logic/Rules.
Dynamic Data Store for temporary storage of Vendor's Product-Attributes.
Dynamic Data Store for Active DNA Web Page Robots.
Dynamic Data Store for Offer/Request DNA Robots,
Processing Environment for Offer/Request DNA Robots Interaction.
Processing Environment for AI DNA codes stored in DNA Robots or data structures.
Processing Environment for Dynamic Voting functionality.
Processing Environment for DNA Robots-to-Voice.
Processing Environment for DNA Robots-to-Sensory perception.

Reference will now be made to an example of Vendor Participation:
   Vendor registers with the Intelligent Business Domain to participate in the Automated Business Center.
   Vendor participation defines the Automated Business Center.
   Vendor Data Stores located at Vendor's location.
   Vendor creates Vendor-specific Offer/Request DNA Robots.
   Vendor creates Generic Offer/Request DNA Robots.
   Vendor uses stand alone, or generic (web) interface to create Offer/Request DNA (e.g., can also or alternatively use cell phone/wireless device) Robots/Attributes.
   Reference will now be made to an example DNA Robot Definitions
      User ID
      Transaction Scope (Offer/Request)
      Product categories
      Product Identifier
      Product Attributes
      Intelligent Settings
   Reference will now be made to an example DNA Robot Intelligent Behavior:
      Life span
      Matching preferences
      Contact Information
      Bidding
      Bidding target
   In another example, precision may stay constant with recall.
   In another example, precision will be maximized, maintaining an associated and equally maximized or high degree of recall.
   In another example, there may be an auction DNA Robot and/or a bid DNA Robot.
   In another embodiment various data may be stored at the vendor and/or at the servers of the architecture provider.
   In another example (e.g., related to a social network or dating context) the DNA may include Universal Code settings for the location of the users (e.g., what bar or nightclub the users are at).
   In another embodiment existing DNA Robots may be searched (and matches may be made on existing DNA Robots interactively in real time, or at a later time).
   In another example, the present invention may be utilized to provide professional services (e.g., legal services via matching of questions and lawyers/answers). In this context, each legal concept (e.g., inheritance-related) may have an associated universal code. In a more specific example, a recent law school gradate or the like may provide answers (with a law firm endorsing correct answers).
   In another example, the present invention may incorporate "though-based" searching (e.g., expressing a thought, executing a search and returning content projecting the same thought (whether or not in the same language as the search query thought)). Regarding such though-based" searching, consider the following example: Given:You are at a bar; There is a bartender; Behind him there is an entire display of bottles. User Interaction: You look knowing that you want Jack Daniels (comparable to accessing OM and looking through the options to find Dell). You see Jack Daniels bottle in the background (comparable to seeing Dell as an option from a drop-down select box); Up to this point, you had a well defined thought/intention, you validated that your intention can be met. Now, you must communicate your thought to the bartender (comparable to communicating your request to the Intelligent Business Domain); You can accomplish this in a variety of ways—most desirable would be "telepathy" . . . thought-to-thought (DNA to DNA). However, the available options are through the spoken word, the written language (comparable to selecting options to create a request/offer). You communicate your request to the bartender (comparable to creating a request by selecting text options, which will have associated with them Universal codes—the "thought" element that will be used to represent components of a well defined thought in a DNA). Upon Activating your Request DNA Robot, the Intelligent Business Domain has your finalized Request DNA. The DNA represents the thought which was initiated in your head, was transformed in the written word, and from the written/spoken word (asking the bartender for Jack Daniels) it became transformed in DNA so that the bartender now has your thought (after asking the bartender for Jack, he transformed the spoken language to thoughts—IBD being the bartender and DNA being the thoughts in our case). The bartender will have to turn around and look (search) to see if there is a bottle of Jack Daniels. The bartender will have to match the thought/"Offer" DNA that will be acknowledged from a visual contact with a bottle of Jack Daniels with the user's Request DNA already in memory now. More specifically, the bartender is using the user's thought (Request DNA) to search for a bottle of Jack. When the bartender will see a bottle of Jack, that bottle of Jack will be represented as a thought (Offer DNA) in the bartender's mind, and it will be compared to the user's request DNA. I can use a variety of ways/words to describe my thought . . . and someone else may use a variety of ways to describe their thought. I'll probably be able to form the thought as a result of someone expressing it to me—therefore I was able to acknowledge the thought following reading a sentence, and I may reproduce the thought in different words/text . . . but the thought remains.
   Reference will now be made to other embodiments of the present invention (related to Universal Codes and DNA Fundamentals):
   Identity-Scope-Definition-Description-Intelligent Behavior Settings:
   OneMany DNA
      OneMany has identified the essential distinct non-homogeneous components that contribute directly or indirectly to a successful transaction, modeling them into a finite unified structure, the "OneMany DNA". The OneMany DNA is the common denominator Format which will enable the embodiment of User Identity, Product Definition, Product Description, Intelligent Behavior Instructions, Temporal Settings, amongst others, to be unified in one finite structure, able to interact with other similarly formatted structures through a range of methodologies, at the most fundamental level—"Matching".
   Some Essential Components Defining and Describing a Product and characterizing an Offer/Request Transaction:
      3D Timing;
      User Identity;
      Scope of the Transaction;
      Product Identity;
      Product/Service Definition;
      Product/Service Description;
      Metadata;
      Language (e.g., English, French, etc);
      User desired Action/Reaction, under different conditions, in multiple cycles: Intelligent Behavior.
   Resulting OneMany Unified Structure: OneMany DNA
   Sample Offer DNA for a Product: 0723750010.1.211.1.1111111.010.101

Offer   Attributes: All settings in blue are Attributes describing Processor, Memory, etc.

↑      ↑
   0723750010.1.21   .1.1111111.010.101  → The last six settings represent
                                           Intelligent Behavior settings
   ↓      ↓↓    ↓
   Dell ID   B2CDell XPS M1710 Mobilize and Conquer The Pseudo Natural Language Text projecting a Product Offer/Request will have an associated embodiment—it will take the form of a structured, delimited OneMany DNA:

Product/Service

A Product or a Service has Lowest Common Denominator text descriptions that can Define and Describe a Product. A product/device can de DEFINED by one or more Categories and/or DESCRIBED by 1 or more Attributes.

There is a hierarchy-relationship between the Defining Product Categories/Sub-Categories, and one Category will determine a set of one or more lower level, related subcategories.

Each defining Category/Sub-Category is described by one or more words. The ideal is to use a minimum of words to describe/represent a category without sacrificing clarity, or proper representation.

A Product or Service has one or more Attributes describing it. There may or may not be a hierarchy relationship between the Attributes. Most likely, one Attribute will not determine the next.

The Product Categories and Attributes describing it will have UC's (Universal Codes). Associated with them. Thus, a UC will be associated with the word/words describing a Category/Sub-Category/Attribute.

In effect Pseudo NLT (Natural Language Text) will represent a cumulus/compilation of Categories/Subcategories/Attributes, Defining and Describing a Product/Service.

This Pseudo NLT will have a concatenation of UC's associated with it, making up a Product/Service "DNA sub-Sequence".

A OneMany DNA will contain a larger/complete concatenation of UC's (Universal Codes) projecting (in addition to the Product/Service) User/Creator ID, Transaction Type, AI Functionality, etc.

Note:

It is important to realize that the scope is NOT to map a Universal Code to ONE Text Word.

You map a Universal Code to the least number of words (one or more text words), which when taken together, will accurately describe "that" Action (i.e., "Offer"), or "that" Product/Service Category or Attribute.

Example:

| Attribute Name: | "Processor" |
| Minimal Text Description: | "Pentium 200 MHz" |
| UC: | "5" |
| A segment of the Pseudo NLT projecting the Product: | ". . . Processor Pentium 200 MHz . . ." |

Ontology

Each Product and Service can be Defined through an Ontology:

Brand-Category 1-Category 2- . . . -Category n

Each Ontology can also be Described:

Brand-Category 1-Category 2- . . . -Category n-Attribute 1-Attribute 2-Attribute n Each Ontology can have a Scope (Offer/Request):

Offer-Brand-Category 1-Category 2- . . . Category n-Attribute 1-Attribute 2- . . . -Attribute n Starting from the premise that a Product, Service, Stimulation can have an Ontology-projection, OneMany IBD will identify two specific types of Ontology used in OneMany solutions:

Generic Ontology, and Brand Ontology.

A Generic Ontology can be the universally accepted matrix for projecting the Definition and Description for a Product/Service. It will have a maximum audience.

A Brand Ontology is the matrix Definition and Description for a Product/Service, as determined by the Brand Vendor. A Brand Ontology, in a most constructive approach, can be almost identical to a Generic Ontology, with the only difference being the top-level identifier-Brand (e.g., Dell), or Generic (e.g., Generic).

Consider the following example:

Generic Format:

Brand Generic-Laptops-Product Identifier Generic-Processor-Ram-Hard Drive-[ . . . ]

Brand Format:

Dell-Laptops-Product Identifier-Processor-Ram-Hard Drive-[ . . . ]

OneMany Pseudo NIT (Natural Language Text)

OneMany Business Model, Architecture, Solutions, are considered within the scope of Wireless Communication first, with efficiency, business use, real time functionality as the primary concern.

Pseudo NLT (Natural Language Text) is targeted to be the essence of any textual representation for a Product, Service, Stimulation. Take for example the Pseudo NLT below. It is convenient to communicate wireless, it is (or could be) made up of no-nonsense keywords entirely within the scope of the intended transaction/Product, and even more importantly, it will always have these characteristics under the guidelines of OneMany Pseudo NLT—especially important for searching:

Offer a Product-Business to Consumer-Dell-Laptops

Product Identifier XPS M1710 Mobilize and Conquer

Processor Up to Intel Core™ Duo Processor T2500

Memory Up to 2 GB DDR2 SDRAM at 667 MHz 2 DIMM

Display 17 inches Wide-Aspect UltraSharp TFT Active Matrix

Hard drive Up to 100 GB 7200 rpm SATA Hard Drive

Optical DVD Burner Upgrade Included

Graphics 256 MB NVIDIA GeForce Go 7900 Graphics Card

Battery 80 WHr 9-cell Lithium Ion Primary Battery

OneMany Universal Code (UC):

OneMany does not look to associate number to words in the strict sense of the meaning. While associating codes to single words may occur, this is a result of the fact that a single word will accurately describe an Intention, Event, Action, Category, Sub-Category, Attribute, Behavior, etc. It is the intention of OneMany to associate numbers or string-codes to the least number of words, which when taken together, will accurately describe an Intention, Event, Action, Category, Sub-Category, Attribute, Behavior, etc.

OneMany will determine the Universal Codes that will be associated to certain Intentions, Events, Actions, Categories, Sub-Categories, Attributes, Behaviors, etc, while in other cases, it will be the Consumers/Users who will determine/associate Universal Codes to Events, Actions, Categories, Sub-Categories, Attributes, Behaviors, etc, in doing so, taking into account this general rule as defined by OneMany, and their own personal needs.

A "Universal Code" (UC) is the lowest form of abstraction that can be associated with a Category, Subcategory, Attribute, Action, Behavior, within the scope of Product/Service. Example:
DNA=0723750010.1.211.1.1311124
2 is a Universal Code associated with one or more words Describing or Defining a Category, or an Attribute for instance.

A single Universal Code (UC) is associated with a single Intention, Event, Action, Category, Sub-Category, Attribute, Behavior, etc, this being the lowest level of abstraction for a UC.

A "Universal Code Sequence" is the concatenation of two or more UC's within a DNA Field (see "DNA Field" definition in the DNA Section). Example:
DNA=0723750010.1.211.1.1311124
1112 is a Universal Code Sequence (formed of UC's "1", "1", "1", "2", each associated with a text option).

The "Universal Code Range" is a numerical representation of the string, or numerical values that will be assigned to UC's (e.g., as Strings), which will associate with text options for a particular event case. For an Attribute, for example, the Universal Code Range might be 1-100. Therefore, if selecting an option that has UC "5" associated with it, string "005" would be inserted in the Universal Code Sequence of the DNA, as the UC Values in the Range in this example are represented by a Maximum of three characters, and the Maximum length of character-representation is imposed for every Range-value with leading "0" where applicable.

A Universal Code (UC) will have Global, Absolute projections in certain cases, and Relative projections in other cases.

Global Universal Codes: Absolute Universal Codes determined by OneMany which are constant in value, association. Consider the "Absolute" values of Universal Actions, such as "Offer". Example: Action "Offer"=UC "1". While the value of "1" may, and can change in the future, the Action "Offer", and the Absolute value of the UC will remain Global, determined by OneMany.

Relative Universal Codes: Universal Codes which are determined by 3rd party, Vendors for example, and which may or may not play a Global role. They are at least Local to the Product/Service offered by the Vendor. There will be a "Global" relationship at least between the Vendor who is offering a Product/Service, and the Consumer, who is requesting the Product/Service. This is because, the Vendor will determine the Relative Universal Codes that will define the Product/Service through associating the UC's with the Categories/Attribute Describing and Defining the Product/Service. In projecting a Request for the Product/Service, the Consumer will select through Categories/Sub-Categories/Attributes, using the Vendor's UC's in constructing the Consumer Request DNA.

Consider the Following Use Case:

In Defining and Describing an "Apartment" you will get to the Attribute "Floor". The Attribute name "Floor" will have a range of possible Values (i.e., 1-100). The Attribute name "Floor" can take on UC string values that are determined interactively by the user. The Universal Code values may be a string value of the actual value selected/inputted by the user, or it may have an altogether unrelated value with the actual value selected by the user, as this would be a Relative Universal Code. In other words, the user may select 5$^{th}$ floor, which may have Vendor-determined associated UC string value of "78".

OneMany DNA:
A "DNA" is a complete sequence of concatenated UC's, delimited by an IP-like "." A OneMany DNA will contain information representing (Creator ID, Transaction Type, Product/Service Category, Product Identifier, Attributes, Auction/Bidding Min/Max (optional/case dependent), Vendor-specific AI Behavior, OneMany Generic AI Behavior, Second User ID (optional/case dependant)). Sample OneMany DNA:
Offer DNA: 0723750010.1.11211.1.1311124.020.000
Auction DNA (with active winning Bid ID): 9999999999.4.1111.1.040.090150.029.000.7777777777
OneMany DNA Fields
1. User/Creator ID (i.e., Auction Vendor ID(999999999))
2. Transaction Scope (Request/Offer/Auction(4)/Bid/Wireless Voting [ . . . ])
3. Transaction Type (B2B(1), B2C, C2C, . . . )
4. Commodity Type (Products(1), Services, . . . )
5. Product/Service Category (1–n: Consumer Electronics(1), Car Stereo(1))
6. Product Identifier (Blaupunkt(1))
7. Attributes (1–n: Watts(040))
8. Min/Max Bid (optional, Transaction Scope dependent) (Min Bid(090), Target Price(150))
9. Vendor-specific Intelligent Behavior (000—No AI setting)
10. OneMany Generic Intelligent Behavior (000—No AI setting)
11. Second User ID (optional, Transaction Scope dependent) [Winning Bidding ID(777777777)]

A Partial DNA is one or more DNA fields in their logical sequence staring from the 1$^{st}$/leftmost DNA Field, and signifying the "partial" state by having a hanging delimiter "." set at the end of the DNA string. Example:
DNA=0723750010.1.211.1.1311124.020.000
"0723750010.1.21." AND "0723750010.1.211.1.." are Partial DNA's. Note the double ".." at the end of the second Partial DNA. It is correctly placed there following the definition.

A "DNA Field" is the leading delimiter (".") together with the UC Sequence up to, not including the next delimiter ("."). Example:
DNA=072375001.1.211.1.1311124.020.000
.1 is the DNA Field "Transaction Type"

A "DNA Sequence" is two or more DNA in sequence, separated by delimiters ("|"). Example:
DNA1=0723750010.1.211.1.1311124.020.000;
DNA2=9999999999.2.211.1.1311124.100.000
0723750010.1.211.1.1311124.020.000|0723750010. 1.211.1.1311124.020.000 is a DNA Sequence A "DNA sub-Sequence" is two or more DNA fields in sequence, separated by delimiters (".").
Example:
DNA=0723750010.1.211.1.1311124.020.000
.1.211.1.1311124 is a sub-DNA Sequence "DNA Grouping" is two or more DNA Fields that are separated by one or more DNA Fields.
Example:
DNA=0723750010.1.211.1.1311124.020.000
.1 . . . 1311124 is a DNA Grouping (e.g., the DNA Grouping of Transaction Type, Attributes).

OneMany 3D Temporal DNA: Past.Present.Future.DNA
In addition to the projection of an Offer or Request for Product/Service to a OneMany DNA, OneMany enables the projection of a Temporal dimension described by Past, Present, and Future: Past.Present.Future.DNA=>OneMany Temporal DNA
A OneMany Temporal [SCOPE] DNA Fields Field1.Field2.Field3.Field4.Field5.Field6.Field7.Field8. Field9.Field10
Field1: Temporal Dimension Field, projecting "Past".
Field2: Temporal Dimension Field, projecting "Present".

Field3: Temporal Dimension Field, projecting "Future".
Field4: Strong Identity Field projecting a User ID.
Field5: DNA Scope Field,
Field6: Categories Field Defining.
Field7: Weak Identity Field projecting a Product/Service/Stimulation Identifier.
Field8: Attributes Field Describing.
Field9: OneMany Generic Field for Artificial Intelligence/Behavior settings.
Field10: Special Purpose, Vendor/User defined Artificial Intelligence/Behavior Field.

Temporal "Birth" for a Product/Service:

Absolute—A Product or a Service may have one Absolute Date of Birth. For example, a Dell Laptop coming off the assembly line, will have an Absolute Date of Birth when it is first offered on the market.

Relative—A Product or a Service may have a number of "Date of Birth" throughout its "Reincarnation-like" potential. For example, a brand new Dell Laptop coming off the assembly line will have the Strong Identity (see section above) of the Vendor, Dell initially, with the Weak Identity of the Product Identifier—"XPS Mobilize and Conquer".

However, after the Consumer has purchased this Product, the Product will have a new Strong Identity—that of the Consumer's, along with the previous Weak Identity, the Product Identifier—"XPS Mobilize and Conquer".

Temporal Projections for a Product/Service:

- A Product or a Service can have One Specific Projection during specific Time Periods.
- A Product or a Service can have Many Specific Projections during specific Time Periods.
- A Product or a Service can One or Many Generic Projections during specific Time Periods.
- A Product or a Service can have a combination of Specific and Generic Projections during specific Time Periods.
- At the conclusion of the Time Period, a Product or a Service may be terminated, or it may take another Non-Related Identity Projection.

OneMany Temporal DNA and Logical IP Robot

OneMany enables the projection of 3D Time+User Identity+Product/Service Definition+Product/Service Description+Product/Service Identifier+Intelligent Behavior as a Logical IP in the OneMany ABC (Automated Business Center): "0.1.0.1234567890.8.11.1.114.000.000"

OneMany Temporal Stimulation DNA

A "Stimulation" DNA will be composed of at least of some of the following Fields: the Identity of the User_Creator, the Scope (Offer_Stimulation/Request_Stimulation), the Hierarchical Categories Defining the Stimulation (e.g., Sexual/Man on Woman/Intercourse . . . ), the Attributes Describing the Stimulation (e.g., Position On Top, Movement Fast, Duration in minutes 4, [ . . . ])

Stimulations (Offer/Request Based) Thoughts, Intentions, Actions

OneMany enables the User to construct Temporal Stimulation DNA(S) by enabling the User to Define and Describe "Thoughts/Intentions/Actions" through Discrete Lowest Common Denominator Natural Language Text, employing the OneMany Categories/Attributes format, with associated Universal Codes.

In the User-Interactive methodology, the User will be able to project one or more Thoughts/Intentions/Actions by selecting through a set of predetermined Text Options, creating a Pseudo NLT (Natural Language Text) description of the intended Thought/Intention/Action, along with an associated Temporal Stimulation DNA (within the Scope of Offer/Request) that can be used to interact with other Temporal Stimulation DNA's, and/or can be used to drive the behavior of a Mechanical Device/Robot.

A comparable functionality to the User-interactive approach described above, is offered by the OneMany Automated Stimulation Engine. In this embodiment, the Temporal Stimulation DNA is constructed by the Stimulation Engine by parsing Text Sentences projecting Stimulation in a specific Scope (e.g., Sexual). The algorithm will enable the OneMany Stimulation Engine to analyze a Text Sentence and extract the Thoughts/Intentions/Actions, applying the Hierarchical, and Descriptive methodology to extract the Defining Categories in their proper Hierarchical order, and the Describing Attributes, placing them in the order as determined by the OneMany Generic Matrix, OR in the order as determined by the Brand Matrix.

One Text Sentence::One Pseudo NLT::One OneMany Temporal Stimulation DNA

In doing so, the OneMany Stimulation Engine will either use the Database, Dictionary, Vocabulary, Ontology Matrix of OneMany, OR that of the Brand Company, as made available remotely by the Brand Company through the Automated Business Center, or from a 3$^{rd}$ party location participating in the Automated Business Center, such as a Consumer utilizing a Wireless Device with a Removable Media (e.g., Memory Card) as provided by the Brand Company through the purchase of a Mechanical Toy connectable to the Wireless Device, for example.

Thoughts/Intentions/Actions->Digital Text->OneMany Stimulation Engine->OneMany DNA's->Mechanical Robot OneMany Stimulation Engine Starting from the premise that a Thought, Intention, or Action is within the scope of a specific area (i.e., sexual, medical, etc) each specific area will have a set of discrete One or More text-words that will related to, and Define or Describe the specific "Thought".

Consequently, a method can be used to associate a UC (Universal Code) numeric or alpha-numeric, to the One or More Text words related to, and Defining or Describing the specific Thought/Intention/Action.

Most often, a single Thought, Intention, or Action cannot be projected by a single Universal Code, as the Thought in

---

| | | | | | |
|---|---|---|---|---|---|
| Visual | | | | | |
| Audio | | | | | |
| Category1 | Category2 | Stimulation Identifier | Position | Movement | Duration in minutes |
| Sexual - | Man on Woman - | Intercourse - | On Top - | Fast - | 4 - [ . . . ] |
| with the following assoc. Universal Codes for example, that will concatenate to form a | | | | | |
| Temporal DNA: | | | | | |
| 1 | 1 | 1 | 1 | 1 | 4 |
| Medical | | | | | | itself is made up of related sub-Thought components, which together give the Thought a beginning, a purpose, and an end.

Each sub-Thought component by itself is ambiguous. The identifying of the key determinant sub-Thought components, the proper ordering of the sub-Thought components, the association of these components to the least, and most representative text-words, considering the Defining and Describing aspect, in the context of determinant hierarchy, and suggestive order, will enable the logical concatenation of Universal Codes, each of which will be associated to a sub-Thought component.

A well defined Thought will have a beginning, a purpose, and an end, and will be defined and described with a minimum of one sentence—the text content before a punctuation mark, if it is the first sentence, or the text content between two punctuation marks (as they are defined).

The processing of a natural language text sentence, extracting the Thought/Intention/Action projected by the sentence, and the concatenating of Universal Codes associated with the sub-Thought components, using OneMany methodology, will result in a OneMany Temporal Stimulation DNA.

A set of sentences in sequence and related to the top level Category (e.g., "Sexual"), as defined by the Stimulation Scope, will be processed to generate a Sequence of OneMany Temporal Stimulation DNA's.

The Processing Logic remains constant regardless of the Thoughts/Intention/Actions that are being processed.

A method and a system for changing the processor's focus on the type of Stimulation Scope top level Category (e.g., "Sexual", "Medical", [ . . . ]) of the Thought/Intention/Action.

Thus, parsing the same material (i.e., digitized text), describing Thoughts/Intentions/Actions, the processor could first focus on generating DNA's within the Scope of "Stimulation" with top-level Category "Sexual", or, upon changing the reference Data, Vocabulary, Dictionary, Ontology Matrix of OneMany, OR that of the Brand Company, the OneMany Stimulation Engine could generate OneMany Temporal Stimulation DNA's within the Scope of Stimulation, top-level Category "Medical" for instance.

A OneMany Temporal Stimulation DNA will project some of the following:

3D Time+User Identity+Product/Service Definition+Product/Service Description+Product/Service Identifier+Intelligent Behavior as a Logical IP in the OneMany Automated Business Center: 0.1.0.1234567890.8.11.1.114.000.000

By employing the User-interactive methodology, or by using the OneMany Automated Stimulation Engine, a Temporal DNA Stimulation sequence such as the one below: 0.1.0.1234567890.8.11.1.114.000.000|. . .|1.11.0.DNA can be obtained, where "|" is used as DNA's-separator, while the placeholder "DNA" is used in combination with the Sequential-Format of the Temporal DNA, where a Temporal setting of the "Past" dimension (e.g., here set to "1"— "1.11.0.DNA") together with the placeholder "DNA" will imply that for "this" Temporal DNA ("Present" set to Sequential "11"-"1.11.0DNA") the Processor/Mechanical Device/etc should use the previous Temporal DNA values ("1234567890.8.11.1.114.000.000"), whose "Present" was set to "1" (0.1.0.1234567890.8.11.1.114.000.000)

In other words, this Temporal DNA "1.11.0.DNA" is making a reference for its "DNA" values to the Past Temporal DNA "0.1.0.1234567890.8.11.1.114.000.000". A substitute for this procedure would be to write this Temporal DNA "1.11.0.DNA" as "0.11.0.1234567890.8.11.1.114.000.000" 0.1.0.1234567890.8.11.1.114.000.000

"0.1.0" represents the Temporal Dimension of the DNA. In this example, the projection of the Temporal Dimension is in Sequential Format. "Past" is set to "0", implying "Birth". "Present" is set to "1", implying "Birth" or "First", in combination with the "Past" setting of "0". "Future" is set to "0".

".1234567890" represents the Strong Identity Field with the OneMany User ID "1234567890";

".8" represents the Scope Field with the Universal Code "8" associated with "Offer_Stimulation"

".11" represents the Categories Field with the concatenation of the Universal Codes "1" and "1" associated with the Categories "Sexual" and "Man on Woman"

".1" represents the Weak Identity Stimulation Identifier Field, with the associated Universal Code "1"

".114" represents the Attributes Field with the concatenation of the Universal Codes "1" and "1" and "4" associated with the Attributes "Position On Top", "Movement Fast", and "Duration in Minutes 4"

".000" represents the Vendor-specific defined Artificial Intelligence/Behavior settings—none set.

".000" represents the OneMany Generic Field for Artificial Intelligence/Behavior settings—in this case, no AI settings.

Automated Intelligent Behavior and DNA Evolution

The DNA in the "Active Robot" State can undergo "Evolution".

"Evolution" is warranted in the cases where a User-Creator has executed a DNA with Fields containing missing UC-settings. For example, the user might not specify the selling price for his/her house. This filed might be left unanswered, or a "Make Me an Offer" UC wildcard might be used.

The Evolution of a DNA will be triggered by another Active Robot DNA, for example.

An "Evolved" DNA as a consequence of interaction with another Active Robot DNA, will be able to be able to give a clear answer/clarify an issue which was not dealt with, was not covered, was left ambiguous in the previous State.

An Evolved DNA will offer more information/answer more questions to other Active Robot DNA's in future interactions.

Intelligent Behavior, and DNA Wild Card Setting

In setting a Category/Attribute in the definition of a "Product/Service" DNA, a predetermined Universal Code will take a predetermined location in the OneMany DNA.

Special purpose "Wild Card" Universal Code symbols associated to the "Let Me Know What You Need" option for example, can be introduced in the Product/Service DNA as a consequence of selecting an option such as "Let Me Know What You Need".

Sample Rule:

Upon Activating a Request DNA Robot, a Universal Code setting of a specific Category/Product_Identifier/Attribute associated with "Specific" Data (e.g., "Dell"), will "force" evolution in a matching Offer DNA's Category/Product Identifier/Attribute from an Active Offer DNA Robot, if and only if the corresponding Category/Product Identifier/Attribute of the Offer DNA from the Active Offer DNA Robot has "Let Me Know What You Need" UC Wild Card.

| Offer | Request |
|---|---|
| Specific⇔ | "Make Me an Offer" |
| "Let Me Know What You Need": | Specific ("Dell") |
| "Can I Make U an Offer?": | "What Do You Have?" |
| "Can I Make U an Offer?": | "Make Me an Offer" |

This can entail the following types of functionalities:

The Offer DNA Creator will Activate one Offer DNA Robot with one or more "Let Me Know What You Need" "Wild Card" UC(s) for specific Categories/Product Identifier/Attributes defining the Offer DNA. Upon an Active Request DNA Robot engaging the Activated Offer DNA Robot with "Specific" UC setting associated with "Dell" for the corresponding "Let Me Know What You Need" UC, the User-Creator of the Active Offer DNA Robot will have a range of options such as:

Maintaining 1 Active Offer DNA Robot with "Let Me Know What You Need" Wild Card UC, and creating additional Instant Offer DNA Robots with "Specific" Offer-Items upon being able to satisfy "Specific" Requests upon interaction with "Let Me know What You Need" Offer. This will enable the Offer User-Creator to create specific Offers only when there are specific Requests for the items the Offer User-Creator has available.

OR

Allowing the initial Active Offer DNA Robot to evolve to an Active Offer DNA Robot with Specific offer-information in place of "Let Me Know What You Need".

OneMany ROBOT:

A Robot can be a "server", a process, a software executable.

A Robot can also be a server process extended with a mechanical device.

A Robot functionality without the OneMany DNA is considered a Potential DNA Robot;

A Robot functionality with a OneMany DNA is considered an Active or Kinetic DNA Robot.

A Robot functionality with a neutralized DNA is considered a Passive Robot;

A "Higher Level Robot" will include all that it needs to function, such as: Database, Hardware, Intelligent Behavior, Helper Robots, etc.

A Helper Robots will have specific goals within the scope of the Higher Level Robot Scope.

OneMany DNA Robot

Just like human DNA, OneMany DNA needs a suitable "body" in order to function as intended, and to maximize its potential functionalities. In OneMany, a suitable "body" for a OneMany DNA is a software module, or a data structure for example. OneMany will enable the integration of OM DNA with OM Software modules, data structures.

The resulting entity is referred to as a OneMany DNA Robot.

A OneMany DNA Robot is a software executable that is able to host the Product DNA, and handle specific DNA settings for Intelligent Behavior. The Product DNA may have specific settings for specific behavior, such as "VIP Offer for $1^{st}$ Time Buyer OR VIP Buyer OR Surplus stock"

where the logic can be something along the lines:

For each request for "this" item, communicate with the Brand.

Find out if this is a $1^{st}$ time buyer

OR

If there is a surplus of stock for "this" item

OR

If this buyer has spent over $5,000 in the last 24 months.

If either true, offer this buyer a 20% reduction in price for "this" item.

OneMany DNA and Intelligent Behavior Settings

DNA Fields.000.000

DNA Fields.000.AI Settings

DNA Fields.AI Settings000

DAN Fields.AI Settinigs.AI Settings

DNA Fields.AI Settings.NO=>DNA Fields.AI Settings.000

Intelligent Behavior Setting, Sample Path of Execution

Loop through Attributes Data;

Come across specific Attribute AI Keyword;

Note: If AI Keyword occurs in "Attributes", then those AI options are Custom made (for the Vendor) AI behavior determined by the Vendor, hosted in OneMany for example.

Insert the DNA AI Filed Delimiter;

Loop through Vendor-specific AI Options, select any if interested.

Next, User_Agent selects whether to entertain additional OneMany Generic AI Options, if there should be any available. Note: After the Product Attributes are completed, OneMany may offer additional OM-local standard/premium AI Behavior options. If this is the case, and if the User_Agent selects any, the corresponding UC's are introduced in the second DNA Intelligent Behavior Field. Otherwise, the second AI DNA Field is set to "000".

In one embodiment, Attributes are being processed, DNA is in current State:

"0723750010.1.211.1.1311124"

If "Artificial Intelligence Services"=True Then

GoTo DNS, Execute ATU, Return Data to OneMany Intelligent Business Domain

Extract NEXT (DNS, ATT) OR Use same OR Use from local storage—case dependent

Populate Options, Presentation Tier

User Select

Loop

When "Loop" complete, Offer DNA="0723750010.1.211.1.1311124.20.000"

In the AI setting "020" above, the user has selected only 1 Vendor-specific AI option: "2"

Top Level Potential DNA Robots

Offer;

Request;

Instant;

Auction;

Authenticate;

Search;

Voting;

Stimulation;

Etc.

NOTE: In many cases, everything may be rationalized as an "Offer" or "Request", whether it is for a Product or a Service.

Higher Level Robots
  Offer;
  Request;
  Real Estate;
  Mechanical Toy;
  Social Networking;
  Consumer Electronics;
  Best Price Comparison;
  Etc.
DNA, Intelligent Behavior and Intelligence Evolution
  Special purpose Intelligent Behavior, within the scope of Higher Level Robots, triggered by special purpose settings in the OneMany DNA.
  For example:
    "Get the Average Number of Offers per Hour" Robot-Scope. This is a special purpose, "Intelligent Behavior", lower level Robot, Activated by a Higher Level Robot due to a specific setting in the DNA.
    This "Robot-Within-a-Robot" approach can also allow for a dynamic variance with respect to intelligent Behavior, generally allowing for intelligence evolution.
Sample Robot Intelligent Behavior
  Life span
  Negotiations
  Bidding Targeting
  Matching preferences
  Intelligent Bidding Negotiation
  Bidding, and Automated Bidding under "stress"
  Programmed Behavior Unique special purpose "DNA" within the Robot will enable custom made programmed behavior stored in the Intelligent Business Domain.
  Two or more Intelligent Agents communicating relevant data within the scope of realizing maximized results.
OneMany DNA, Pseudo NLT, and Zero Language Barrier
  The application of OneMany methodology to use Ontology in projecting an Offer or Request for a Product or a Service in Pseudo Natural Language Text, with associated DNA will enable global transactions with zero language barrier.
  More specifically, while a user from the United Stated will project an Offer in English Pseudo NLT, and a user from Romania will project a Request for a Product in Romanian Pseudo NLT, the associated DNA's will be in the same "language":
US OneMany Offer DNA for a Product:
0723750010.1.211.1.1311124.020.000
Romania OM Request DNA for a Product:
9999999999.2.211.1.1311124.020.000
  Under OneMany Intelligent Business Domain, the two DNA's and their respective Robots can interact unencumbered by the language difference of the two users, and their corresponding Pseudo NLT's. Their own Pseudo NLT's can be used in querying them, or communicating results back to them—in their own native language, without employing any form of translation!
OneMany DNA Web Robot, and Ambient Findability
  Note the IP-like projection of a Product or a Service through a OneMany DNA such as 0723750010.1.211.1.1111111 Upon completing the Defining and Describing steps for a Product that is being Offered, the Vendor (e.g., Dell) will be enabled to upload media files (images, videos) related to the Product it is Offering. The name of the web page in this example will be 0723750010.1.211.1.1111111.asp
  This will make the Product Searchable, Navigable, Locatable, and Accessible/Retrievable In more advanced functionality, a DNA Web Robot can entail a range of functionalities, such as Input to the wild card request "Make me an Offer", in effect enabling a perpetuation of automated interaction between the DNA Offer/Request.
  Reference will now be made to various architecture concepts as may be applied in the context of various embodiments of the present invention:
  As seen in FIG. 1, consumer is registered with Wireless Provider, Vodafone; Vendor Dell is registered with the OneMany Intelligent Business Domain as a FPSP (For Profit Service Provider).
  Using a Cell Phone and WAP, Consumer is able to interact with the Product Provider Dell through the OneMany Intelligent Business Domain.
    Using the Presentation Tier, and the Intelligent Business Domain, the Consumer is able to construct a Request based on the Product Provider Dell Data.
    The Request will Define and Describe a Product such as:
  Request a Product or a Service-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery
  There are a number of ways that the Vendor can project an offer, such as:
    One Rule can offer the functionality such that a Consumer will only be able to select and construct a Request based on availability. Once a DNA Request Robot is completed, a DNA Offer Robot will be instantiated, informing the Consumer and the Vendor (among other things) of the positive Offer/Request interaction, enabling the Vendor to take additional steps leading to a purchase transaction.
    Another Rule, there will be no correlation between the Consumer's ability to project Product-Requests based on Vendor-Options, and the availability of such Products. The Vendor will create Product DNA Offer Robots independently.
    Note: A Vendor serving Products or Services to Consumers or other Vendors is registered with the OneMany Intelligent Business Domain prior to being enabled to act as a Product Provider.
OneMany Pseudo NLT (Natural Language Text)
  OneMany Business Model, Architecture, Solutions, are considered within the scope of Wireless Communication first, with efficiency, business use, real time functionality as the primary concern.
  Pseudo NLT is targeted to be the essence of any textual representation for a Product, Service, Stimulation. Take for example the Pseudo NLT below. It is convenient to communicate wireless, it is (or could be) made up of no-nonsense keywords entirely within the scope of the intended transaction/Product, and even more importantly, it will always have these characteristics under the guidelines of OneMany Pseudo NLT—especially important for searching:
Offer a Product-Business to Consumer-Dell-Laptops
Product Identifier XPS M1710 Mobilize and Conquer
Processor Up to Intel Core™ Duo Processor T2500 (2 MB Cache/2 GHz/667 MHz FSB)
Memory Up to 2 GB DDR2 SDRAM at 667 MHz 2 DIMM Display 17 inches Wide-Aspect UltraSharp TFT Active Matrix WUXGA (1920×1200) display with TrueLife Hard drive Up to 100 GB 7200 rpm SATA Hard Drive
Optical DVD Burner Upgrade Included
Graphics 256 MB NVIDIA GeForce Go 7900 Graphics Card
Battery 80 WHr 9-cell Lithium Ion Primary Battery
OneMany Ontology—Global, Brand Specific Starting from the premise that a Product, Service, Stimulation can have an Ontology-projection, OneMany IBD will identify two specific types of Ontology used in OneMany solutions: Generic, and Brand Ontology.

A Generic Ontology can be the universally accepted matrix for projecting the Definition and Description for a Product/Service. It will have a maximum audience.

A Brand Ontology is the matrix Definition and Description for a Product/Service, as determined by the Brand Vendor. A Brand Ontology, in a most constructive approach, can be almost identical to a Generic Ontology, with the only difference being the top-level identifier—Brand (e.g., Dell), or Generic (e.g., Generic). Consider the following example:
Generic Format:
Generic-Laptops-Product Identifier-Processor-Ram-Hard Drive-[ . . . ]
Brand Format:
Dell-Laptops-Product Identifier-Processor-Ram-Hard Drive-[ . . . ]

In this example Dell is enabled to cater offers specifically to its loyal customer base, who may specifically Request Dell-brand products.

However, in addition to its loyal customer base, Dell may want to be able to reach also those potential new customers who are not driven by the Brand, instead looking for a best offer for example. By employing a Brand Ontology similar to the Generic Ontology, Dell will be able to obtain Generic Requests to the Brand Offer! Dell may have Intelligent behavior enabled such that when a Generic Request has a positive interaction with a Brand Offer, and the Consumer is potentially a $1^{st}$ time Dell buyer, Dell can react to the Consumer Request with an automated Offer of 15% off for example—this going unnoticed by anyone else!

Figure 2A:
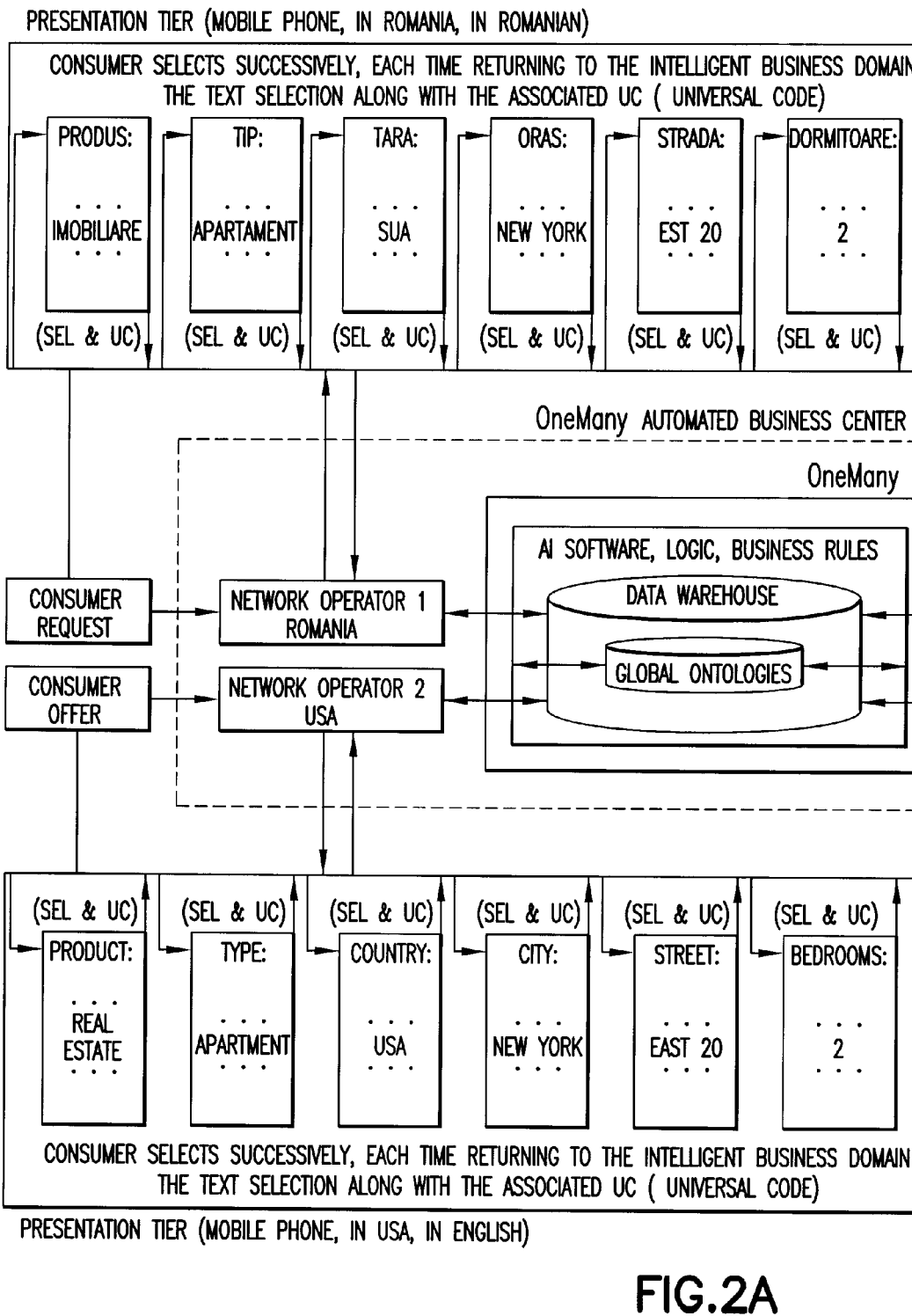
Figure 2B:
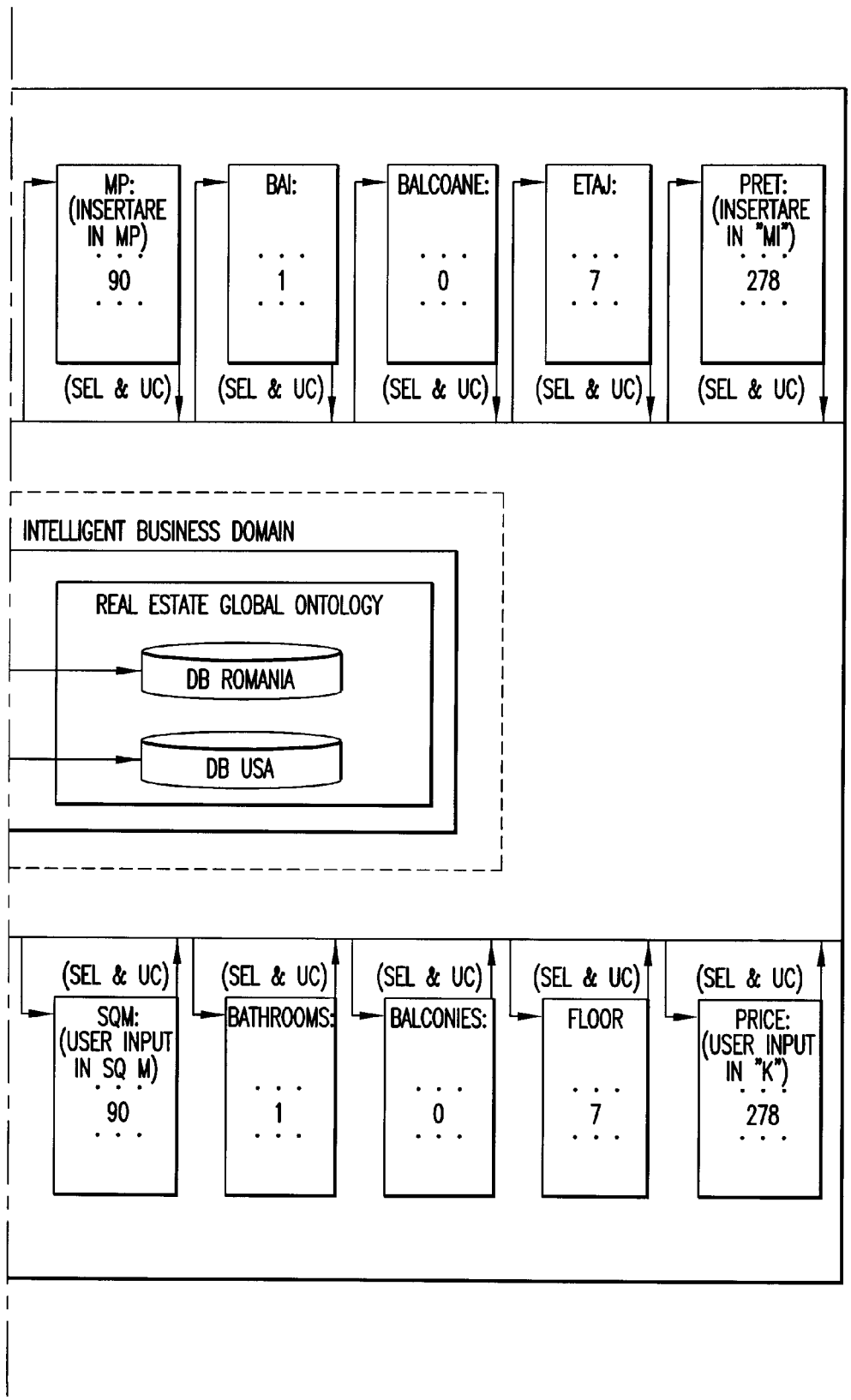

Referring now to FIG. 2, various Real Estate, Global Ontology, Leads Functionality is shown.

Taking Real Estate as an example, OneMany would consult with its leading partners in this field and devise one or more Ontologies ad they apply to the Real Estate field.

As it appears from this Fig., one Ontology can be projected in one or more languages (e.g., English and Romanian).

Following the example above, a Consumer 1 will project a Request in Romania, in Romanian, while a Consumer 2 will project a compatible Offer in English, in the United States.

Each Consumer will be using his/her local Network Operator (e.g., AT&T, Vodafone) in the process of Defining and Describing the Offer/Request, in successive steps as presented above.

During each step of the "Defining" process, the Consumer will select an option from the set of options available, that upon selection, will determine the next set of selection options through interaction with the OneMany Intelligent Business Domain.

The "Describing" process (starting from "Bedrooms" to "Price") can also be done successively, or "all at once", as there is no hierarchy relationship most likely.

Upon selecting a Text-Option, the Presentation Tier (e.g., Cell Phone) will return to the OneMany Intelligent Business Domain (through the Network Operator) the Text-Selection and the UC (Universal Code) associated with the selection, and the Consumer ID implicitly (e.g., Cell Phone number).

Upon completing the projection of an Offer, Request, the two Consumers—Consumer 1 and Consumer 2 will have projected their Offer, respectively Request in Pseudo NLT (Natural Language Text) with associated Universal Codes following specific rules, and forming Offer, Request DNA's such as:
Request DNA: 0723750010.2.23002525.0212022-1115
Offer DNA: 0723360610.1.23002525.0212022-1120

NOTE: With respect to Real Estate functionality, as a guiding Rule, the Request Pseudo NLT/DNA will reside in the Data Domain of the Real Estate Offer.
OneMany Zero Language Barrier The application of OneMany methodology to use Ontology in projecting an Offer or Request for a Product or a Service in Pseudo Natural Language Text, with associated DNA will enable global transactions with zero language barrier.

More specifically, while a user from the United Stated will project an Offer in English Pseudo NLT, and a user from Romania will project a Request for a Product in Romanian Pseudo NLT, the associated DNA's will be in the same "language":
United States OneMany Offer DNA for a Product:
0723750010.1.211.1.1311124.020.000
Romania OneMany Request DNA for a Product:
9999999999.2.211.1.1311124.020.000

Under OneMany Intelligent Business Domain, the two DNA's and their respective DNA Robots can interact unencumbered by the language difference of the 2 users, and their corresponding Pseudo NLT's.

Their own Pseudo NLT's can be used in querying them, or communicating results back to them—in their own native language, without employing any form of translation!
OneMany Unlimited Vendor Data Participation, Minimum Storage Impact Participating Vendor Data in the OneMany solution will reside at the Vendor's location (unless otherwise directed).

Participating Data will be formatted in such a way, that each Data-selection by a Consumer accessing the OneMany service, will have a DNS, and NDL associated with the selection, that will instruct OneMany "Where" (DNS) to get the next set of Data-options from, and "How" (NDL) to get it.

This is where the principle of OneMany "Wormholes" becomes evident:

A Product/Service is Defined by Categories and Subcategories.

Each Category/Subcategory will determine another set (one or more) of Subcategories. Each Category/Subcategory will have associated with it the Data Location of the Subcategories that it implies, and "How" to "Get" this Data—unless this is self-evident, or unnecessary.

The name of a Stored Procedure can for example be set to NDL, such that in the Next State, the Process will "go" to the Specified Vendor Data Location, and execute the Specified Stored Procedure. The Data returned by the Stored Procedure will be returned to and "consumed" by the OneMany Intelligent Business Domain, which will present this Data at least in part to the User_Agent in the form of a set of Text-Options. Upon the User_Agent executing a selection, Data will be returned from the User_Agent wireless device for example, to the OneMany Intelligent Business Domain. OneMany IBD will process this Data, constructing the User DNA, repeating this procedure until the User Request DNA is compleat.

This enables OneMany to offer a New Business Model/ Solution where there can be Unlimited Remote Vendor Data Participation with limited or no impact on One-Many Data Storage, while participating data can be edited, updated, added, deleted in real time, with the user being able to interact with the new data in real time.

OneMany Presentation Tier (see, e.g., Table 5 Below):

TABLE 5

OneMany Presentation Tier

Cell Phone (WAP), Computer (Internet), PDA, HDA (Home Digital Assistant), BDA (Business Digital Assistant Sample Participation in the OneMany Presentation Tier
Mobile Phone (WAP)
Internet;
Other Wireless Devices such as PDA.
OneMany Intelligent Business Domain Engine will be able to drive a wireless device as long as that device can receive text, and return text In more advanced embodiments, wireless devices such as a Business Digital Assistant, will have advanced functionality such as Intelligent Behavior capabilities, able to hold state, and engage in more advanced functionality as enabled by the OneMany Intelligent Business Domain.

Figure 3:
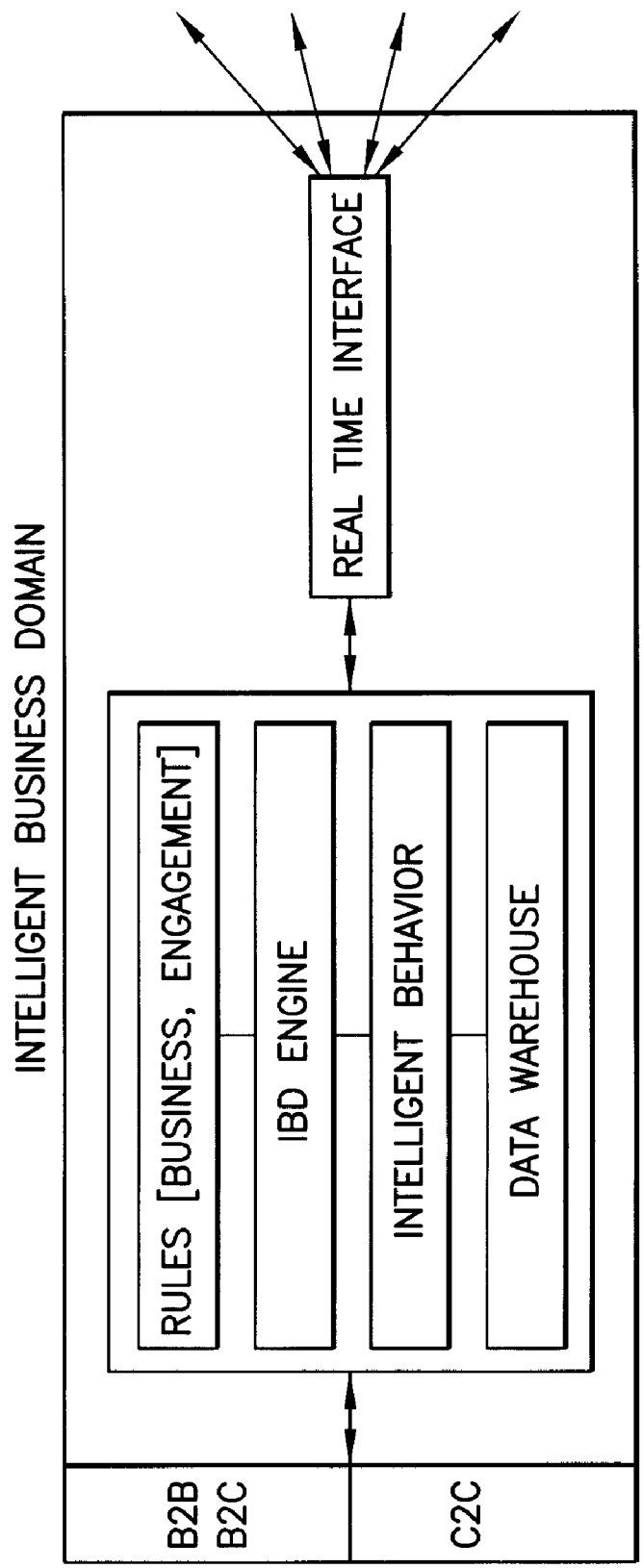

Referring now to FIG. 3, an example of a OneMany Intelligent Business Domain is shown.

IBD (Intelligent Business Domain) Engine
IBD Engine will drive the functionality of the Presentation tier, respectively the Internet, WAP, and any other wireless device which can receive text data and return text data.
The IBD Engine is Platform Independent, and ideal for SOA architecture.
IBD Engine will also communicate in Real Time with the Vendor-partners registered with OneMany Intelligent Business Domain.
IBD Engine will be the link between the User and the Vendor, serving Data to the User, handling Data returned by the User, maintaining State (although in an enhanced version, and provided a minimum of "intelligent" capabilities by the Presentation Tier (e.g., Cell Phone, PDA . . . ), State can also be maintained by the Presentation Tier), requesting new Data from the Vendor based on the Data received from the Presentation Tier.

OneMany DNA Web Page Robots
Note the IP-like projection of a Product or a Service through a OneMany DNA such as 0723750010.1. 21 .1.1111111.010.101 In the case of an "Offer", the user (Vendor Dell in this example) will be able to automatically form a web page (a OneMany DNA Web Page Robot) to further present through media (images, videos) the Product it is Offering, and to allow for additional Intelligent User-interactive functionality.

More specifically, in one embodiment, upon completing the Defining and Describing steps for a Product that is being Offered, in addition to Pseudo Natural Language Text Defining and Describing the Product or Service, the Vendor (e.g., Dell) will also be enabled to upload media files related to the Product it is Offering. The name of the web page in this example will be 0723750010.1.211.1.1111111.010.101.ASPX A DNA Web Page will make a Product or a Service Searchable, Findable, Accessible while the Offer or Request is Active. Due to its natural makeup of Keywords with a high degree of relevance to the Product or Service they are Defining and Describing, there will be a maximized degree of Precision with respect to Searching, while the degree of Recall will remain related directly and in its entirety to the scope of the search. One of the founding blocks of Artificial Intelligence and Semantic Web are "Searchability, Fundability and Accessibility".

Sample Event Handler by the OneMany Intelligent Business Domain Engine:
INITIALIZE_TRANSACTION_SCOPE
INITIALIZE_B2BB2CC2CPFS_SCOPE
GET_PRESENT_REGISTERED_VENDORS
GET_PRESENT_SELECTED_PROVIDER_ CATEGORIES
DO_UNTIL_PRODUCTORSERVICE_CAT- EGORIES_COMPLETE
END_DEFINING_START_DESCRIBING
DO_UNTIL_ATTRIBUTES_EOF
INSERT_DNA_IN_IBD_ROBOT
ACTIVATE_DNA_ROBOT B2B, B2C, C2C
Vendors that intend to Offer their Products or Services to the Consumer or other Vendors in Real Time, must be registered with the OneMany Intelligent Business Domain. In addition of the benefit of "security" for the Consumer, through the process of registering with the OneMany IBD, the Vendor will be able to benefit from the OneMany functionality of allowing the Vendor to serve its Data from its own Data Location, without have to store its own Data in the OneMany Data Domain.

By registering with the OM IBD, the Vendor will have its top level Category (e.g., "Dell"), along with the DNS, and NDL hosted by OneMany IBD. The DNS will instruct OneMany from "where" to request the next set of Data, and the NDL will provide the instruction of Data to return to OneMany IBD for "this" request.

For example, a Consumer wishing to project a Dell Request, will be able to select "Dell" directly from OneMany IBD. The Vendor-DNS and NDL for the top-level selection of "Dell" will enable OneMany to the Dell-address provided by the DNS, and Get the next set of Data-options (e.g., Laptops, Desktops, Servers) enabled by the NDL instruction. From this point on, each text-option will have an associated DNS (most likely constant with the initial DNS), and an associate NDL, as each option may determine a unique set of next-options.

Data Warehouse
Pseudo NLT;
DNA Robots;
Global Ontologies;
Vendor DNS, NDL;
Intelligent Behavior;
OneMany DNA Web Pages.
Vendor, Consumer Registration Data;
Attributes Data:
Attributes can be served directly fro the Vendor, OR they can be stored temporarily with the OneMany Data Store, until the user(s) have completed Describing their Offer/ Request. There are cases and reasons why this option can be desirable to the Vendor and/or to OneMany.
Offer, Request, Stimulation, Product/Service DNA's;

Intelligent Behavior
One of the goals of OneMany is to shift focus from the storage of massive amounts of Data to the hosting of Intelligent Behavior. There are two primary categories of Intelligent Behavior: OneMany Generic, and Vendor-Specific.

OneMany architecture will enable OneMany-Generic Intelligent Behavior, as well as Vendor-Specific Intelligent Behavior:

In the case of OneMany Generic, the Intelligent Behavior settings, as well as the functionality described by the text-description associated with the settings will be available to all users (Consumers, Vendors) as they apply to each.

In the case of Vendor-dedicated Intelligent Behavior, the Vendor and OneMany can work together to enable special purpose functionality driven by specific business needs, available only to the Vendor and/or its clients. These special-purpose modules can reside either in the OneMany Intelligent Business Domain, or at the Vendor location, or on both locations.

An example of OneMany Generic Intelligent Behavior, and the Consumer opting in for such enhanced functionality:

The consumer will finish Defining and Describing his/her Request for a Brand Product (e.g., Dell Laptop):
9999999999.2.211.1.1311124.

Assuming that OneMany is offering "this" intelligent Behavior, the Consumer will be informed that there is OneMany intelligent Behavior available for his/her DNA Robot, and whether interested to review.

If the Consumer selects "No", than the final DNA for the Product Request will be:
9999999999.2.211.1.1311124.000.000

If the Consumer selects "Yes", then in a next step the Consumer will be able to select the Option:
1 "Monitor and inform me of auctions from any Brand with similar features"
2 "Monitor and inform me of auctions from this Brand with similar features"
3 "Monitor and inform me of auctions from Generic Brands with similar features"

Taking for granted that this is the only Enhanced Behavior Option from OM at "this" point, the final DNA for the Product will look like this:
9999999999.2.211.1.1311124.200.000

Consequently, "this" DNA will have Intelligent Behavior settings, and following OneMany IBD methodology, special purpose functionality will enable the behavior as described by the User-selection.

There can be also Vendor-specific custom functionality within the scope of addressing specific business needs. Within this scope, the extent of the functionality can extend to include Automated OneMany Intelligent Business Domain-Vendor communication, with Vendor-side data analysis, such as:

"VIP Offer for $1^{st}$ Time Buyer OR VIP Buyer OR Surplus stock"
where the logic can be something along the lines:
For each request for "this" item, communicate with the Brand.
Find out if this is a $1^{st}$ time buyer
OR
If there is a surplus of stock for "this" item
OR
If this buyer has spent over $5,000 in the last 24 months.
If either true, offer this buyer a 20% reduction in price for "this" item.

OneMany Offer/Request DNA Robots
A Robot can be a "server", a process, a software executable.
A Robot can also be a server process extended with a mechanical device.

A OneMany DNA Robot is a software executable that is able to host the Product DNA, and handle specific DNA settings for Intelligent Behavior. The Product DNA may have specific settings for specific behavior.

Rules |Business, Engagement|

The interaction between compatible (Offer/Request) DNA's can follow specific Rules for Engagement.

In a most comprehensive embodiment, the Rule for engagement can be "Matching". Under this functionality, strict matching between comparable DNA settings can determine the success-factor of an interaction.

In other enhanced implementations, engagement under "Evolution Rule with Wild Cards" (see diagram below) can determine a more advanced functionality, where the users are able to "No Selection" for specific options, knowing that this will enable communication between compatible DNA's, and in some cases, they will have the option of adding the input, following a request by a potentially compatible DNA Robot. They will also have the option of adding certain wild cards as input for certain selections such as "Make me an Offer", in effect further shifting personal engagement, the burden of negotiation, and time-expenditure to an automated process, while maximizing the potential for a most desirable results.

In yet a more advanced implementation, in addition to the "Evolution Rule with Wild Cards", there is the "Artificial Intelligence Functionality". Under this implementation, the User will be able to also select Intelligent Behavior functionality, as offered by the OneMany Intelligent Business Domain, and as part of the DNA definition. In this embodiment, the DNA will have significant AI settings, which will be interpreted and acted on within specific scopes, by compatible behavior modules, hosted in the Intelligent Business Domain. As a further enhancement, OM will enable Vendor-dedicated custom Intelligent Behavior, that can be OM and/or Vendor resident, in effect allowing for business decisions/ actions as a result of maximum communication, and data consideration.

Take for example a Vendor-dedicated custom Intelligent Behavior, with automated functionality resident in OM IBD, and Vendor, AND with Vendor Data-access by Vendor-resident behavior:

| | |
|---|---|
| OM IBD: | For each request for "this" item, communicate with the Brand. |
| Vendor: | Find out if this is a $1^{st}$ time buyer |
| | OR |
| Vendor: | If there is a surplus of stock for "this" item |
| | OR |
| Vendor: | If this buyer has spent over $5,000 in the last 24 months. |
| OM IBD: | If either true, offer this buyer a 20% reduction in price for "this" item. |

Figure 4A:
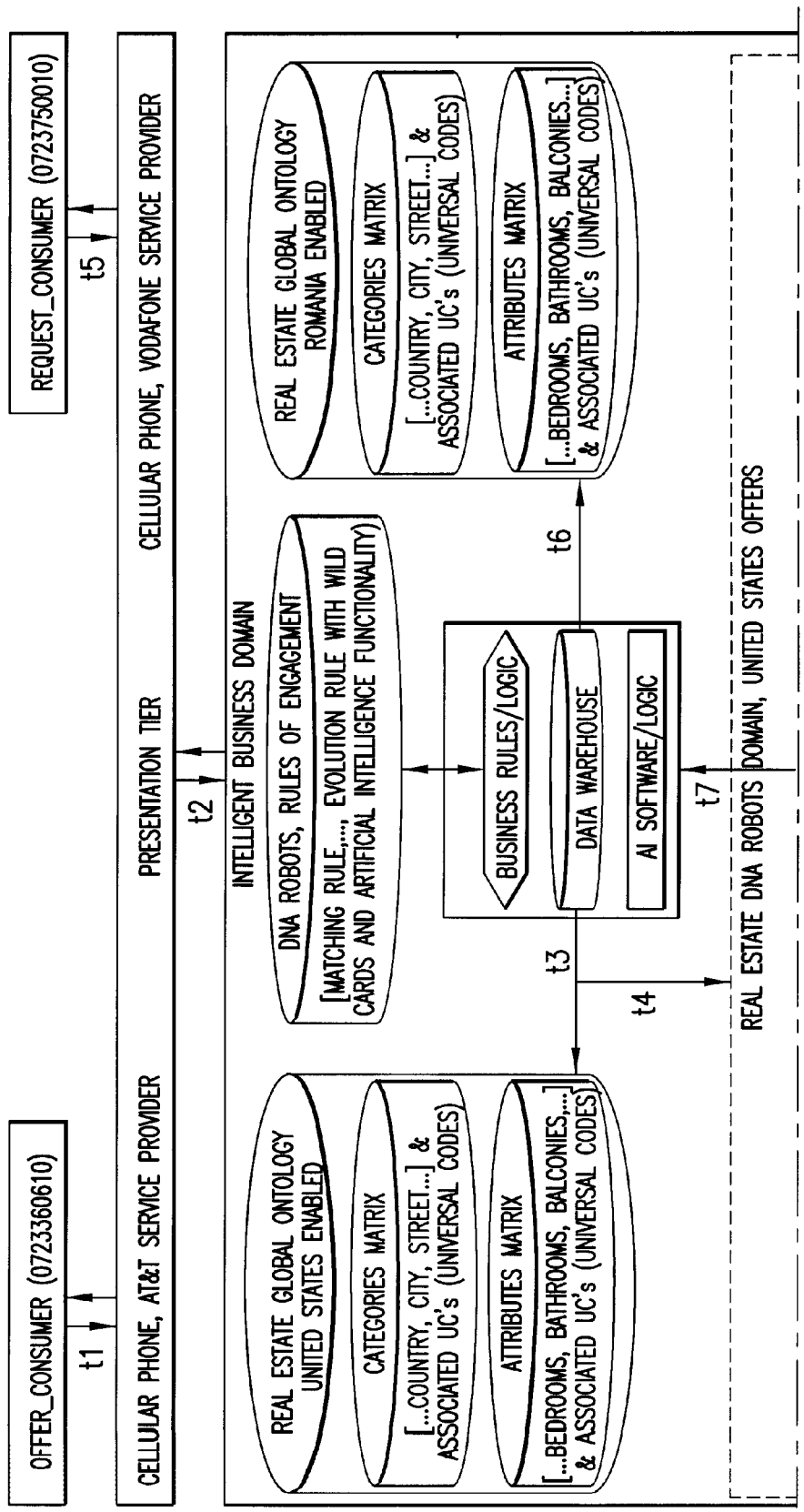
Figure 4B:
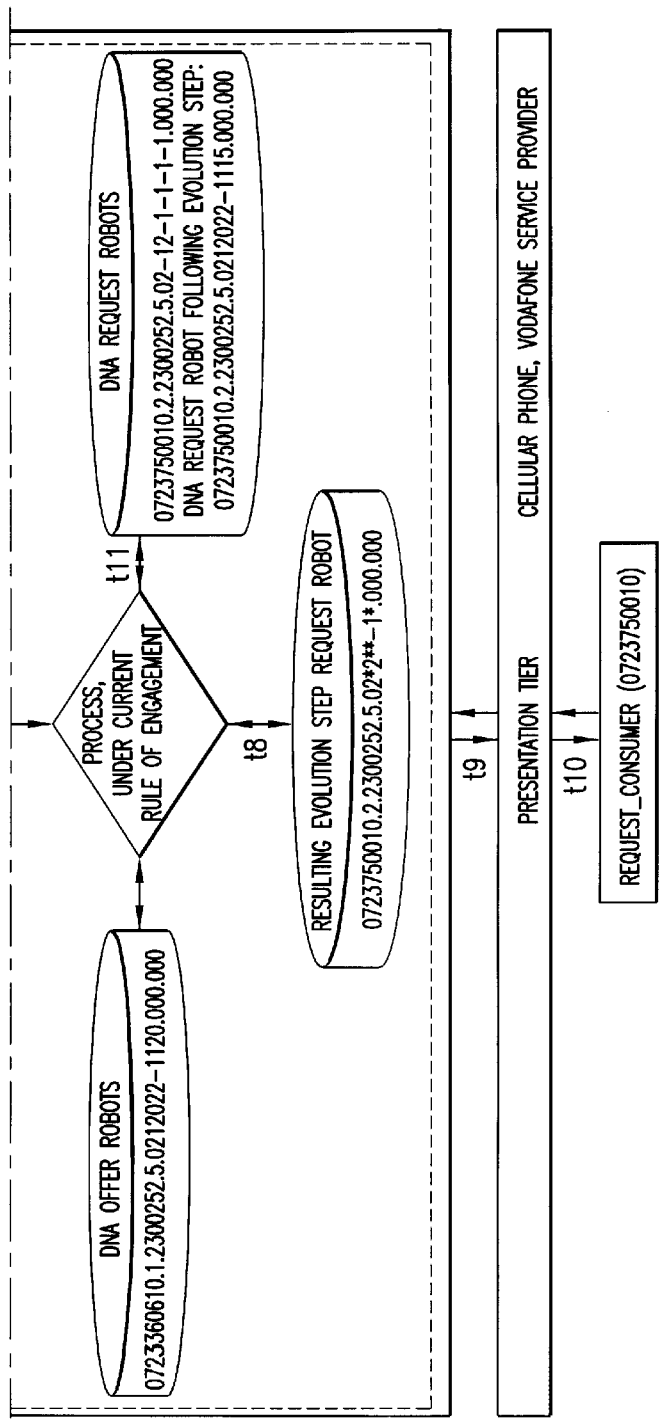

Referring now to FIG. 4, an example engagement under "Evolution Rule with Wild Cards" is shown. As seen in this Fig.:

t1: User1 located in the United States activates Wireless Device, OneMany Services
t2: Request is fired to OneMany Intelligent Business Domain for making an Offer for an Apartment in the United States.
t3: "Real Estate" is a Global Ontology, thus it is hosted and served from OM IBD.
t4: Once the Offer has been completed, it is hosted in the United States Real Estate Domain Note: At "this" point in time, there is no Active DNA Request Robot able to engage the Offer DNA Robot under the "current" DNA Robots Rules of Engagement.

t5: User2 in Romania activates Wireless Device, OneMany Services, for Requesting an Apartment in the United States.

t6: The "Real Estate" Global Ontology, hosted in the OM IBD Data Warehouse, is served in Romanian to User2, interactively.

t7: The Offer/Request DNA Robots engage under the current Rules of Engagement, using the OM IBD, Software, and Logic.

t8: The star "*" placeholders signify the UC fields for which the Request initiator will be queried to supply values.

t9: The Request initiator will be contacted vie SMS/email for example, informed of the potential positive interaction for his/her Request, and asked to supply information for the Offer initiator:

Consumer 0723750010 receives the following text message:

In your request for Real Estate, Apartment, Romania, Bucharest, Decebal, you are asked to specify the following: Square Meters, Balconies, Price
OK?

t10: In one embodiment, the Request Initiator can click on a button or a supplied link to instantiate a OM Evolution Web Robot Page. This Web/WAP page will enable the User to easily supply the desired information.

In a more simplistic approach, upon clicking 'OK', the Intelligent Business Domain will receive the OK, and return to the User the first of the attribute that has to be specified. Following repeated steps, the Request-Robot will become:

Updated Request: 0723750010.2.23002525.0212022-1115

Previous Offer: 0723360610.1.23002525.0212022-1120 t11: Following the Evolution of the Request information, the DNA is updated, the Offer DNA Robot is re-engaged, and the Request DNA Robot is hosted in the Offer DNA's Data Domain.

Real Time Interface

A significant component of the OneMany solutions is the "Real Time Interface". This is the Real-Time bridge between the OneMany Intelligent Business Domain and the "For Profit Product/Service Providers" making up the OneMany Automated Business Center.

The "Real Time Interface" between OM IBD and FPSP will allow OneMany IBD to provide a real-time functionality to the Users accessing through the OneMany Presentation Tier.

In projecting this solution, it is taken for granted that communication speed/bandwidth as it can be provided today by Network Operators makes proposed functionality possible, without a real impact on the end-user. It is also projected that the nature of the proposed solutions, in engaging the user to "think then select, think then select . . . " in projecting the Offer/Request and Defining and Describing a Product/Service, enables for the minimal time increments necessary for doing background work unnoticeable to the user.

Consider these steps:

Given: Dell is registered with OM IBD, and there is a channel for fast communication between OM IBD and Dell.

Using a cell phone and Vodafone, the Consumer opens a session with OM for projecting a Product Request.

OM IBD serves the Consumer the initialize Category for Dell, while in the background starting a session for the Consumer, and opening a channel for fast communication with Dell. OM IBD uses initialize information (Dell DNS and NDL) to obtain the next data block of options for the Consumer.

Note: the communication channel between OM IBD and Dell can be predetermined with a network operator, or another provider.

Upon the Consumer firing the Dell selection, OM IBD serves the Consumer with the next set of options.

Upon the User executing a selection, OM IBD uses the associated DNS and NDL to obtain the next data block of options determined by the user-selection.

The OM IBD serves the new set of Data options to the Consumer, while in the background performing transaction specific tasks, such as maintaining State.

This process repeats until the Consumer has finished Defining and Describing the Product.

Note: Considering that "Describing" is made up of Attributes, most often not related to each other, therefore no hierarchy, there is the option of Getting the Attributes Data Block from Dell in one Get, and serving it successively from OneMany IBD (and any other users who may be requesting the same Attributes Data block at "that" time. This is an option to OM and the Vendor—for a premium perhaps.

Figure 5:
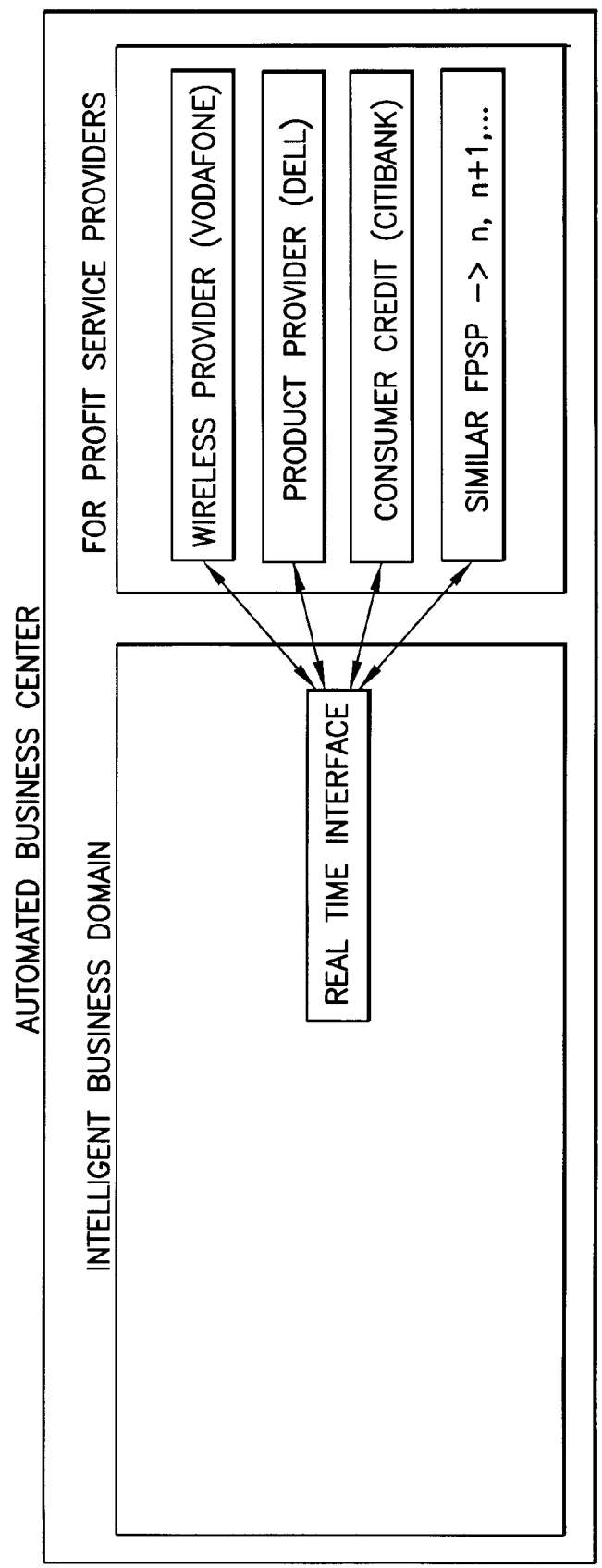

Referring now to FIG. 5, an example OneMany Automated Business Center is shown.

As seen in this Fig., the OneMany Automated Business Center is a virtual boundary defining the interconnectivity between the OM Intelligent Business Domain, registered Vendors offering products or Services, consumers offering products or services, and network operators providing accessibility.

Participation in the OneMany Automated Business Center, at a High Level:

OneMany Intelligent Business Domain;
Vendors of Product/Services (e.g., Dell, Citibank, Ebay, etc);
Network Operators (Vodafone, AT&T, Orange, Japan Telecom, etc)
Consumers (offering a product or a service).

Sample Rules for Participation in the OneMany ABC:

A vendor offering a Product or a Service must be registered with the OM IBD, providing special initialize information as required by the OM IBD (e.g., initialize DNS, NDL).

Vendor will make available data for consumption by consumers, other vendors, this data will reside at the Vendor location, and this data will be formatted taking into account OM IBD rules.

Note: the data can be formatted in variable ways (e.g., low level text format, XML, etc) but it must adhere to OM specifications in order to be compatible.

Below is a sample formatting excerpt outlined for readability (as otherwise it would be a continuous string), taken from a low-level text formatting for an Attributes-block of 4 attributes:

Attributes
|ATT:[Num_Of_Attributes=4][Attributes_Total_Num_Of_Digits=10]|
1[Name=Brand]
[Values=Blauplunkt,Pioneer,Sony.Kenwood.][Units=Str]
[UC_Order_In_String=1]UC_Length_In_Digits=1]
[Num_Of_Digits_Before_This_UC=0][UC_Range_Values=1-4]|

A communication channel with a communication-provider must be established with the OM IBD for the Real Time Interface.

A consumer may also participate a provider for Products/Services. However, in such a case, the Consumer must also be registered with the OM IBD (as opposed with just being a Consumer within the scope of just making Requests).

Vendor participation in the OneMany Automated Business Center can be virtually unlimited with little or minimal impact on OM IBD data storage, in comparison to the multitude of Vendor-data participating.

Figure 6:
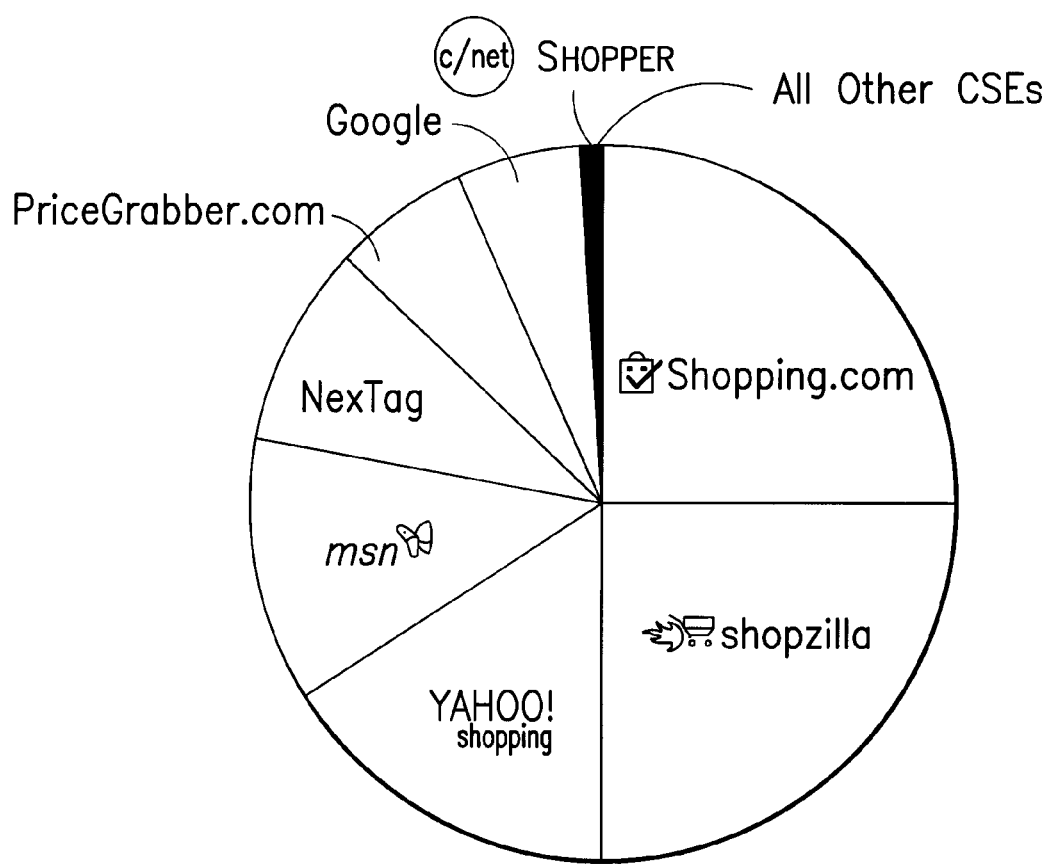

Reference will now be made to various application and use case concepts as may be applied in the context of various embodiments of the present invention:

As seen in FIG. 6, one example chart related to an Interactive Best-Price Comparison is shown. Under one example of Interactive Best-Price Comparison:

Consider current Different Types of Comparison Shopping Engines:
1. Traditional: Shopzilla, Nextag, Yahoo Shopping
2. Crawler: Pronto, MS Live, ShopWiki,
3. Pure Decision Support: Mpire.com
4. Occasion-based. Gifts.com, FindGift.com
5. Demographic/Vertical: Glam, GolfReview.com
6. Community Minded: Kaboodle, Jellyfish.com
7. Web 2.0: Stylehive
8. Visual search: Like.com
9. Free: TheFind, Google Product Search
10. Cost Per Acquisition/Order: Jellyfish.com, Shop.com Consider that each provider is distinct, with its own algorithm, it's own data formatting, its own limited audience.

What is the Ultimate Goal for a Vendor:
- Maximum audience/Findability;
- Least cost;
- Real time Data exposure/update;
- Host its Data in its own domain;
- Ease of use/Accessibility;

OneMany solutions will enable a Vendor to project a One-to-Many Offer for a specific Make and Model. Furthermore, OneMany will enable the Vendor to project the same Make and Model under a generic format, such that potential first-time customers who may be shopping for a best price and not necessarily the Brand, can be offered the same product for a reduction in order to increase customer base, affinity.

Essentials for Best-Price Comparison:
- Consumer Interest;
- Consumer must make explicit request for Best Price;
- Consumer must clarify the item he/she is interested in;
- Consumer must define return-parameters such as: time-frame; price-range, etc.
- Vendor must become aware in real time;
- Vendor must be able to respond with an offer in real time.

Case Scenario:
Vendor subscribes to OneMany Best-Price-Request alerts from Consumers;
Consumer will construct a Best-Price-Request Defining and Describing a Product under Generic Ontology:
Best Price Request-Consumer Electronics-Computers-Laptops-Processor P6-[ . . . ]-Period 10 Min All those Vendors registered for Consumer Best-Price-Request alerts, who can satisfy "Offer-Consumer Electronics-Computers" will be notified following an automated Offer DNA Robot construction and Offer/Request DNA Interaction, with all the descriptors specified by the Consumer as query fields for the Vendor. In plain English, the Consumer will be able to build a Request Defining and Describing a Product, AND uploading media files for its DNA Web Robot for an even better description, while the system will create compatible DNA Offer Robots for the qualified Vendors. The Vendors will be alerted immediately, and either through Automated Intelligent Behavior resident in OneMany and/or at the Vendor location, or through direct human interaction, the Vendor will be able to review immediately the Definition and Description of the Requested Item, and will be able to instantiate a Best-Price Offer for that Item, if able to satisfy Request.

At the end of 10 minutes, the Consumer will receive an SMS with a link to a Web Robot outlining appropriately the best 10 Offers, with the option to review and commit a transaction. This is just one embodiment from the many available under OneMany proposed architecture.

Under another example of Interactive Best-Price Comparison:
- Vendor is registered with OneMany Central Server.
- Vendor had initialized DNS & NDL defined & stored locally on Central Server.
- Vendor subscribes to "Consumer Requests for Best Price" alerts from Central Server.
- User queries Central Server for a "Best Price" for a specific or generic product or service.
- The user can construct this request either interactively with the Central Server either through multiple Selection-Query-Reply cycles with the Central Server, considering that after each user-selection, the user text selection and associated UC (Universal Code) are received by the Central Server, and the Central Server proceeds on forming the Request DNA with the UC, and the Request Pseudo NLT (Natural Language Text) with the text selection, following which the Central Server analyzes the user query, and replying with another set of text options, associated UC's—these cycles repeating until the User Request is defined, and therefore the User Request DNA and Pseudo NLT are formed.
- Note: The user can construct the best price request interactively with the Central Server alone, or with the Central Server and a Remote Vendor, through the Central Server, through the use of Remote Vendor Connection String DNS and NDL Business Rules. This can depend on the type of "Best Price Request" the user is constructing—it can be a Generic "Best Price Request" construction, case in which the interaction would be exclusively between the User and the Central Server, or it can be a "Brand" "Best Price Request", case in which the interaction would be between the User, Central Server, Remote Vendor Server, through the Central Server, with the use of Vendor-specific and defined DNS, NDL.
- The User-Central Server interaction can also be a single step, as a vendor might want to advertise a "Best Price Offer". In this case, upon the user executing the advertised "Best Price Offer" DNA (or shortcut) on his/her wireless device, this will be sent to Central Server (through SMS for instance). Upon receipt of the "Best Price Offer" DNA, the Central Server will instantiate a "Best Price Request" DNA Robot with the User's Identity and the scope set to "Best Price Request", and the rest of the settings in at least the "Category" Field, "Product Identifier" Field, "Attributes" Field, identical to the advertised "Best Price Offer" DNA (unless otherwise directed).
- In one embodiment of the solution, if the user instantiates a "Best Price Request" through the input of a vendor-advertised "Best Price Offer" DNA or DNA shortcut, to the Central Server, upon the User "Best Price Request" DNA being instantiated by Central Server, and the User "Best Price Request" DNA Robot being activated by the Central Server, the Central Server will inform through SMS for example, all the other vendors who are registered with the Central Server for "Best Price Alerts" and who qualify to satisfy "this" user request, enabling other qualified vendors to respond with "Best Price Offers" for the user. The following example will best describe:

"Best Price Request" Use Case

The user queries the Central Server for a "Best Price Request";

The Central Server start a session for the user;

The Central Server begins constructing the User "Best Price Request" DNA by recording the User ID in the User-Identity DNA Field.

Note: Depending if this is a Temporal DNA, the Central Server may also record Temporal settings in the Past, Present and Future Temporal DNA Fields.

The Central Server records the "Scope" Universal Code setting for "Best Price Request" in the DNA Field "Transaction Scope".

The Central Server begins constructing the Partial Pseudo NLT (Natural Language Text) for the user "Best Price Request" by recording the user-name for the Pseudo NLT Identity Field, any Temporal settings in Pseudo NLT if they apply, and the Pseudo NLT Scope, respectively "Best Price Request".

The Central Server has determined that the user is a consumer; hence the "Transaction Type" is "B2C" ("Business to Consumer").

(1) The Central Server inserts the Universal Code associated with the Transaction Type "Business to Consumer" to the "Transaction Type" category in the "Categories" Field of the DNA.

(2) The Central Server inserts the Pseudo NLT "Business to Consumer" in the "Transaction Type" Category of the User's "Best Price Request" Pseudo NLT.

(3) The Central Server searches the "Business to Consumer" table from the local data store and returns to the user the next set of text options and associated Universal Codes (e.g., "Products", "Services", "1", "2")

(4) The user selects "Products", sending to the Central Server the text selection and the associated Universal Code, respectively "Products" and "1", querying the Central Server for the next set of data options.

(1) The Central Server inserts the Universal Code associated with the selection "Products" to the "Business to Consumer" Relative Category in the "Categories" field of the DNA.

(2) The Central Server inserts the Pseudo NLT "Products" in the "Business to Consumer" Relative Category of User Pseudo NLT.

(3) The Central Server searches the "Products" table from the local data store and returns to the User the next set of text options and associated Universal Codes (e.g., "Consumer electronics", "1")

(4) The user selects "Consumer Electronics", sending to the Central Server the text selection and the associated Universal Code, respectively "Consumer Electronics" and "1", querying the Central Server for the next set of data options.

(1) The Central Server inserts the Universal Code associated with the selection "Consumer Electronics" to the "Products" Relative Category in the "Categories" field of the DNA.

(2) The Central Server inserts the Pseudo NLT "Consumer Electronics" in the "Products" Relative Category of User Pseudo NLT.

(3) The Central Server searches the "Consumer Electronics" table from the local data store and returns to the User the next set of text options and associated Universal Codes (e.g., "Computers", "1")

(4) The user selects "Computers", sending to the Central Server the text selection and the associated Universal Code, respectively "Computers" and "1", querying the Central Server for the next set of data options.

(1) The Central Server inserts the Universal Code associated with the selection "Computers" to the "Consumer Electronics" Relative Category in the "Categories" field of the DNA.

(2) The Central Server inserts the Pseudo NLT "Computers" in the "Consumer Electronics" Relative Category of User Pseudo NLT.

(3) The Central Server searches the "Computers" table from the local data store and returns to the User the next set of text options and associated Universal Codes (e.g., "Generic Brand Computers", "1")

(4) The user selects "Generic Brand Computers", sending to the Central Server the text selection and the associated Universal Code, respectively "Generic Brand Computers" and "1", querying the Central Server for the next set of data options.

(1) The Central Server inserts the Universal Code associated with the selection "Generic Brand Computers" to the "Computers" Relative Category in the "Categories" field of the DNA.

(2) The Central Server inserts the Pseudo NLT "Generic Brand Computers" in the "Computers" Relative Category of User Pseudo NLT.

(3) The Central Server searches the "Generic Brand Computers" table from the local data store and returns to the User the next set of text options and associated Universal Codes (e.g., "Laptops", "1")

(4) The user selects "Laptops", sending to the Central Server the text selection and the associated Universal Code, respectively "Laptops", and "1", querying the Central Server for the next set of data options.

Note: While theoretically the user can stop defining/describing a request at any point in the process, it will make sense to define/describe a request at least to the point where the user's request will make commercial sense to the vendors and the vendor will be able to perhaps respond with constructive offers.

For example, defining a request DNA such as "[ . . . ].2.111" with the equivalent/associated pseudo NLT "[ . . . ]-Request-B2C-Product-Consumer Electronics" will be an ambiguous request that may be prevented by the Central Server. More appropriately, a constructive request will be at a minimum such as:

"[ . . . ]-Request-B2C-Product-Consumer Electronics-Computers-Laptops"

Although still a bit too vague, this is the kind of request that can be absolutely constructive for someone wishing to get the absolute lowest price on a laptop, regardless of the Brand, configuration, etc.

Although the user's definition/description can be further fined-tuned with additional descriptors, for "this" product we will assume this to be the entire definition and description for User's Best Price Request, such that at the end of the User-Central Server interactive cycles, the User's "Best Price Request" DNA will be "0723750010.8.111111". The associated Pseudo NLT would be along the lines:

"John Smith-Best Price Request-Business to Consumer-Products-Consumer Electronics-Generic Brand Computers-Laptops"

In one embodiment of the solution, the Central Server will append the "Best Price" Field ".0", initialized to "0". In this example, the user will be presented with the "Best Price Offer" closest to 0. The User's "Best Price Request" DNA will become "0723750010.8.111111.0".

Central Server will query its local data store to identify all the Vendors who are registered for Consumer "Best Price Request", AND who are Offering Products, AND who are Offering Consumer Electronics, AND who are Offering Laptops.

For each of those Vendors who have been identified under the said criteria, Central Server will instantiate a Compatible "Best Price Offer" DNA Robot with the Vendor's Identity, that will result with a "Positive Interaction", that will result with the Central Server notifying each of the eligible Vendors, through SMS including a text message and a DNA Link to the User's Best Price Request DNA Web Page Robot.

The Vendors will have 10 minutes after the SMS is sent by the Central Server for example to review the User's DNA Web Page Robot, and to Offer a "Best Price" if applicable. The Vendors will be able to execute a "Best Price Offer" response directly from the User's DNA Web Page Robot.

The Central Server will centralize all the Vendor-Offers received, and at the end of the 10-minutes deadline, the Central Server will calculate the Vendor-Offer closest to "0".

The Central Server enable a "Positive Interaction" between the User's "Best Price Request" DNA Robot, and the winning Vendor's "Best Price Offer" DNA Robot.

In one embodiment of the solution, the Central Server will send the User an SMS including a text message and a DNA Link to the Vendor's "Best Price Offer" DNA Web Page Robot, where the User can review at a minimum the Identity and Contact information as well as the actual "best price" Offered by the Vendor, in effect able to initiate a transaction.

NOTE: There can be a variety of advanced functionalities within the "Best Price" scope, the one outlined above being one of the simplest embodiment.

As seen in FIG. 7, one example related to Searching: Internet/Mobile Homogenous is shown. Under one example of Searching: Internet/Mobile Homogenous:

There will be the cases when potential clients will not launch Requests or Offers for a Product. Instead, they will engage in Searches for example. OneMany enables Web Robot (e.g., dynamic web page—0723750010.1.211.1.1111111.asp) functionality associated to the projection an Offer/Request for a Product or Service, making the active Offer/Request for a Product or Service SEARCHABLE. This maximizing Findability and Accessibility—the founding blocks of Semantic Web with Intelligent Behavior!

DNA Web Robots enable OneMany to offer the user search functionality based on one or more keywords. OneMany Searching will enable powerful, no non-sense results. Consider the Pseudo Natural Language Text below associated with a Dell Offer DNA Robot, AND with the associated Dell Web Robot:

Robot Scope:
Offer a Product-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 Inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery Due to the nature of the OneMany Business Model and Architecture, only the strongest keywords entirely pertinent to the Product or Service are used in projecting the Definition and Description for a Product, and it is these Keywords and Descriptors that will make this product searchable with a maximized degree of Precision and Recall.

The consumer will be able to search from all active Offer/Request/Leads DNA Robots, and get back the Robot DNA and the accompanying Pseudo Natural Language Text Defining and Describing a Product using the keywords searched by the user. For example, the User will navigate to the following search page http://dev/bds/demo/Utilities/SearchBasedOnKeywords.aspx?sUser_ID=0723750010&sRobot_Table=OfferRoBo and execute a search on the following keywords: Dell Laptops XPS resulting with the following type of return:

Offer DNA:
1111111111.1.211.1.1111111
Pseudo Natural Language Text:
Offer a Product or a Service-[ . . . ]-Dell-Laptops-XPS M1710 Mobilize and Conquer-[ . . . ]

Upon executing the DNA Link, the user will be directed to a functionality where he/she will be presented with a power-projection of Product that is being actively Offered. In one embodiment of the OneMany functionality, the Consumer will not be disclosed Identity, Contact information for the Offering party. The Consumer will be able to evaluate the Product that is being offered, and will be able to create an Instant DNA Request Robot compatible with the Offer DNA Robot for the Product the Consumer is reviewing.

By activating an Instant DNA Request Robot, there will be an instant positive interaction between the Offer/Request DNA Robots, and SMS notifications sent to both the Consumer and the Offer-originator. Moreover, by having activated a DNA Request Robot, the Consumer can be exposed to additional positive interactions from other active Offer DNA Robots. Consider the example of FIG. 7 projecting the functionality described:
http://dev/BDS/Demo/RobotsWebSearchResultRobots.asp?sRobot=1111111111.1.211.1.1111111&sUser_ID=0723750010

Depending on the number and strength of the keywords/search criteria, the degree of the Recall of the results will vary accordingly. However, the Precision will remain constant. More specifically, the relation between Precision and Recall will not be inversely proportional as it is today. Your keywords/search criteria will determine the Recall—but your Recall will be entirely related to your search criteria/keywords.

Under another example of Searching: Internet/Mobile Homogenous:
User, Central Server Interaction:
User (consumer or vendor) accesses OneMany Search Functionality through his wireless device or laptop.
OneMany Central Server maintains state in the example. OneMany will store the User ID associated with the wireless device or account and the "Scope" of the user activity: "Searching".

Central Server queries the User for the "Scope" of his/her Search (e.g., "Offer", "Request", etc).

User selects or keys in whether he is interested to search for Active Offers or Requests for Products or Services.

User keys in on his/her wireless device the keywords relevant to the product or service the user is interested in searching for, such as: "Dell Laptops"

User executes for the search to start: —>Execute Search<—

User wireless device sends to OneMany Central Server the User ID associated with the wireless device or user account for the wireless device, along with the keywords typed in by the user, along with the "Scope" (Offer/Request) the user is interested to search for.

OneMany Central Server will perform a search using the User-typed keywords as parameters, and the "Scope" (Offer/Request) the user is interested in.

Given:

OneMany will host Active Offers or Requests DNA along with the associated Pseudo NLT.

The Pseudo NLT will contain the text definition and description of the product or service.

For the scope of this example, we will assume the user to be searching for Active Offers.

For the scope of this example, we will assume there to be at least one Active Offer satisfying the user's search criteria.

User, Central Server Interaction:

OneMany Central Server will return and present to the User the Active Offers containing the keywords searched by the user.

Note: These Active Offers represented by the transformation into OneMany DNA and described by the associated Pseudo NLT (Natural Language Text) have been formed by previous User/Vendor interaction through, and with the OneMany Central Server using one of the methods already described or to be described.

In one embodiment of the solution, the OneMany Central Server will present to the user a list of search results, featuring Partial Pseudo NLT's containing the user-requested keywords and the associated OneMany DNA's as a link to continue the transaction.

The user will be able to select/execute an OneMany DNA link in order to at least review the full details associated the Offer for example.

In one embodiment of the solution, upon the user executing the DNA link, the user will be presented with/transposed to the DNA Web Page Robot associated with the DNA Offer. The user will be able to review information associated with the Offer, such as:

Author of the Offer (e.g., Dell Computers)

Date of the Offer Activation;

Contact details (e.g., email, phone number, etc.)

Pseudo NLT Defining and Describing the product or service being offered;

Media (pictures, video, etc)

Automation functionality such that the user will be able to execute a command that will tell the OneMany Central Server to Instantiate a Compatible Request DNA for the User, for "this" Product being Offered, with the User-Identity Field value set to the User's UC Identity setting, and the Scope Field value set to "Request" Universal Code setting "2", and the rest of the DNA Fields and UC settings (e.g., Fields "Categories", "Product Identifier", "Attributes") set identical as the Vendor's Offer DNA, and for the Central Server to Activate the Request DNA Robot for "this" User, such that a Positive Interaction (e.g., "Matching" as defined by OneMany) between "this" already Active Offer DNA Robot (accessed by the user through the search) and the newly User-Instantiated Request DNA Robot occurs—this resulting in the Vendor-creator of the DNA Offer Robot being alerted of the Positive Interaction between the Offer/Request DNA Robots, and of the User's Identity and contact information through SMS for example.

In yet another embodiment, the user may be able to execute a "purchase" command, as a purchase option may be made available by the Offer-creator (e.g., Dell Computers) for execution by the User, right on the Offer DNA Web Page Robot associated with the Offer DNA Robot. In such a case, a purchase transaction may take place following User-access and review of the DNA Web Page Robot, following user-access of an Offer DNA Link, following user-execution of a search for Active Offers based on user-input keywords.

In still another embodiment, upon the user executing the Offer DNA Link, the user will be presented with the Offer DNA Web Page Robot, but the Vendor's Identity and Contact Information will be marked anonymously. For the user to be able to review the Vendor's Identity and Contact information, the Offer DNA Web Page Robot will enable functionality for Instant User-Request DNA Robot creation. The user will be able to execute a command that will query the OneMany Central Server to Instantiate a Compatible Request DNA for the User, for "this" Product being Offered, with the User-Identity Field value set to the User's UC Identity setting, and the Scope Field value set to "Request" Universal Code setting "2", and the rest of the DNA Fields and UC settings (e.g., Fields "Categories", "Product Identifier", "Attributes") set identical as the Vendor's Offer DNA, and for the Central Server to Activate the Request DNA Robot for "this" User.

Upon activation of the Request DNA Robot by the OneMany Central Server, there will be a Positive Interaction (e.g., "Matching" as defined by OneMany) between "this" already Active Offer DNA Robot (accessed by the user through the search) and the newly User-Instantiated Request DNA Robot.

As a result of the Positive Interaction between the Offer/Request DNA Robots, the Central Server will send the User an SMS in real time, informing the user of the Offer-creator's Identity and Contact information at the least. This can be accomplished by the Central Server by either sending the information directly through SMS, or sending an Offer DNA Link for the Offer DNA Web Page Robot through SMS, or sending a combination of text message and Offer DNA Link through SMS.

Upon receiving the SMS/email in real time, the user will be able to execute the Offer DNA Link, and access the Offer DNA Web Page Robot. Immediately, the Offer-creator's Identity and Contact information will be revealed to the user through the Offer DNA Web Page Robot.

Figure 8:
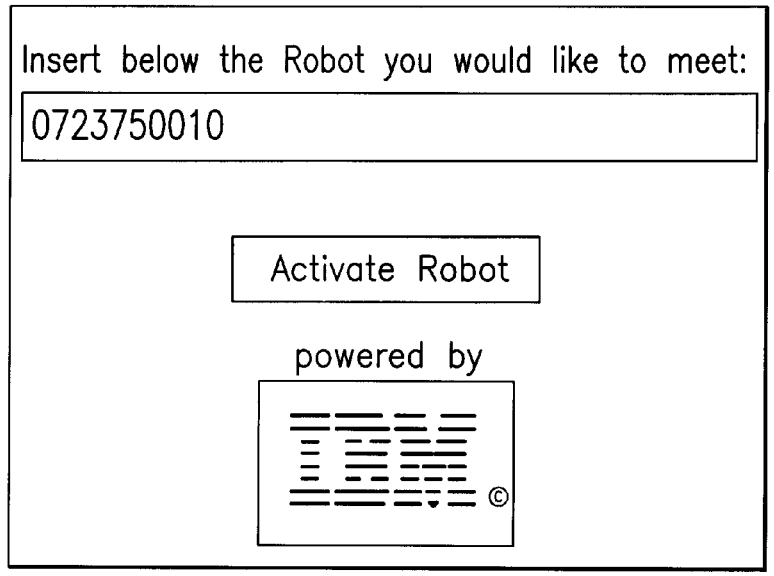
Figure 9:

As seen in FIGS. 8 and 9, examples related to MOBILE MARKETING, WIRELESS ADVERTISING are shown. Under these examples of MOBILE MARKETING, WIRELESS ADVERTISING:

Consider for example "Mobile Marketing" where the message/first contact is generated by the consumer. The marketer creates an advertising campaign utilizing an outside prompt delivered via radio, TV, product packaging or other media.

OneMany enables functionality such that a user is allowed to input the "identity" of an active DNA Robot (see FIG. 8) within the scope of activating an "instant" Compatible DNA Robot, with the identity of the user's. Considering an advertising campaign utilizing an outside prompt delivered via radio, TV, product packaging or other media, the user in can respond by "executing" the robot outlined in the media campaign. There are a number of reasons why this particular functionality would be especially beneficial for the marketeer. The outcome resulting from DNA Robot-interactions depend only on the limiting factors introduced in the Offer DNA Robots by the marketers, as it is described below.

Consider a case scenario where a Vendor (i.e., Dell for example) will be able to create a Product/Service Intelligent Active Offer DNA Robot, with the following DNA for instance:

```
0723750010.1.211.1.1111111.010.101
     Offer      Attributes: All settings in blue are Attributes describing
                            Processor, Memory, etc.
        ↑       ↑
0723750010.1.21  .1.1111111.010.101  → The last six settings represent
                                        Artificial Intelligence
     ↓      ↓↓   ↓                      Behavior
Dell ID B2CDELL XPS M1710 Mobilize and Conquer
```

Now consider that Dell will be able to associate the Product DNA above to an Advertisement, for example the Dell image (see FIG. 9).

Next, the User (Consumer, or Vendor) will be able to click on the Dell image as he/she would click on a hyper link. Upon clicking on the Dell image, the User will be exposed to a number of functionalities such as:

1. There will be a matching Active Request DNA Robot instantiated with the User's Identity, and compatible Scope (e.g., Request): 9999999999.2.211.1.1111111.000.000
2. There will be the automated engagement of the Vendor's and the User's Active Offer/Request DNA Robots, as there can be a One (Vendor) to Many (Users) relation between Active Offer/Request DNA Robots.
3. The User will be sent an SMS with a link to the Web Robot projecting the interactive special Offer from Dell.
4. Due to the User's Active Request DNA Robot satisfying the Vendor's Active Offer DNA Robot, the Vendor will be notified:
   Active Request(s) for your Offer within the scope of: Dell
   Your following Offer was engaged in the match.
   Dell, XPS M1710 Mobilize and Conquer
   Select Claudia Schiffer to review the details of the Request Robot.
   Select Razz Van Serbanescu to review the details of the Request Robot As the Vendor is notified, the Vendor becomes aware of the User's Identity, at least to the extent that the User's Identity is exposed by OneMany: Name; Telephone Number; Email address; etc. Through an Automated process (e.g., DNA Offer Robot), or in person, the Vendor can contact directly the User for the purpose of Offers—special or otherwise, as the Vendor can be particular and personalize each Offer, taking into account for example if the User is a potential first time customer with the Vendor. The Vendor can also derive Statistics from the User-driven Marketing/Advertisement response.

The Vendor can have an Automated Process as part of the Intelligent Behavior associated with the Vendor Offer DNA Robot resident in the OneMany Intelligent Business Domain or resident in the Vendor Domain that can do all, or any of the above.

Under another example of MOBILE MARKETING, WIRELESS ADVERTISING:

Given:
   Brand company will create an Offer DNA Robot using a methodology previously described.
   Brand company Dell will project an advertisement (such as a static image) during a popular event, such as American Idol.
   Brand company Dell will negotiate with the event organizers to have a "Dell Laptops Special Offer" image appear on the OneMany voting page served by the OneMany Central Server during the American Idol voting event "Female Best Vocals" for the duration of the event, 10 minutes for example.
   Brand company Dell will also negotiate with the event organizers that the Dell advertisement will be user-interactive, such that the user voting in the "Female Best Vocals" event will also be able to interact with the advertisement besides reviewing it.
   As a sample Business Rule, American Idol event organizer will impose on the Brand company that when the user-voter is finished interacting with the advertisement, the user will be returned to the voting event "Female Best Vocals" page if the user was detoured by the advertising-image during the user-interaction with the advertisement.
   The Brand company Dell will enable the user to click on the advertisement in order to be able to review special offers in real time, and in order to obtain special offers in real time, and in order to commit/purchase special offers in real time.

User Interaction:
   User is reviewing American idol on TV. User is informed through the program he/she is watching to key in a shortcut through the wireless device (e.g., cell phone) to access the I't voting event for American Idol, "Female Best Vocals" for the first 10 minutes.
   In one embodiment of the solution, the user will key in the short-code and send an SMS to the specified hot-number.
   As a reply, the user will receive an SMS (either from the OneMany Central Server or from American idol) with a link, which he will be able to click on.
   The User/User's wireless device will also receive as part of the link a "Partial DNA", such as: "111111111.3.3"
   Upon clicking/executing the link, information will be sent by the User's wireless device to the OneMany Central Server, such as:
      User ID (e.g., wireless device, or user account ID for instance)
      American Idol partial Voting Event DNA: "111111111.3.3"
   The Central Server will interpret the Partial Voting DNA extracting:
      Identity Universal Code "111111111" from the Voting Event DNA Identity Field "1111111111" as the event-organizer OneMany Unique ID;
      Universal Code "3" associated with Transaction Scope "Wireless Voting" from the "Transaction Scope" Field ".3";
      Universal Code "3" from the second Voting DNA Field ".3", associated in the local "Wireless Voting" table with the current active event organizer, "American Idol";

OneMany Central Server special purpose module will create a "Wireless Voting" session for the user, and will instantiate a partial Wireless Voting DNA for the user, using the user's identity and the remaining DNA Fields from the American Idol partial Voting DNA, resulting in "0723750010.3.3"

Next, using the Scope of the transaction "Wireless Voting" associated with Universal Code "3" extracted from the American Idol Partial OneMany Voting DNA, and the American idol Unique ID "1111111111" extracted from the American Idol Partial OneMany Voting DNA, OneMany Central Server will be able to extract from a local database, the "initialize" information for American Idol.

OneMany Central Server will extract the DNS and the NDL associated with American idol, as a registered service provider.

The DNS will tell OneMany Central Server the exact address and credentials for data access remotely from the American Idol data store.

The NDL will tell the OneMany Central Server what business rule to execute in order to obtain/get the next set of data from the remote server of American Idol.

In this example, NDL has been set to the name of a stored procedure that is defined in the remote data store of American Idol and that will get/return a set of data when it is executed.

OneMany Central Server will execute a request using the American Idol DNS, asking American idol to execute the stored procedure named by the NDL setting.

American Idol data store will receive, and authenticate the OneMany Central Server data request.

Following successful authentication, American Idol data store will execute the stored procedure named by the NDL.

The data returned by the stored procedure will be sent back to the OneMany Central Server.

Given:
In one embodiment of the solution serving certain use cases, the Central Server setting for the NDL will remain constant, set to the name of the same stored procedure. In order for American Idol to return different sets of data at different times—"timing" being the determinant factor for American Idol business model, American Idol will define one stored procedure that will return different sets of data as a function of when it is invoked. More specifically, on date "x" between the hours of 9.00 PM and 9.10 PM, the stored procedure will return data relevant to the "Female Best Vocals" event. Between 9.00 PM-9.10 PM, the same stored procedure may return data for a next category, such as "Male Best vocals", and so forth.

Figure 10:

Because American Idol has made an advertising deal with Dell Computers for an interactive ad-spot during the event of "Female Best Vocals" between 9.00 PM and 9.10 PM, the American Idol data returned by the NDL stored procedure, will also contain data relevant to the Dell Computers interactive ad, between 9.00 PM and 9.10 PM. Sample formatting of the data relevant to the Dell interactive ad:

[ . . . ]*Ad Intro*Voting Even Sponsored By:*Image*Dell.Ipg*Web Robot*2222222222.1.111.1.111.ASPX This Will Tell the OneMany Central Server:
There is an advertisement for "this" display page.
The ad message readable by the viewers is: "Voting Event Sponsored By:"
There is an image following the ad message
The name of the image is "Dell.Jpg"
The image is hyperlinked to a Web Robot page
The name of the Web Page Robot that will be activated upon user execution is: "2222222222.1.111.1.111.ASPX"
The data returned by the stored procedure (identified by the NDL setting) from the American Idol remote data store, is received by the OneMany Central Server.
The Central Server will access this data and present it to the user in user-friendly format, through the presentation tier wireless device.
The user will be able to view the Dell Computer advertising image (see FIG. 10).
The user will also be able to click on the advertising image and execute functionality associated with "this" advertising image.
There can be a range of functionalities associated with "this" interactive advertisement, such as:
In one embodiment of the solution, upon the user clicking on the Dell image advertisement, the OneMany Central Server will instantiate a Request DNA Robot partially identical with the Dell DNA Offer Robot, setting the User's Identity to the newly instantiated DNA Request Robot. This will be followed with a positive interaction ("Matching" as defined by OneMany Central Server for example) between the two Offer/Request DNA robots. This will be followed with at least one SMS sent by the Central Server to the user for example, informing the user of the positive interaction/Special Offer from Dell, and enabling the user to click on a link to review the DNA Offer Web Robot page associated with the Dell DNA Offer robot, allowing the user to review in details the Special Offer made by Dell, along with the proper contacts, and even enabling the user to commit a purchase in real time.
In another embodiment of the solution, upon the user clicking on the Dell image advertisement, the OneMany Central Server will instantiate a Request DNA Robot partially identical with the Dell DNA Offer Robot, setting the User's Identity to the newly instantiated DNA Request Robot. This will be followed with a positive interaction ("Matching" as defined by OneMany Central Server for example) between the two Offer/Request DNA robots. This will be followed with at least one SMS/email sent by the Central Server to Dell, informing Dell of the positive interaction/interest of the user, and enabling Dell to review identity, contact information for the user. This can be followed by special offers from Dell through direct contact, or automated contact, taking into account for example such cases when the user is a first time buyer, or a VIP customer.
In yet another embodiment of the solution, upon the user clicking on the Dell image Given:
A remote vendor such as Dell computers, who is registered with OneMany Central Server, and who offers products/services through the OneMany Central Server, will have its unique OneMany ID registered with OneMany.
Such a remote vendor will also have initialize DNS and NDL defined and stored locally to OneMany Central Server (DNS and NDL define din the previous sections)
In most cases there are at least two types of "Scope" remote vendor data can participate in: Offer and Request.
The User (Consumer or Vendor) can use the Remote Vendor Data to construct requests for vendor products/services, while the vendor can use the remote vendor data (its own) through the OneMany Central Server to construct Offers for its own product/services.
Consequently, it can make good business sense for the vendor to have at least two Initialize-Rules (two distinct NDL's) defined locally at the OneMany Central Server.

The vendor can also have two (or more) initialize DNS defined at the OneMany Central Server associated with the two NDL's.

The logic for this would be to enable the user constructing a request to have access to only a subset of the remote vendor data, while the vendor constructing offers, to have access to perhaps more vendor data invisible to the user, enabling the vendor to construct certain special offers or to enable certain consumers to construct privileged requests.

NOTE: In other embodiments, you can enable three or more Initialize Rules, enabling consumers for example to have access to a certain set of data for constructing Requests, while other vendors will have access to a different set of data to construct perhaps privileged wholesale requests, while the Vendor will still be able to have access to yet another set of data—perhaps a superset of all the data inaccessible in whole to all other consumers, or vendors. In this example we will enable privileged consumers to have access to some of the same data the vendor will have access to for constructing Offers.

In this case, the users constructing requests interactively with the Vendor data through the Central Server will be served by one type of Vendor Initialize DNS and NDL, while the Vendor itself constructing Offers interactively through the Central Server will be served by the second type of initialize DNS and NDL rule registered with the OneMany central Server. This will become clearer in the continuation of the use case.

Therefore, in this example Dell will have a partial DNA Offer Robot associated with the Dell advertising image.

Upon the user clicking on the Dell image, the OneMany Central Server will instantiate a Partial Request DNA with the User's Identity set in the Request DNA Identity Field, the "Scope" Filed set to the Universal Code associated with "Request", and the remainder of the Partial Request DNA identical to the Offer DNA's Fields Defining and Describing the Product, such as in the following example:

Dell's Partial Special Offer DNA associated with the advertising image:

"2222222222.7.111111.1."

Note: UC "7" setting is defined locally to OneMany Central Server, and is associated with the Scope "Special Offer" (in this example). OneMany Central Server defines that "Special Offer" is compatible with "Request", therefore a "Special Offer" DNA Robot can have a positive interaction with a "Request" DNA Robot.

The User's Partial Request DNA instantiated by the Central Server following the user clicking on Dell's advertising image:

User's ID     DNA Fields, UC settings replicated from the Special Offer DNA

↓     ↓

0723750010.2.1111.1

↑

User Scope set to "Request" by Central Server

The Central Server will now start a "User-interaction" simulation process within the scope of tracking the Product Definition settings set by Dell in the Partial Special Offer DNA, within the scope of presenting the user with the next set of options that the user would be able to select from following the last pre-determined choice and therefore setting from the Partial Special Offer DNA. For the scope of this example, the last pre-determined option imposed by Dell is the Universal Code setting in this last Field of the Partial Special Offer DNA ".1". This last field represents the "Product Identifier" Field, and it was pre-set to Universal Code "1" with the associated text value "XPS Mobilize and Conquer".

The Central Server will now start a virtual "User-interaction" process by extracting the Vendor ID and "Scope" from Dell's Partial Special Offer DNA, respectively "2222222222" for ID and "7" for Offer (Special Offer).

Based on the Vendor ID and Scope, Central Server will extract from its own local data store the Initialize DNS and NDL for Vendor Dell with the Scope "Special Offer" (remember that only the Vendor has access to Initialize information within the Scope "Special Offer").

Note: When the Vendor (e.g., Dell Computers) created the Partial Special Offer DNA Robot, a Partial Pseudo NLT (Natural Language Text) associated with the DNA settings was also formed. For the duration of the active advertisement by Dell, while the Partial Special Offer DNA Robot is associated with the interactive advertising image, the Partial Special Offer DNA as well as the associated Pseudo NLT are stored locally within the Central Server.

The Vendor's (e.g., Dell Computers) Partial Special Offer DNA can be represented such as:

"2222222222.7.111111.1"

While the associated Pseudo NLT would be formed of the keywords:

"Dell-Special Offer-Business to Consumer-Product-Consumer Electronics-Computers-Dell-Laptops-XPS Mobilize and Conquer"

Also as this is a Partial DNA, there will be a "DNS" and "NDL" associated with the last setting "1" in the last DNA Field ".1" stored within the Central Server while the advertisement is active.

Central Server will commence to create a Partial DNA for the User, with the User's identity and the Scope set to Request. This will be accomplished by making a local copy of Dell's Partial Offer DNA, replacing Dell's Identity-setting "2222222222" in the Identity Field of the Partial DNA with the User's identity "0723750010", and by replacing Dell's Scope of "Special Offer" "7" from the Scope field ".7" with the User's Scope of "Request" respectively "2". The "Categories" Field settings ".111111" will be left unchanged. The "Product Identifier" Field setting ".1" will be left unchanged.

The new Partial Request DNA "0723750010.2.111111.1" will be assigned to the User for the "current" user session, hosted by the Central Server.

Next, Central Server will commence to create a Partial Pseudo NLT for the User with the User's Identity and the Scope set to "Request".

This will be accomplished by making a copy of Dell's Partial Pseudo NLT (associated to Dell's Partial Special Offer DNA), replacing Dell's Identity-setting "Dell Computers" with the user's identity "John Smith" and by replacing Dell's Scope of "Special Offer" with the User's Scope of "Request". The "Categories" Field settings, and the "Product Identifier" setting will remain unchanged, rendering a Pseudo NLT such as:

"John Smith-Request-B2C-Product-Consumer Electronics-Computers-Dell-Laptops-XPS Mobilize and Conquer"

This new Partial Pseudo NLT will be assigned to the User for the "current" user session, hosted by the Central Server.

At this point, the Central Server has instantiated a Partial Request DNA for the User with the User-Identity Field value set to the User's UC Identity setting, and the Scope Field value set to "Request" Universal Code setting "2", and the rest of the DNA Fields and UC settings (e.g., "Categories", "Product Identifier") set identical as the Dell Partial Special Offer DNA.

At this point, the Central Server has instantiated a Partial Request Pseudo NLT for the user with the User-Identity set to the User's name, and the Scope set to "Request".

Next, the Central Server will enable the user to complete the newly formed Partial Request DNA by using the Vendor's DNS and NDL associated with the last Vendor-setting in the Vendor's Partial Special Offer DNA (e.g., "1" for the "Product Identifier" Field), to access the Vendor's data store, and to obtain the next set of data options Defining or Describing "this" product.

The Central Server will receive this data from the remote vendor, and will present this data to the user.

Upon the user making a selection on his wireless device, the text selection and the Universal Code associated to the text selection will be sent from the presentation tier to the Central Server.

The Central Server will add the UC associated with the user text selection received from the presentation tier, to the User Partial Request DNA.

The Central Server will add the user text selection to the partial pseudo NLT associated to the partial request DNA.

The Central Server will determine if there is more data to be presented to the user from the Remote Vendor data store.

The Central Server, having deter mined that there is no more data to be obtained from the Remote Vendor (e.g., Dell Computers) the Central Server will have completed the User Request DNA and Pseudo NLT, storing them locally to the Central Server.

The Central Server will/may now Activate a User Request DNA Web Page Robot.

The Central Server will/may now Activate a User Request DNA Robot.

Central Server will evaluate there to be a Positive Interaction between Dell's Special Offer DNA Robot and the newly activated User Request DNA Robot.

At a minimum, Central Server will send to either the User or Dell (or both) notification (e.g., SMS, email, etc) of the Positive Interaction, along with Identity and Contact information, and the option to review the Product definition, Description, associated media files if any.

The transaction can also be enabled by Central Server to be a sale-purchase transaction. Note: Must also give the "standard" example!

Reference will now be made to an example of INSTANT-DNA FUNCTIONALITY:

Given:
An Offer DNA Robot is already active in OneMany Central Server (e.g., "1111111111.1.111111.1.1111111");
An advertisement projects a special offer for a product or service using an outside prompt such as TV, radio, publications, etc.

User, Central Server Interaction:
User accesses OneMany Central Server Instant DNA Robot Functionality.
User keys in his cell phone the OneMany Offer DNA advertised by the brand company:

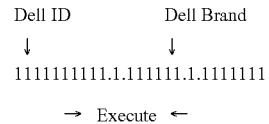

Given:
User ID is "0723750010", the ID is associated with the identity of the cell phone the user is using, or the identity of the user assigned to the user account "this" cell phone is accessing.

Upon the User "executing" the advertised Vendor Offer DNA, the User ID and the advertised DNA inserted by the user are sent to the OneMany Central Server.

The OneMany Central Server will Instantiate a Compatible Request DNA for the User, for "this" Product being Offered, with the User-Identity Field value set to the User's UC Identity setting, and the Scope Field value set to the "Request" Universal Code setting "2", and the rest of the DNA Fields and UC settings (e.g., Fields "Categories", "Product Identifier", "Attributes") set identical as the Vendor's advertised Offer DNA, and subsequently executed by the user.

Note: With respect to the "Compatibility" OneMany DNA's, and subsequent "Positive Interactions" between OneMany DNA's, and as deemed by OneMany Central Server, two or more DNA's are "Compatible" if at least the "Scopes" are "engageable". More specifically, an "Offer" Scope with Universal Code "1" will be "Compatible" with a "Request" Scope with Universal Code "2". An "Auction" scope will be compatible with a "Bid" scope. When two or more "Compatible" DNA Robots engage, a "Positive Interaction" will result.

To put this further in perspective, consider that the advertised OneMany DNA 1111111111.1.111111.1.1111111 represented the OneMany DNA translation of the following compounded text expression:

"There is an active Offer from Dell for a Consumer Electronics Product within the scope of Business to Consumer. The Product offered is a Computer from Dell Computers. The Computer is the Laptop "XPS M1710 Mobilize and Conquer", with the following configuration: Processor Pentium 500 GHz, Memory . . . . "

Upon the user executing the advertised OneMany Offer DNA on his/her wireless device, the OneMany Central Server receives the data sent by the user's cell phone—respectively, the advertised OneMany Offer DNA, the User ID and the "Instant DNA" instruction.

The OneMany Central Server instantiates a Compatible Request DNA with the User-Identity Field value set to the User's UC Identity setting, and the Scope Field value set to the "Request" Universal Code setting "2", with at least some DNA Fields and UC settings (e.g., Fields "Categories", "Product Identifier", "Attributes") set identical to the Vendor's Offer DNA, in order to enable a Positive Interaction between the two Offer/Request DNA's.

The compounded text expression of the User-Instantiated Request DNA translation is approximated in natural language below:

"There is an active Request from John Smith for a Consumer Electronics Product within the scope of Business to Consumer. The Product requested is a Computer from Dell Computers. The Computer is the Laptop "XPS M1710 Mobilize and Conquer", with the following configuration: Processor Pentium 500 GHz, Memory . . . ".

Using the User-Instantiated Request DNA, OneMany Central Server will activate the User Request DNA Robot.

Considering that the two Offer/Request DNA Robots are Compatible, and considering that the Request DNA Robot was activated in response to the advertised Offer DNA Robot, a Positive Interaction (e.g., "Matching" as defined by OM Central Server in this case) will occur between the advertised Offer DNA Robot and the newly instantiated user Request DNA Robot.

More specifically, there will be a proper user request for the specific product offered through the advertised DNA.

In one embodiment of the solution, upon the OneMany central server determining the "Positive Interaction" (e.g., OneMany "Matching") between the advertised Offer DNA Robot and the user Request DNA Robot, at least the author of the advertised Offer DNA, respectively Dell Computers, will be informed through SMS, or email, etc, of the User's Request, Identity, Product Requested, for example.

Through an automated process, Dell will have the opportunity to evaluate the Identity of the Requesting User, and respond with a Special Offer for example, if Dell determines this to be warranted—by obtaining the User ID and User Name, Dell can determine the user to be a First Time Buyer, and decide as a result, to offer "this" user 20% off.

From this point on, Dell can contact the user in person to finalize the transaction OR Dell can automate an Offer projected by a OneMany Offer DNA Robot, with an accompanying Offer DNA Web Page Robot.

At this point, consider functionalities such as:

Dell can execute a Special Offer to the User through the OneMany Central Server such that:
1. The user is able to receive SMS;
2. The user is able to click on a link to navigate to a page to review contact information, details about the product, special offer, media files associated with the product;
3. The user is able to click to execute acceptance for the offer;
4. The user is either offered, followed by info-gathering page for the financial transaction OR
   The user inputs sum/OR acceptance of the sum, executes acceptance and the rest is taken care of by OneMany internally.

Figure 11:
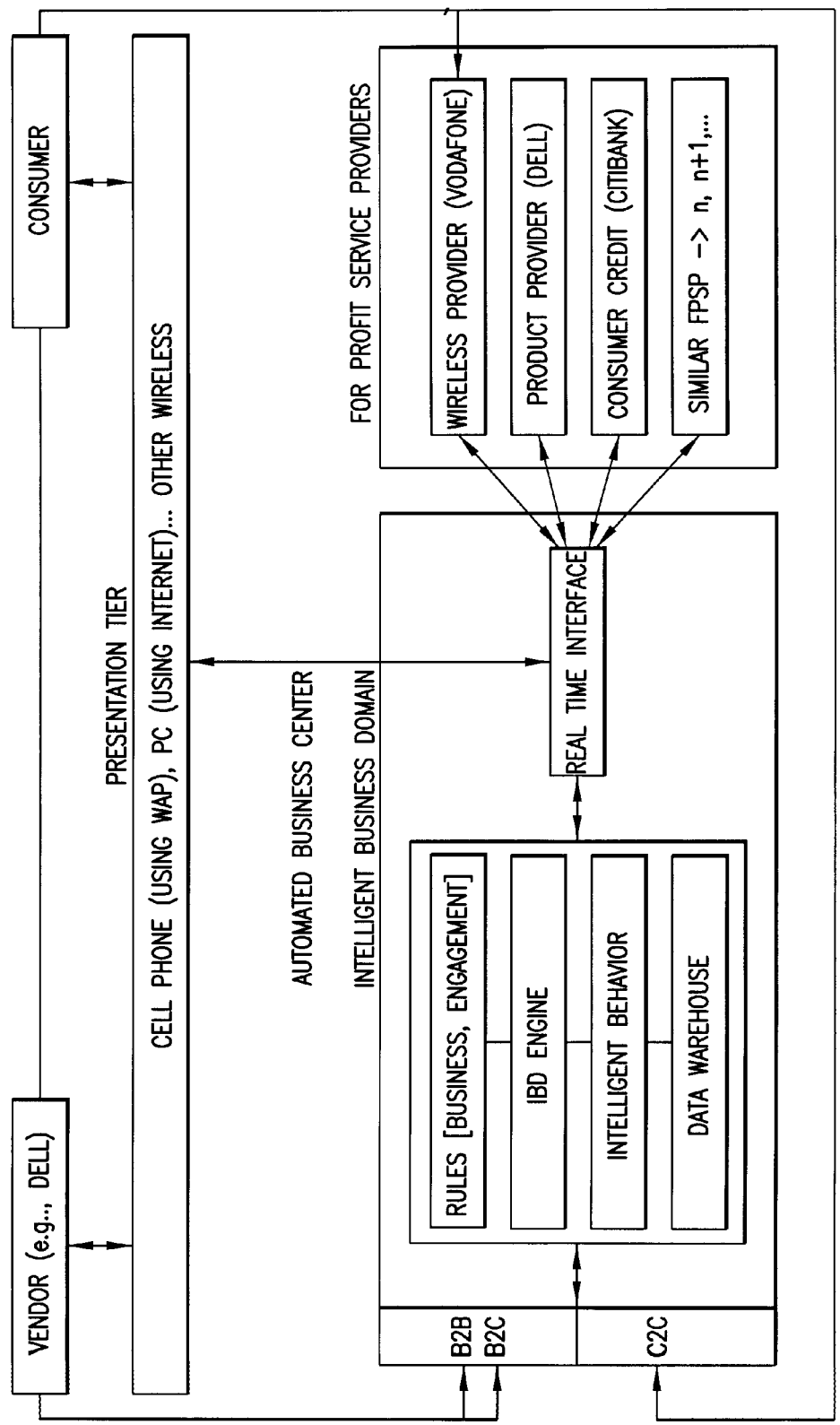

As seen in FIG. 11, one example related to an overview of Offer/Request is shown. Under one example of Offer/Request:

Use Case:
Consumer is registered with Wireless Provider, Vodafone;
Vendor Dell is registered with the OneMany Intelligent Business Domain as a FPSP (For Profit Service Provider)
Using a Cell Phone and WAP, Consumer is able to interact with the Product Provider Dell through the OneMany Intelligent Business Domain.

Using the Presentation Tier, and the Intelligent Business Domain, the Consumer is able to construct a Request based on the Product Provider Dell Data.

The Request will Define and Describe a Product such as:
Request a Product or a Service-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery Vendor Dell May or May have Already Created and Offer Defining and Describing a Product Such as:
Offer a Product or a Service-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery There are a Number of Ways that the Vendor can Project an Offer, Such as:
One Rule can offer the functionality such that a Consumer will only be able to select and construct a Request based on availability. Once a DNA Request Robot is completed, a DNA Offer Robot will be instantiated, informing the Consumer and the Vendor (among other things) of the positive Offer/Request interaction, enabling the Vendor to take additional steps leading to a purchase transaction.

Another Rule, there will be no correlation between the Consumer's ability to project Product-Requests based on Vendor-Options, and the availability of such Products. The Vendor will create Product DNA Offer Robots independently.

Considering either of the options listed above, OM will offer functionality such as, the Vendor can act as a Consumer, sitting by the pool-side, and creating a Special-Offer DNA Robot in advance, or in response to a Consumer Request, in Real Time.

Note: A Vendor serving Products or Services to Consumers or other Vendors is registered with the OneMany Intelligent Business Domain prior to being enabled to act as a Product Provider.

Under another example of Offer/Request:
The scope of this solution is to enable Users (e.g., Consumer, Vendors) to project an Offer or a Request for a Product or Service, with the goal of finalizing a Transaction if a Transaction is possible, in the least time, with least effort, at minimum cost.

OneMany has identified the essential distinct non-homogeneous components that contribute directly or indirectly to a successful transaction, modeling them into a finite unified structure, enabling the environment such that two or more such unified structures with compatible scopes (e.g., Offer/Request) will "gravitate, attract, and interact" with each other within the scope of realizing a transaction in least time with most efficiency, with zero or minimal user involvement. OneMany will enable unlimited Vendor-Data participation with minimal or no impact on OneMany Data storage.

Some Essential Components Defining and Describing a Product and Characterizing an Offer/Request Transaction:
  3D Timing;
  User Identity;
  Scope of the Transaction;
  Product Identity;
  Product/Service Definition;
  Product/Service Description;
  Metadata;
  Language (e.g., English, French, etc);
  User Intended Action/Reaction, under different conditions, in successive cycles.
Resulting OneMany Unified Structure: OneMany DNA
Sample Offer DNA for a Product: 0723750010.1.2111.1.111111.010.101

```
        Offer   Attributes: All settings in blue are Attributes describing
                               Processor, Memory, etc.
            ↑        ↑
0723750010.1.21   .1.1111111.010.101  →  The last six settings represent
    ↓         ↓ ↓    ↓                    Intelligent Behavior settings
  Dell ID  B2CDell XPS M1710 Mobilize and Conquer
```

Within the broader sense of the Offer/Request scope the Vendor and the Consumer will be offered the following functionalities:
1. Business-to-Business
2. Business-to-Consumer
3. Consumer-to-Consumer Starting from the premise that a Product, Service, Stimulation can have an Ontology-projection, OneMany Intelligent Business Domain will enable the Consumer and the Vendor to engage in at least two types of transactions:
  Brand Specific:
    A Brand Ontology is the matrix Definition and Description for a Product/Service, as determined by the Brand Vendor. Consider the following high level sample projection of a Brand-Ontology:
    Dell-Laptops-Product Identifier-Processor-Ram-Hard Drive-[ . . . ]
  Generic:
    A Generic Ontology can be the universally accepted matrix for projecting the Definition and Description for a Product/Service, and it can have a maximum audience. Consider the following Generic-Ontology:
    Generic-Laptops-Product Identifier-Processor-Ram-Hard Drive-[ . . . ]
  Note the similarity between the Brand/Generic Ontology examples here. There are significant implications that can determine a Brand to create its Ontology identical to the Generic, and double a Brand-Offer with a Generic-Offer. This will be discussed in following sections.
Fundamental concepts that will be projected in the following example:
  Offer/Request DNA Robot:
    When the OneMany DNA, projecting Identity, Scope, Definition, Description, [ . . . ] for a Product or a Service is formed, in a following stage it will be hosted by a compatible Software and/or Hardware module, together comprising an Offer or Request DNA Robot.
  SMS Notifications:
    An Offer/Request DNA Robot for a Product or a Service can satisfy one or more compatible Offer/Request DNA Robots. A natural step following such positive interactions is to inform the User-Creators and to enable transactions to be committed. This is done through SMS for instance.
  Active Web Robots:
    Web-page-like power-presentation for Creator Identity, Contact information, Product Definition/Description, Media files (e.g., pictures, videos), and potentially other more advanced interactive functionality/Intelligent Behavior. This will make the Product Searchable, Navigable, Locatable, and Accessible/Retrievable.
  Pseudo NLT (Natural Language Text):
    Keywords, text-descriptors Defining and Describing Product and Scope.

Consider the following Consumer-to-Consumer example, where the users engage in a Offer/Request transaction for an Apartment. Using OneMany Generic Otology, one user will Define and Describe his Offer for an Apartment, while another user will Define and Describe her Request for an Apartment. In this example, there will be a positive interaction between the Offer/Request DNA Robots, as one person is offering what the other person is looking for at intersecting times. Consequently the Offer/Request initiators are notified through SMS for example:

http://dev/bds/demo/NotifyUsersSimulation/NotifyUsersSMSSimulationPaqe.html
To: 7777777777
Message:
Dear Shakira,
Active Offer(s) for your Request!
Your following transaction triggered the match:
Request: Real Estate, Apartment-Country USA-City New York-[ . . . ]
Select Razz Van Serbanescu to review the details of the Offer Robot.
To: 0722750010
Message:
Greetings,
There is a Request for your Offer within the scope of: Real Estate
You can contact the interested party at this phone number: 7777777777
The following transaction triggered the match:
Request: Real Estate, Apartment-Country USA-City New York-[ . . . ]
Select Shakira to review the details of the Request Robot.

As it is projected in the sample SMS notifications above (and/or email), the recipient of the notification will be able to execute and view the Active Web Robot associated with the Offer DNA Robot. By selecting the name of the person making the Offer ("Razz Van Serbanescu"), the Request originator ("Shakira") will instantiate the Active Offer Web Robot associated with Razz Van Serbanescu's Offer DNA Robot (see FIG. 12):

In this example, we have a Consumer to Consumer projection of Offer/Request functionality leading to a transaction under OneMany guidelines. This particular example is better described under a "Leads" solution in a following section. Under "Leads" functionality, the Real Estate Agency plays a central role in the solution, such that the solution will become a catalyst for efficient and timely Real Estate transactions, making the solution most desirable for the Real Estate Agency and maximizing revenue for OneMany.

Utilizing a Cell phone and a Removable Media (e.g., memory card) a Consumer can also participate in OneMany as a provider of Data, Defining and Describing Products or Services (to be further discussed).

It is also important to realize that Language difference (e.g., English, French, Romanian, [ . . . ]) becomes irrelevant under OneMany DNA functionality, and users speaking different languages will be able to communicate their Offers/Requests in their own languages without the need for translators.

Offer/Request functionality as presented above can be applied for any Product or Service, be it a Dell Laptop, or a collector's Casino chip for as long as Ontology Rules are observed, and a Product or Service can be Defined and Described through Ontology.

Unlimited Data Participation, Minimal Storage Impact

Vendor participation in the OneMany Automated Business Center can be virtually unlimited, with minimal or no Data impact on OneMany. The Vendor will be able to store its data that will be made available to consumers through the OneMany Intelligent Business Domain, in its own Vendor-resident Data Domain!

Figure 13A:
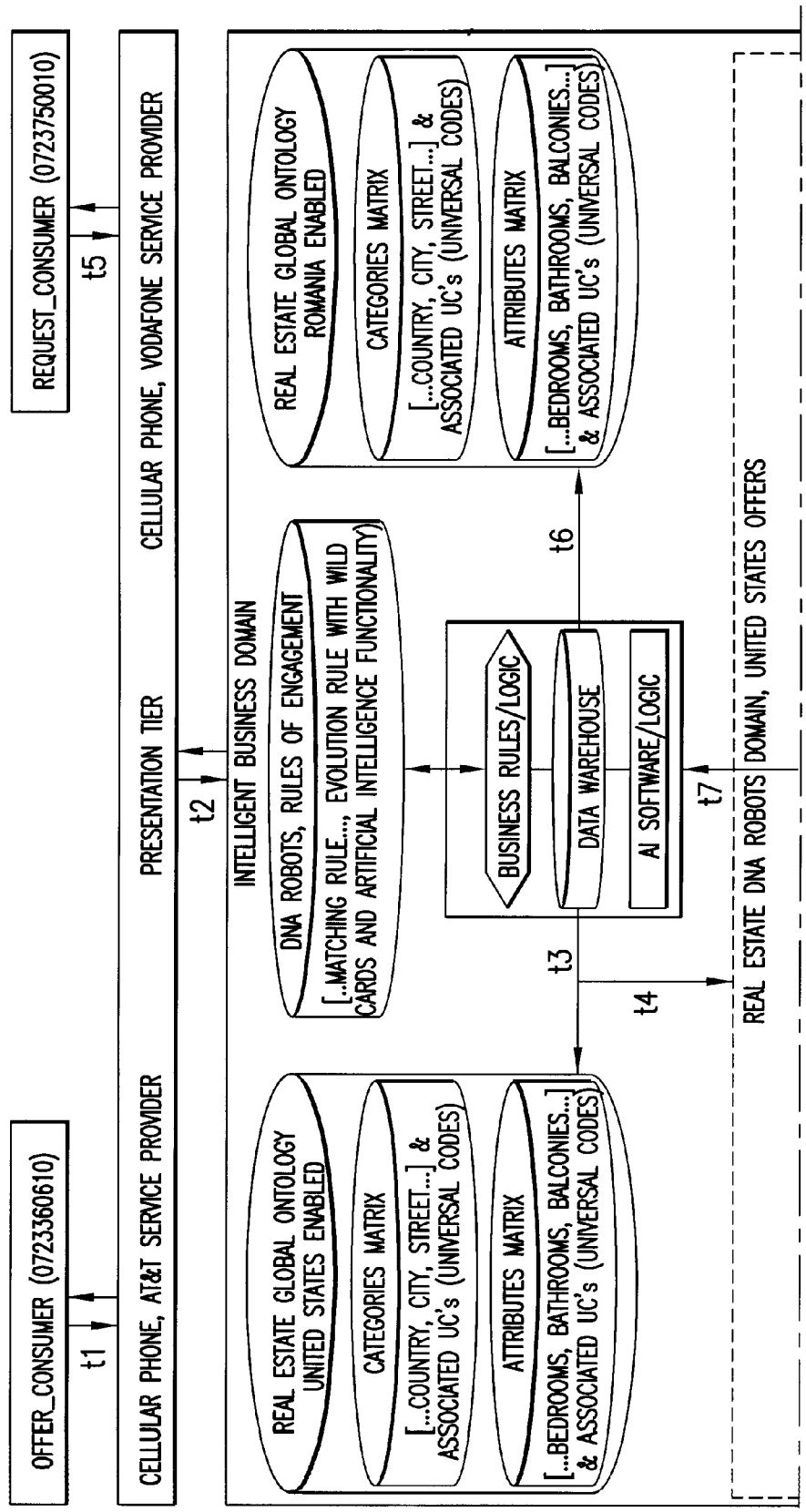
Figure 13B:
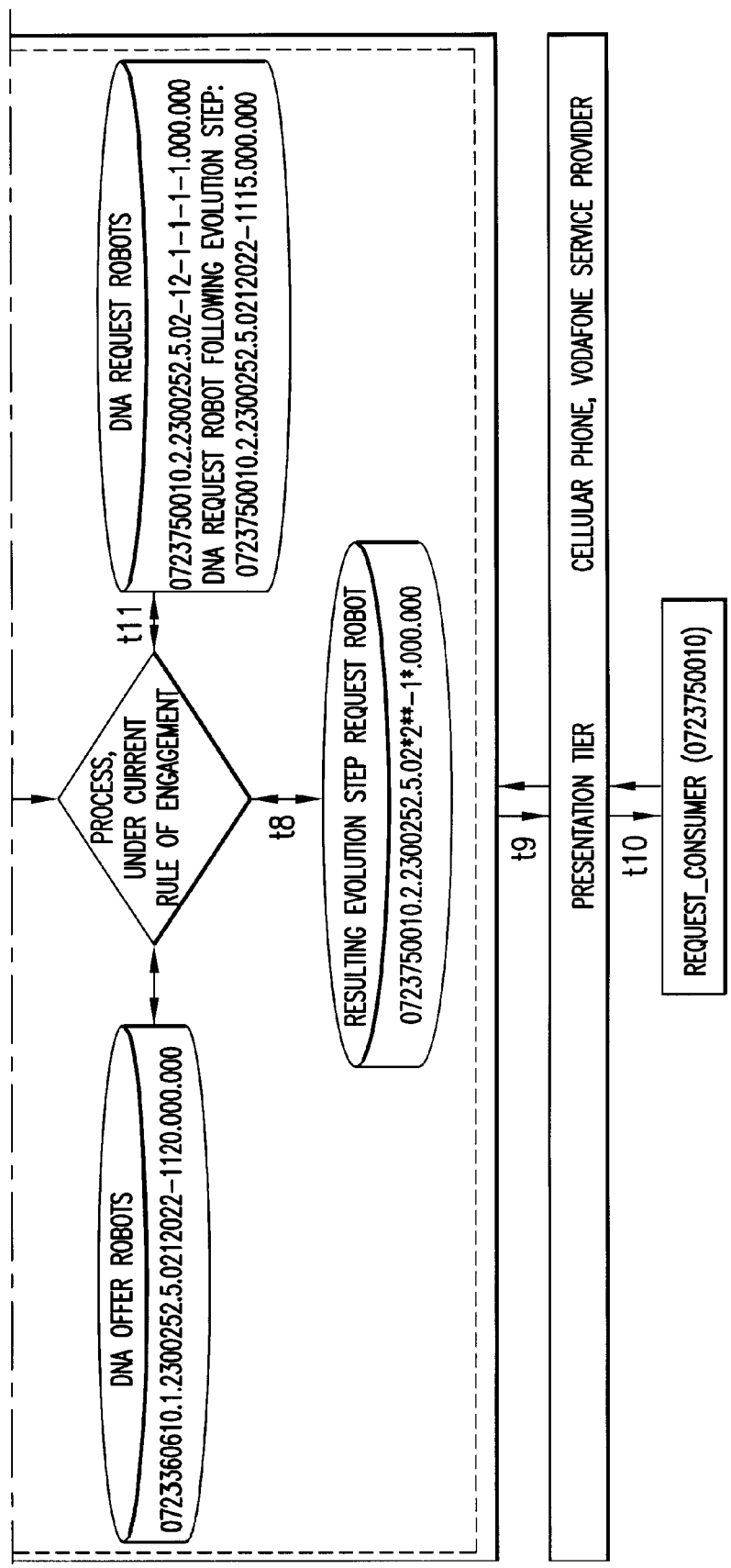

As seen in FIG. 13, one example related to OFFER/REQUEST, "POSITIVE INTERACTION" Under "EVOLUTION RULE with WILD CARDS is shown. Under one example of OFFER/REQUEST, "POSITIVE INTERACTION" Under "EVOLUTION RULE with WILD CARDS:

Engagement under "Evolution Rule with Wild Cards"

t1: User1 located in the United States activates Wireless Device, OneMany Services t2: Request is fired to OneMany Intelligent Business Domain for making an Offer for an Apartment in the United States.

t3: "Real Estate" is a Global Ontology, thus it is hosted and served from OM IBD.

t4: Once the Offer has been completed, it is hosted in the United States Real Estate Domain Note: At "this" point in time, there is no Active DNA Request Robot able to engage the Offer DNA Robot under the "current" DNA Robots Rules of Engagement.

t5: User2 in Romania activates Wireless Device, OneMany Services, for Requesting an Apartment in the United States.

t6: The "Real Estate" Global Ontology, hosted in the OM IBD Data Warehouse, is served in Romanian to User2, interactively.

t7: The Offer/Request DNA Robots engage under the current Rules of Engagement, using the OM IBD, Software, and Logic.

t8: The star "G" placeholders signify the UC fields for which the Request initiator will be queried to supply values.

t9: The Request initiator will be contacted vie SMS/email for example, informed of the potential positive interaction for his/her Request, and asked to supply information for the Offer initiator:

Consumer 0723750010 receives the following text message:

In your request for Real Estate, Apartment, Romania, Bucharest, Decebal, you are asked to specify the following: Square Meters, Balconies, Price

OK?

t10: In one embodiment, the Request Initiator can click on a button or a supplied link to instantiate a OM Evolution Web Robot Page. This Web/WAP page will enable the User to easily supply the desired information. In a more simplistic approach, upon clicking 'OK', the Intelligent Business Domain will receive the OK, and return to the User the first of the attribute that has to be specified. Following repeated steps, the Request_Robot will become:

Updated Request: 0723750010.2.23002525.0212022-1115

Previous Offer: 0723360610.1.23002525.0212022-1120 t11: Following the Evolution of the Request information, the DNA is updated, the Offer DNA Robot is re-engaged, and the Request DNA Robot is hosted in the Offer DNA's Data Domain.

Figure 14:
Figure 15:

As seen in FIGS. 14 and 15, examples related to Wireless Voting (Internet, WAP, or other wireless devices) are shown. Under these examples of Wireless Voting (Internet, WAP, or other wireless devices):

The OneMany Intelligent Business Domain enables a graphical wireless voting interface with real time voting functionality, providing a real-time dynamic interface, enabling real-time dynamic Event Organiser interaction. Using DNA Robot functionality, and OneMany Automated Business Center participation by Voting Event Organiser (e.g., American Idol), the user will be able to cast a vote in the selected vendor's "current event" (e.g., Female Best Vocals).

In addition to the graphical wireless voting interface with real time event organizer interaction, the OneMany proposed solution will enable a ground breaking differentiator in the context of Wireless Voting, a One-to-One User-to-Advertisement exposure (static or interactive), for each voter for a determined and quantifiable period of time. As an example consider the interactive "Dell" advertisement (See FIG. 14):

Consider that while a viewer of American Idol exercises his/her voting right on his/her cell phone, they will also be given the opportunity to receive special offers, in the context of Many Different Offers to Many Different Users while employing OneMany Intelligent Behavior functionality, from Dell, by clicking on the Dell image for example. More details about this in the section dedicated to Mobile Marketing.

One of the most important features of the OneMany solution is that it enables real-time event Event Organiser interraction. What this means is that American Idol can have the "Female Best Vocals" voting category for 10 minutes, the duration of "this" event. Upon firing the "Female Best Vocals" event, the user will have the option to cast a vote by selecting one of the contenders for this category (see FIG. 15).

Using a protocol such as WAP, the User will be able to create interactively, a Voting "Offer" DNA Robot such as: 0723750010.3.3.1.1

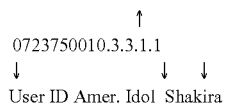

Voting Offer Female Best Vocals

↑

0723750010.3.3.1.1

↓     ↓ ↓

User ID Amer. Idol Shakira

The vote count is cumulated in real time, and result-delivery can also occur in real-time, using a vendor's transport of choice (http, push, SMS).

Assuming that the next voting category would be "Male Best Vocals", after 10 minutes, or at any point in time the Event Organiser decides, it can make one "switch" (as simple as 1 click) in its database, and the next category-option that will be available to the next voter in real time will be "Male Best Vocals". It is important to mention that real-time Event Organizer interaction is optional, as the entire process can be automated, if the Event Organizer so decides.

The Event Organizer will be able to host the data relevant to the event/voting activities on its own database, in its own domain, allowing users to interact with the Voting event, and thus different sets of successive data options through the OneMany Presentation Layer, using the OneMany system and methodology.

The Vendor or event organizer (i.e., American Idol) will be able to interact with the Data in Real Time, such that the Vendor will be able to determine in Real Tine what Categories/Options are presented to the User, through a number of methods enabled by OneMany functionality.

Using WAP to enable this type of wireless voting functionality will entail additional functionality, such as Wireless Voting Advertisement/Marketing, and User Driven Mobile Marketing.

An emerging field that can arguably receive a most significant boost as a consequence of the proposed solution is "Mobile Marketing/Brand Marketing". Take for instance the current methodology of wireless voting through SMS—a process which allows for little or no marketing of any kind to take place while a user submits a vote. Compare this to the OneMany proposed solution of Wireless voting, as described here.

Under another example of Wireless Voting (Internet, WAP, or other wireless devices):

User Interaction:
- User is reviewing American idol on TV. User is informed through the program he/she is watching to key in a shortcut through the wireless device (e.g., cell phone) to access the $1^{st}$ voting event for American Idol, "Female Best Vocals" for the first 10 minutes.
- In one embodiment of the solution, the user will key in the short-code and send an SMS to the specified hot-number.
- As a reply, the user will receive an SMS (either from the OneMany Central Server or from American idol) with a link, which he will be able to click on.
- The User/User's wireless device will also receive as part of the link a "Partial DNA", such as: "111111111.3.3.1"
- Upon clicking/executing the link, information will be sent by the User's wireless device to the OneMany Central Server, such as:
  - User ID (e.g., wireless device, or user account ID for instance)=
  - American Idol partial Voting Event DNA: "1111111111.3.3.1"
- The Central Server will interpret the Partial Voting DNA extracting:
  - Identity Universal Code "1111111111" from the Voting Event DNA Identity Field "1111111111" as the event-organizer OneMany Unique ID;
  - Universal Code "33" associated with Transaction Scope "Wireless Voting" from the "Transaction Scope" Field ".3";
  - Universal Code "3" from the second Voting DNA Field ".3", associated in the local "Wireless Voting" table with the current active event organizer, "American Idol";
  - Universal Code "1" from the third Voting DNA Field ".1" is associated to the event organizer's "current" active event (e.g., "Female Best Vocals").
- OneMany Central Server special purpose module will create a "Wireless Voting" session for the user, and will instantiate a partial Wireless Voting DNA for the user, using the user's identity and the remaining DNA Fields from the American Idol partial Voting DNA, resulting in "0723750010.3.3.1"
- Next, using the Scope of the transaction "Wireless Voting" associated with Universal Code "3" extracted from the American Idol Partial OneMany Voting DNA, and the American idol Unique ID "1111111111" extracted from the American Idol Partial OneMany Voting DNA, OneMany Central Server will be able to extract from a local database, the "initialize" information for American Idol,
- OneMany Central Server will extract the DNS and the NDL associated with American idol, as a registered service provider.
- The DNS will tell OneMany Central Server the exact address and credentials for data access remotely from the American Idol data store.
- The NDL will tell the OneMany Central Server what business rule to execute in order to obtain/get the next set of data from the remote server of American Idol.
- In this example, NDL has been set to the name of a stored procedure that is defined in the remote data store of American Idol and that will get/return a set of data when it is executed.
- OneMany Central Server will execute a request using the American Idol DNS, asking American idol to execute the stored procedure named by the NDL setting.
- American Idol data store will receive, and authenticate the OneMany Central Server data request.
- Following successful authentication, American Idol data store will execute the stored procedure named by the NDL.
- The data returned by the stored procedure will be sent back to the OneMany Central Server.

Figure 16:

Given:
- In one embodiment of the solution serving certain use cases, the Central Server setting for the NDL will remain constant, set to the name of the same stored procedure. In order for American Idol to return different sets of data at different times "timing" being the determinant factor for American Idol business model, American Idol will define one stored procedure that will return different sets of data as a function of when it is invoked. More specifically, on date "x" between the hours of 9.00 PM and 9.10 PM, the stored procedure will return data relevant to the "Female Best Vocals" event. Between 9.00 PM-9.10 PM, the same stored procedure may return data for a next category, such as "Male Best vocals", and so forth.
- Central Server receives "current-event" data from the Event Organizer (e.g., American Idol), presenting this data to the User on his WAP-enabled cellular phone (see FIG. 16).

The User will select "Shakira". The User ID, User-selection and the associated Universal Code will be sent back to the Central Server.

The User's Voting DNA will be completed by the Central Server by appending the Universal Code associated with Shakira, such as in the example below:

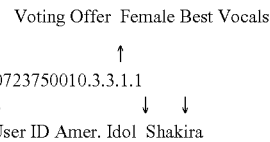

The vote count is centralized at Central Server, it being reported to the Event Organizer either in real time or at specific time intervals, through any transport of choice.

As seen in FIGS. 17-19, examples related to Social Networking are shown. Under these examples of Social Networking:

Consider how many times you walked in a bar, or a club, or a café, and you noticed an attractive young lady sitting at a table with one or more male companions, and you wondered whether they were just friends, or related, or actually a couple. The circumstance however would not permit you to follow through and find out. How many times were you too nervous to get up from your table, walk across the room, and speak to "that" girl in front of her friends, knowing that the whole room was watching?

How many times did you go to Jones Beach, surrounded by wonderful people, even made eye-contact on a few occasions, but the fear of walking over and getting turned down—in front of all those who were certainly watching . . . and then having to walk back to your towel if rejected . . . .

It is a fact that many times we go home with that eternal "What If . . . ?"

OneMany provides a platform on which to build social networking services and productions. Since the end user can interact with his/her phone and focus his search for certain members of the network, our platform provides a great differentiator for those wishing to offer their customers a more customized feel to the social network. You don't simply "log on" and see who's there. You have menu items and choices about whom on the network you want to communicate with, and to what extent you want to disclose your Contacts, Image, and Identity.

OneMany Social Networking functionality will enable the user to use his/her cellular phone to project a presence at a participating locations (unlimited, without using a locator device), together with media files (e.g., pictures, video) of yourself taken at "that" point in time, within the scope of meeting a desired person at that same location, and avoiding all the potential embarrassment and anxiety associated with a potential rejection in front of "all". More over, the functionality will not only address a real life social problem, but it will also prove to be as much fun and stimulating as it is useful.

Male/Female Participants:

Can project presence "now", or at a determined time, at a determined location;

Can project themselves as an "Offer" or "Request" with Definition and Description;

Can upload media files (e.g., pictures, video) and contact information within the Web Robot context, projecting their appearance exactly as it looks at the time when they are creating the Offer/Request;

Can determine the level of specificity/or ambiguity of the Offer/Request DNA Robot, thus determining the interaction-level of the DNA Robots;

Can determine whether a compatible Request DNA Robot will have access to the Web Robot (pictures/contact information)—this as a safety rule.

Sample Use Case

After selecting "Hetero Singles" (see FIG. 17), I will have the option to select/input the Identification of the establishment I am at, OR project a presence in a specific place in a determined period of time.

In the process of constructing my Request DNA Robot, I will Describe my preferences, such as the options of FIG. 18.

Next, after a couple of more steps, I will have also uploaded a picture (taken on the spot with my mobile device, and I will have activated a DNA Request Robot within the scope of Social Networking, Singles.

Consider the next slide, projecting the participation of the person I am trying to meet, "Shakira" who is also at the same location, having made eye contact, and exchanging smiles. "Shakira" is constructing her own Offer DNA Robot. My Request DNA Robot together with "Shakira's" Offer DNA Robot could engage in appositive interaction (see FIG. 19)!

Please note that the extent of the interaction is entirely up to the individual who's safety would be of most concern. The "female" participant who will have the option to review images of compatible DNA Request Robots, and decide whether she would make her Web-Robot media files (e.g., pictures, video) available, or whether to initiate contact or allow the "Request" participant to obtain contact information. This is just a sample of the potential Social Networking functionalities enabled by OneMany!

As seen in FIG. 20, an example related to Leads are shown. Under this example Leads:

OneMany "Leads" functionality will enable vendors in the real-estate market (and other markets) participating in the "Leads" service to obtain the contact information resulting from the interaction of compatible DNA Offer/Requests Robots (see FIG. 20).

The solution enables functionality such that Vendors participating in the Automated Business Center can benefit from "Leads" robot-matching functionality within the scope of increasing efficiency, and driving revenue up, by addressing vendor needs as they are defined by each vendor's Business Model.

Consider for example the case scenario where Real Estate agencies from NYC register in the OneMany Leads Service.

Consider a consumer from NYC who formulates an Offer for an apartment through OneMany. In the process, he/she will be able to select the agency closest to him, or another based on preference and/or marketing impact by "that" agency. Next, another consumer formulates a Request for an apartment, the apartment that is being Offered.

In the process of formulating the Request, OneMany will make abstraction of any Real Estate agency.

Upon execution, there will be a positive interaction between the Offer/Request DNA Robots. Note: There will also be a DNA Web Robot for the Offer DNA Robot. As a result, the User-creator for the Request DNA Robot will also be able to review media files (pictures, videos, etc) associated with the Other Web Robot, which were uploaded by the User-creator of the Offer DNA Robot.

As a consequence of OneMany imposing (as a Business Rule) the inclusion of a Real Estate agency in the process of creating an Offer DNA Robot, the Offer/Request transaction, and hence the Lead, will be handled by the Real Estate Agency defined by the Offer DNA Robot.

In this Business Model projection, OneMany encourages competition/marketing (by the Real Estate Agencies), and we insure that the Real Estate agencies are part of the loop, facilitating a One to Many Leads functionality in the shortest possible time!

OneMany also enable those users who create a Request DNA Robot to project their request once, without concern about searching multiple Real Estate Agencies. As soon as there are one or more positive interactions between compatible Offer/Request DNA Robots, the Real Estate Agencies handling the "Offer" will receive the Lead in real time, and it is expected that they will try to close a deal between Offer/Request Users in a shortest possible time.

Figure 21A:
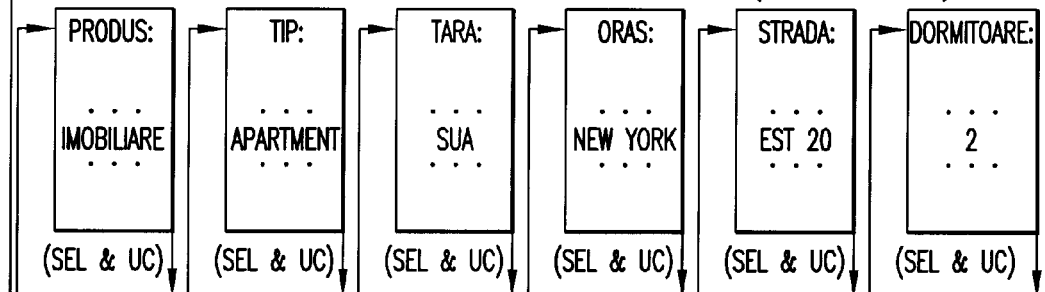
Figure 21B:
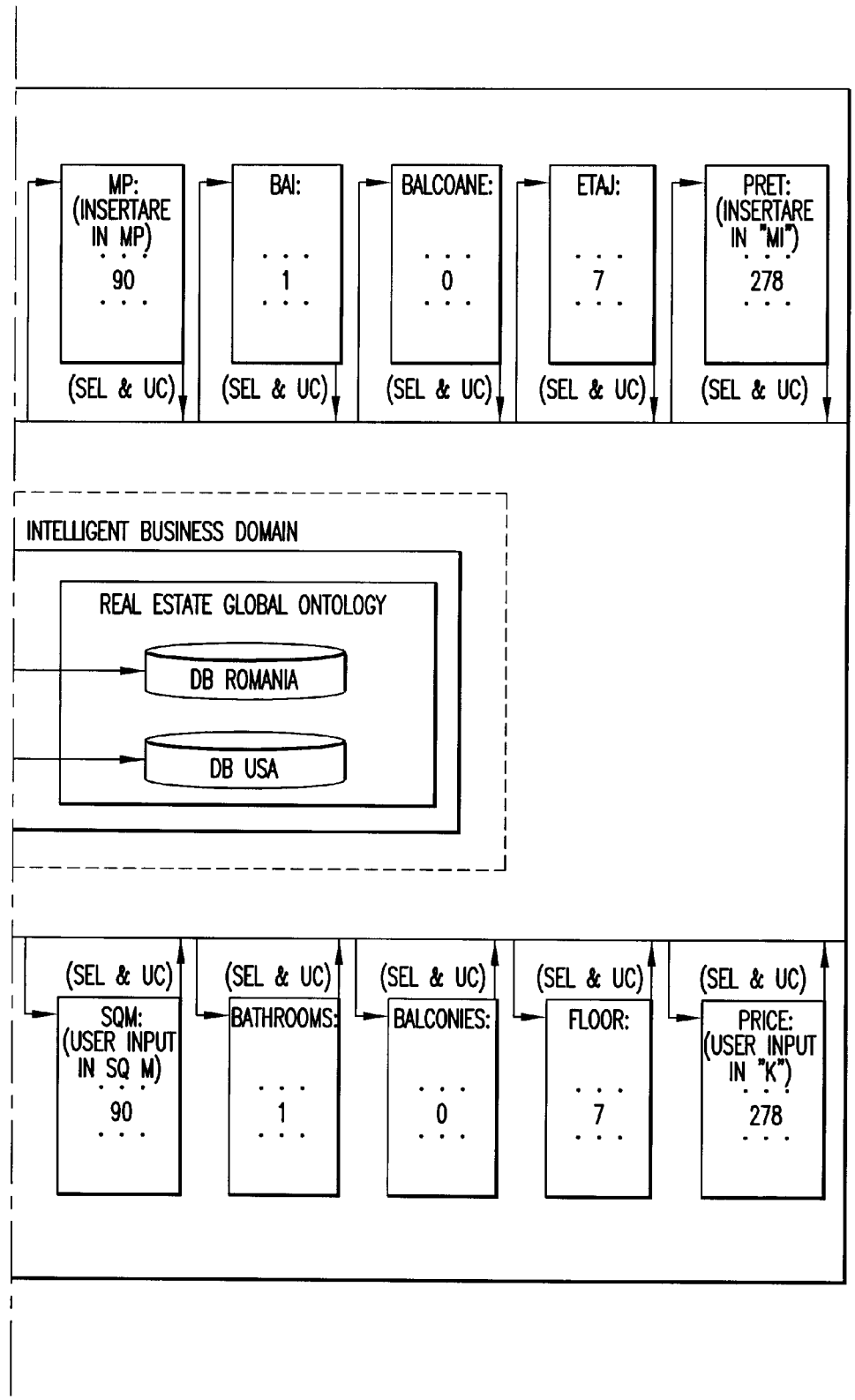

Under another example Leads (see FIG. 21):

Use Case Global Ontology, Leads Functionality

Taking Real Estate as an example, OneMany would consult with its leading partners in this field and devise one or more Ontologies ad they apply to the Real Estate field.

As it appears from the this Fig., one Ontology can be projected in one or more languages (e.g., English and Romanian).

Following the example above, a Consumer 1 will project a Request in Romania, in Romanian, while a Consumer 2 will project a compatible Offer in English, in the United States.

Each Consumer will be using his/her local Network Operator (e.g., AT&T, Vodafone) in the process of Defining and Describing the Offer/Request, in successive steps as presented above.

During each step of the "Defining" process, the Consumer will select an option from the set of options available, that upon selection, will determine the next set of selection options through interaction with the OneMany Intelligent Business Domain.

The "Describing" process (starting from "Bedrooms" to "Price") can also be done successively, or "all at once", as there is no hierarchy relationship most likely.

Upon selecting a Text-Option, the Presentation Tier (e.g., Cell Phone) will return to the OneMany Intelligent Business Domain (through the Network Operator) the Text-Selection and the UC (Universal Code) associated with the selection, and the Consumer ID implicitly (e.g., Cell Phone number).

Upon completing the projection of an Offer, Request, the two Consumers—Consumer 1 and Consumer 2 will have projected their Offer, respectively Request in Pseudo NLT (Natural Language Text) with associated Universal Codes following specific rules, and forming Offer, Request DNA's such as:
Request DNA: 0723750010.2.23002525.0212022-1115
Offer DNA: 0723360610.1.23002525.0212022-1120

NOTE: With respect to Real Estate functionality, as a guiding Rule, the Request Pseudo NLT/DNA will reside in the Data Domain of the Real Estate Offer.

Use Case Real Estate, Leads Functionality:
  OM enrolls Real Estate agencies from NYC.
  A consumer from NYC formulates an Offer for an apartment through OM.
  In the process, he/she will be able to select the agency closest to him, or another based on preference or marketing by that agency.
  Next, another consumer formulates a Request for that apartment.
  In the process of formulating the Request, OM will make abstraction of any Real Estate agency.
  Note the implication of Generic Ontology (User-Request) and Brand Ontology (User-Offer), and the functionality between the two when the Brand Ontology is using the same format as the Generic Ontology.
  Upon execution, there will be a positive interaction between the Offer/Request. Note: As there will also be a DNA Web Robot for the Offer DNA, the User-creator for the Request will also be able to review media files (pictures, videos, etc) associated with the Offer and the Web Robot.
  Because OM has imposed the inclusion of a Real Estate agency in the Offer process, the transaction will be handled by the Agency of the Offer.
  In this embodiment, we encourage competition/marketing (by the Real Estate Agencies), and we insure that the Real Estate agencies are part of the loop.
  We also enable those who Request to project their request once, without concern about searching multiple Real Estate Agencies.
  As soon as there is one or more positive interactions between Offer/Request DNA Robots, the User-creators will know in real time, as the Offers will be handled by the Real Estate Agencies handling the Offer DNA Robots.
  Referring now to an example Auction/Bidding:
  Consider current business model where Dell is taking orders on Laptops, then building them, then delivers when they are ready.

Now, consider the Business Model as proposed by OneMany:
  Dell will build in advance a predetermined stock of certain models and configurations.
  Consequently, in some cases, Dell will be able to deliver same day/next day.
  An unsold surplus can result as a consequence of this procedure.
  Dell can instantiate Auction/Bidding events, in real time through OneMany, the same way that Dell is offering its products through OM, benefiting of a maximum audience, among other things.
  Imagine now that you are a consumer considering purchase of a laptop—any quality laptop that can fit in your budget. You are in the subway, and a flash advertisement appears: "Instant Clearance Auction for latest generation P9 multimedia Laptop from Dell. Send an SMS to 7777777777, and key in 'Dell' to initiate a Bid."
  You key in "Dell", you execute the SMS, and as soon as the subway is above ground, your SMS is delivered. Instantly, you receive an SMS with a link to the Web-Robot page for the Bidding process.
  As soon as you execute the link, you instantiate a web page through your wireless device taking you to the start of the bidding process for "this" item.
  As a validating procedure, you will successively select each of the predetermined options, in effect composing the following item for which you are ready to Bid:
  Request a Product-Business to Consumer-Dell-Laptops-XPS M1710) Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA hard Drive-Optical DVD Burner Upgrade Included-Graphics 256 MB NVIDIA GeForce Go 7900 Graphics Card-Battery 80 WHr-9-cell Lithium Ion Primary Battery
  Next, you Bid the Minimum Increment, you select the Maximum Bid you are willing to go up to, and you select the Notify/Counter-Bid option.
  Stepping away as the participants of this case scenario, consider what is happening here: A Brand company is able to launch an Offer for its Product or Service through OneMany, in real time, from its own Data location. Through OneMany, the consumer can interact with the Brand company's Data, creating a Request for a particular Product or Service, in real time, creating the potential for a transaction if the Offer/Request are compatible, and if they share the same time-frame, OR as soon as they will share the same time-frame.
  Similarly, the Vendor is able to instantiate an Auction/Bidding event for a Product, through the same OneMany platform, in real time, from its own Data location. OneMany will enable the creation of instant Web Robots which will enable user participation in real time, as well as user participation under different guidelines for the duration of the Auction. All this through your cell phone, while spending least time, with least effort, at least cost.
  The Vendor will be able to employ unified functionality which currently is available from at least a few distinct service-providers, and the vendor will be able to have exposure of an audience greater than anything up to date! Moreover, the Vendor-Data will always be Vendor-Resident!
  Referring now to another example Auction/Bidding:
  Vendors of Products Able to Use OneMany Intelligent Business Domain to Enable Ad-Hoc Auctions Consider the functionality where Dell is a registered Vendor with One-Many Intelligent Business Domain.

OneMany will enable Deli (and any other Vendor) to engage in real time auctions, ad-hoc, just as easy and similar to projecting an Offer.

Use Case

Auctioneer sets a target price.

Auctioneer wants to close a sale as soon as target price or better is TRUE.

Auction Starts:

Vendor ID 0723750010-activates an Auction (4) for-Consumer Electronics-Car Stereo-Bloupunkt-40 Watts (11.1.1040)-with a Minimum Starting Bid (120)-and a Target Selling Price (150):

| | |
|---|---|
| Auction Robot: | 0723750010.4.11.1.1040.120150 |
| Bid Minimum Increment: | 1 |
| Display Minimum Bid: | 120 |
| Display Maximum Bid: | 250 |
| Bid Range: | 250 − 120 = 130 |

Comments: current use case sets a minimum starting bid (120) within the scope of generating enough bidding/counter-bidding to reach the Auctioneer target selling price (150 or more). In this case, the auction ends when with the first that satisfies "auction target selling price" as a result of a bid or counter-bid fit applies.

| First Bid: | |
|---|---|
| Bid Robot: | 7777777777.5.11.1.1040.121170 |
| Auction Robot: | 0723750010.4.11.1.1040.121150.7777777777 |
| New Display Minimum Bid: | 122 |
| New Display Maximum Bid: | 252 |

Comments, bidding ID 7777777777 will have the choice of bidding the minimum display bid, or make any bid within the range of the minimum display bid+the minimum increment, up to the maximum display bid Bidding ID 7777777777 will bid 121, and it will set its maximum offer for this item at 170. It is important to know that the maximum bid set by a bidding agent is not disclosed to any other bidder. Furthermore, the maximum bid is activated only if a result of a counter-bid, or if this is what is required to satisfy auction target selling price. More about this in subsequent discussion.

Note, the New Display Minimum is now set to the sum of Current Bid+Increment. The Display Maximum Bid has increased by a factor equal to the sum of Current Bid+Bid Range. This is so because the auctioneer has elected this rule, and thus this functionality for this auction (Relative Upper Range: Display Maximum Bid+Bid Range).

Also note, the Auction Robot will always "maintain" the identity (7777777777) of the current winning bid, as well as reflect the current amount made by the current bid (121), in place of the previous "minimum starting bid".

| Second Bid: | |
|---|---|
| Bid Robot 2: | 9999999999.5.11.1.1040.151200 |
| Auction Robot: | 0723750010.4.11.1.1040.171150.9999999999 |
| Bid Robot 2: | 9999999999.5.11.1.1040.171200 |

| Second Bid: | |
|---|---|
| New Display Minimum Bid: | 172 |
| New Display Maximum Bid: | 282 |

Comments: bidding ID 9999999999 will choose to bid 151, setting a maximum bid at 200. Although 151 outbids the 122 previous Display Minimum Bid, Bid Robot 7777777777 also had a maximum bid set at 170. Al this point, the "maximum" of the 2 competing bids are compared. The greater "maximum" bid wins, and the current bid is set at the lower maximum bid+increment. This is an example where the "current" bid can become much higher than the auction target price. However, please note: although the maximum bid for robot 9999999999 is 200, the Auction Robot will only get the minimum that was necessary to outbid the previous bid! Considering the Use-Case, this auction would now be over.

From this point on, depending on the type of auction, and the rule set by the auctioneer, the auction may end, or may continue. If taking (see below).

Use Case 2

Auctioneer sets a target price.

Auctioneer sets a timeframe.

As soon as time has lapsed, auction is over.

Use Case 3

Auctioneer sets a target price.

Auctioneer sets a timeframe.

Auctioneer sets an "Allow All".

As soon as time has lapsed, auction is over, winner is calculated.

In the Context:

Auctioneer:

Can set Absolute Upper Range

Can set Relative Upper Range

Can set Time-based auction

Can set "Allow-all"

Can set "Target-wins"

Bidding Agent:

Can bid minimum increment

Can set a maximum bid willing to pay for the item

Can set "notify" functionality

Can set "notify/counter-bid" option

Referring now to an example Intelligent Behavior:

Since OneMany focuses on building a technology platform for our customers, we by no means have exhausted the ways in which a given business could use our mobile-phone based technology.

One of the goals of OneMany is to shift focus from the storage of massive amounts of Data to the hosting of Intelligent Behavior. There are two primary categories of Intelligent Behavior: OneMany Generic, and Vendor-specific "OneMany Generic" describes functionality-modules which are available for selection to all users (Consumers, Vendors) as they apply to each.

"Vendor-specific" describes custom made functionality-modules driven by specific business needs. These special-purpose modules can reside either in the OneMany Intelligent Business Domain, or at the Vendor location, or on both locations. This type of Intelligent Behavior can be available only to the Vendor-clients, or only to the Vendor, or be invisible to the user. The vendor determines this in conjunction with OM.

A OneMany DNA Robot is a software executable that is able to host the Product DNA, and handle specific DNA settings for Intelligent Behavior.

An example of OneMany Generic Intelligent Behavior and the Consumer opting-in for such enhanced functionality:

The consumer will finish Defining and Describing his/her Request for a Brand Product (e.g., Dell Laptop): 9999999999.2.211.1.1311124.

Assuming that OneMany is offering "this" Intelligent Behavior, the Consumer will be informed that there is OneMany Intelligent Behavior available for his/her DNA Robot, and whether interested to review.

If the Consumer selects "No", than the final DNA for the Product Request will be:
9999999999.2.211.1.1311124.000.000

If the Consumer selects "Yes", then in a next step the Consumer will be able to select the Option:
"Monitor and inform me of auctions from any Brand with similar features"
"Monitor and inform me of auctions from this Brand with similar features"
"Monitor and inform me of auctions from Generic Brands with similar features"

Taking for granted that this is the only Enhanced Behavior Option from OM at "this" point, the final DNA for the Product will look like this: 9999999999.2.211.1.1311124.200.000

Consequently, "this" DNA will have Intelligent Behavior settings, and following OneMany IBD methodology, special purpose functionality will enable the behavior as described by the User-selection.

There can be also Vendor-specific custom functionality within the scope of addressing specific business needs. Within this scope, the extent of the functionality can extend to include Automated OneMany Central Server Intelligent Business Domain-Vendor communication, with Vendor-side data analysis, etc:

The Product DNA may have specific settings for specific behavior, such as "VIP Offer for $1^{st}$ Time Buyer OR VIP Buyer OR Surplus stock"
where the logic can be something along the lines:
    For each request for "this" item, communicate with the Brand
    For out if this is a $1^{st}$ time buyer
    OR
    If there is a surplus of stock for "this" item
    OR
    If this buyer has spent over $5,000 in the last 24 months.
    If either true, offer this buyer a 20% reduction in price for "this" item.

OneMany architecture will enable OneMany-local Intelligent Behavior, as well as Vendor-dedicated (Vendor-local or OM-local or both) Intelligent Behavior:

Referring now to an example Intelligent Automated Virtual Reality Environment:
    A DNA Code has an IP-like structure (9999999999.4.11.0.40.090150.020.000);
    A DNA Code can be the unique name of a web page in a web environment: 9999999999.4.11.1.040.090150.020.000.asp Consider the following Virtual Reality Case Scenario:
    VR Universe simulating streets in NYC as they are in reality;
    Real life vendors can elect to populate VR environment;
    A User from any part of the world can enter and navigate the virtual streets of Manhattan, able to enter the VR environment at any virtual location;
    A User entering at 48th & 5th navigates up 5th Avenue;
    The User approaches Sack's $5^{th}$ Avenue location, using VR LOD methodology. Sack's becomes visible to the user;
    As Sack's becomes visible, distinct vendors advertisements can become visible to the User, as the User approaches, and relative to the User;
    The User can navigate to enter the store through any portals designed to be available to the user;
    The User sees an advertisement in a window for Armani suits;
    The advertisement is a portal. The User enters.

Note: Up to this point, if considering a 2-D environment, Sack's 5th Avenue would be an option from a dynamic selection box. As in a 2-D environment an "Offer/Request" selection would have to precede the "selection" of Sack's. In a 3-D VR environment, selection of "Offer/Request" is done automatically by the "system", as selecting Sack's would imply categorically a "Request", as Users can only "Request" items from Sack's.

Therefore, when the user enters Sack's by navigating through the Portal "Armani Advertisement", the following occurs, invisible to the user, and comparable to making successive selections from an Options Select Box:
    Because in Sack's a User can only Buy/Request, a "Request" UC is inserted in the DNA.
    Because the "Armani" advertisement was on Sack's window, a "Sack's 5th Avenue" UC is inserted in the DNA.

Therefore, up to this point you have a sub-DNA Sequence composed of UC's "User ID" (as the User ID was inserted in the DNA when the User entered VR world), "Request", "Sack's 5th Avenue", "Armani Suits":

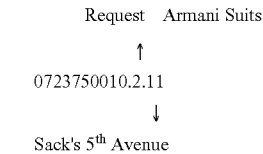

Upon entering through the Portal, the User is introduced in a new VR World, as defined by "Armani Suits";
A range of options may be available, as determined by the design of "this" VR store, as you can have different designs with different functionalities at different prices;
The User can view different suits in 3-D, navigating around a suit in all directions;
Once inside the Store, another premium feature of the design, at a cost, is that the Store can be "as big" as it needs to be, in order to expose as many items as necessary (this being an illusion achievable through programming). The flipside of this is having a finite-size store for the vendors with a budget;
Each Suite has an UC associated with it, equivalent to associating a UC to a "Product Identifier";
The User can execute buying a suite with specific measurements;

Note: At this point, a range of solution-options are available.

For the sake of this example, we will depict the following procedure:
    The User executes buying a Suite;
    The User selects to have the suite sent to the address associated with his/her ID;
    The User selects to have charge apply to the wireless device account;
    The VR "store assistant" will process payment while the User is "waiting in the store";

Charge was approved, the Transaction is committed, the User is ported outside the Store, at the point where he/she initially entered (or at another promotional place within Sack's 5th Avenue).

Note: At this point you have the following Request DNA fired by the User:

```
       Request         Black Waist Size
          ↑            ↑    ↑
   0723750010.2.11.  .0132324201000
          ↓           ↓↓    ↓  ↓
   User ID  Saks 5th Ave Armani Suits Length Price $
```

Referring now to an example Anti Counterfeit Use Case (see FIG. 22):

Use Case of Temporal DNA within the Scope of Counterfeit Products:

Brand Company creates a Temporal DNA Offer for a specific Product with the specific Next destination to the Manufacturer, with the "Present" setting to Jun. 14, 2007:

0.T1.0.DNA=>0.06142007.0.DNA

Upon the Manufacturer receiving the order and accepting the engagement, the Manufacturer will create a Temporal DNA Request projecting the Product DNA, with the Temporal dimension such that the Past will be set to date T1 (the date of "Offer" by the Brand, Automated), the Present to date T2 (the date of acceptance/take-over by the Manufacturer, Automated), and T3 the projected future date when the Next destination for the Product is estimated (e.g., Distributor):

T1.T2.T3.DNA=>06142007.06152007.06302007.DNA

In one embodiment of the solution, upon completion, the Product will be Branded (through a certificate, or print, or otherwise) with the Product DNA Robot.

This is the underlying logic:

The Brand company is the initiator, having a "Past" Temporal setting to zero, the "Present" Temporal setting to "now" (the date of the Offer activation with the Manufacturer), and the "Future" Temporal setting to the estimated date of "ownership"/Start for the Next State, the Manufacturer for example.

The Next State in this case, is the Manufacturer. The Manufacturer will create a Temporal DNA Request Robot with the "Past" Temporal setting to the Brand's Company "Present" setting (Automated), the "Present" Temporal setting to the date of "ownership"/Start for the Manufacturer (Automated), and the "Future" Temporal setting for the date the Manufacturer estimates to deliver to the Distributor for example.

Following the same logic and procedure, the Next State can be the Distributor, and so forth, until we get to the Store Front State:

The Next State in this case, is the Distributor. Upon the Distributor receiving the Product from the Manufacturer, the Distributor will create a Temporal DNA projecting the Product DNA, with the Temporal dimension such that the Past will be set to date T2 (the date of the "Offer" by the Manufacturer, OneMany Automated Process), the Present to date T3 (the date of acceptance/take-over by the Distributor, +/−depending if the Product was delivered/received by Distributor at the projected date T3, OneMany Automated Process), and T4 the projected Future date when the Next destination for the Product is scheduled to the Store Front for example:

T2.T3.T4.DNA=>06152007.06302007.07152007.DNA

Upon the Store Front receiving delivery of the Product from the Distributor, the Store Front will create a Temporal DNA Request projecting the Product DNA, with the Temporal dimensions, Past set to date T3 (Distributor, OneMany automated), the Present dimension set to date T4 (the date the Product was received by the Store Front, OneMany Automated), and the Future dimension will be set to "0" (OneMany Automated), as the Next destination (the consumer) cannot be predicted by the Store Front:

T3.T4.0.DNA=>06302007.07152007.0.DNA

The Store Front is the Final destination for the Product in the cycle Brand-Manufacturing-Distribution-Retail. The Store Front is the point where the Consumer will be able to interact with the Product. Upon the Store Front executing the Temporal DNA Request for the Product, Business Rules determined by the Brand company will enable the activation of a Temporal Offer DNA for the Product within the OneMany Intelligent Business Domain, along with the proper Web Robot projection for the Product within the scope of Consumer-interaction, Consumer-validation of the authenticity of the Product:

0.T4.0.DNA=>0.07152007.0.DNA

Until "this" product is sold to a Consumer, "this" Temporal DNA along with the Web Robot associated to the Product, will tell the Consumer that this product is available as of the Date T4 (07152007=>Jul. 15, 2007) at "this" Store Front.

Upon a Consumer executing the DNA (or an associated user-friendly code) of the Product through the Wireless device, a Temporal Signature will be completed by the system (OneMany IBD) to the Product DNA executed by the Consumer:

0.T5.0.DNA=>0.07202007.0.DNA

Next, there will be a Positive Interaction between the Brand-company Temporal DNA of the Product active in the OneMany Intelligent Business Domain, and the DNA associated with the tangible Product executed by the Consumer in the Sore location. The Temporal Dimension of the DNA associated with the tangible Product will be completed by the system (OneMany Intelligent Business Domain) upon the consumer executing the Product DNA through his/her wireless device in the store. Consequently, the Consumer will be given access through his wireless device to the Web Robot associated with the Temporal DNA of the Product, and will be able to view for example, a picture of the Product, its current location (Store Front), how long it has been in the store, and that it has not yet been sold if that's the case. Briefly put:

The Consumer will be able to input the DNA of the Product on his/her wireless device prior to purchasing.

Upon executing the DNA of the Product with the OneMany Intelligent Business Domain, the Consumer will get instant OneMany Web Page Robot functionality for the Product, such as (see Table 6 and Table 7 below):

TABLE 6

| | |
|---|---|
| Vendor name is: | Estée Lauder |
| Product: | Beyond Paradise Blue |
| Email address to report unauthorized activities: | Attention@EsteeLauder.com |
| Authorized Retailer for this Item | Sacks 5th Avenue, NYC |

TABLE 6-continued

| | |
|---|---|
| Available Date | July 15th, 2007 |
| Availability Status | Available |
| Previous Inquiries about this Item | 15 |
| Suggestions | Buy |

TABLE 7

DNA Robot Scope:

Offer a Product - Business to Consumer - Estée Lauder - Eau de Parfum Spray - Beyond Paradise Blue - Ounces 1.7 - Color Sky, Water, Paradise - Fragrance Shimmering Floral - Motto Let it Surround You - Top Notes: Grapefruit, Tangerine, Bergamot, Eden's Mist Water Flowers, Drenched Jabuticaba - Middle Notes: Belle de Nuit Flower, Jasmine, Orange Flower Templar, Frangipani Flower - Base Notes: Vanilla Sands, Vanilla Absolute, Melaleuca Bark, Sandalwood, Sun-Kissed Skin (with Cananga Flower, Neroli and Lavender)

This is the underlying logic:

The Product will have an associated DNA (either the DNA code, or another associated user-friendly vanity code) tagged, or imprinted, or labeled, etc, enabling the consumer to check the validity/authenticity of the product by simply keying in this code for example, and sending it to the OneMany Intelligent Business Domain. An authentic product will have a related DNA encapsulated by an active OneMany Robot that will enable the consumer to review to review relevant information about the specific product the consumer is checking on. This information will be presented to the consumer in power-summary format through a web page for example, which the consumer will be able to access through his/her wireless device. It is important to note that an authentic product will have an associated power-summary web page associated to its OneMany DNA. Some of the information encapsulated in this power page will include some of the following: Vendor name, Product, Email address to report unauthorized activities, Authorized Retailer for this Item, Available Date, Availability Status, Number of Previous Inquiries about this Item, Suggestions, Product Description, . . . as well as media files such as images/videos if necessary.

In addition to checking for the authenticity of a product for personal motives, the consumer may have an additional incentive in engaging in this procedure: The business model can allow for a free access for the consumer to this functionality, as the Brand company can instead be charged by the network operators, and the consumer's phone number for example can be automatically be entered in Brand-sponsored reward events, each time that the consumer will check authenticity for a product before purchasing it:

Upon the Product being sold by the Store Front, Business Rules determined by the Brand Company will enable the activation of a Temporal DNA for the sold-Product, along with the proper Web Robot projection within the scope of future Consumer-authentication/inquiries: T6.0.0.DNA=>08152007.0.0.DNA "This" new Temporal DNA along with the associated Web Robot, will tell other Consumers that "this" Product is not available for sale anymore, as it has been sold already on the date of Aug. 15, 2007, at "this" Store Front.

As the Temporal DNA implies, "this" Product does not have a "Present" or a "Future" with "this" Store Front anymore. The consumer who has purchased "this" Product may be eligible for rewards such as cash, rebates, goods, or services, provided he/she has participated in authenticating the Product prior to purchase, This is the underlying logic:

OneMany Intelligent Business Domain will enable functionality for the Brand-company such that following the consumer-authentication for a Brand-Product, and following the purchase of that Product, Automated functionality will enable the formation of a new Temporal DNA for the sold Product along with an associated power web page, projecting the new status of the sold Product. This way, other consumers will be able to know before purchasing that "this" product has already been sold, and anything else "pretending" to be "this" Product IS NOT.

Furthermore, OneMany IBD will enable functionality for the Brand company such that the Brand company can choose to reward the consumer who will check the authenticity of a Product prior to buying it. In one embodiment of the solution for consumer-rewards, the consumer is asked to authenticate the Product prior to purchasing it by executing the Product DNA with OneMany IBD through the wireless device, and to execute the Product DNA again after the consumer paid for the item.

More specifically, the Store is responsible for executing the Product DNA with the OneMany IBD when the user pays for the item. This will tell the Brand company that the next consumer who will re-enter the Product DNA to OneMany in a pre-determined time-frame through his wireless device using the same wireless-device-identity as that used to check authenticity of the product prior to purchasing it, is the person who has purchased the item. Therefore, the consumer will then be eligible for rewards from the Brand company, if rewards are being offered, and the steps of authenticating and claiming reward are followed by the consumer as described above.

Referring now to an example Thoughts/Intentions/Actions and Sequential-Reference Use Case:

Use Case of Temporal DNA within the Scope of Thoughts/Intentions/Actions, Projected through Text Sentences, and Using Sequential-Reference:

Sequential Reference can be used to make reference to "previously" identical DNA, for instance.

In one embodiment of OneMany Temporal Past.Present.Future, you can have a sequence of DNA's generated from the processing of Text Sentences:

0.1.0.DNA|0.2.0.DNA|0.3.0.DNA| . . . 1.11.0.DNA

The Temporal DNA 1.11.0.DNA will tell you that the "Present" dimension is set to "11" and thus "this" is the 11$^{th}$, DNA in the Sequence, AND that the "Past" dimension is set to "1", which together with the "DNA" placeholder will imply a reference to the 0.1.0.DNA Referring now to an example Temporal DNA and DNA Life Span Use Case:

Use Case of Temporal DNA Within the Scope of Determining DNA Life Span:

0.09141968.06132007.DNA

This will tell the system that "this" DNA was "Born" On the Date of Sep. 14, 1968, and that it will, or may become Neutralized on the Date of Jun. 13, 2007.

Business Rules can determine whether the Neutralization of the Active Temporal DNA Robot is "Date-dependant" OR "Date and Event-dependent".

Neutralization Date-dependant: The system/environment (OneMany) will expand additional resources, and will play a special-purpose role to insure that Neutralization of the Active DNA Robot occurs at the specified Date.

Neutralization Date and Event-dependant: Neutralization of the Active DNA Robot will occur on or following the specified life-termination Date. Neutralization will occur as a consequence of an external stimulus/event that will cause System-interaction with "this" Active DNA Robot, at which time the System will determine that "this" Active DNA Robot should be Neutralized.

The Active DNA Robot, will continue to be active well past its suggested termination date, consuming System-resources for example, until another event causes System-interaction with the Active DNA Robot.

Referring now to an example Neutralizing Temporal DNA, Activation Use Case:

Use Case of Temporal DNA within the Scope of Activating a Neutralizing Temporal DNA:

User1 creates this Temporal DNA on Sep. 14, 2006: 0.09142006.0.DNA

User1 creates this Neutralizing Temporal DNA on Jun. 13, 2007: 09142006.06132007.09142007.DNA On Sep. 14, 2007 this User1 Temporal DNA 09142006.06132007.09142007.DNA will Neutralize this Users DNA 0.09142006.0.DNA Given: The DNA settings comprising the entire Temporal DNA's are identical with the following exception:

In the case of the Temporal DNA "0.09142006.0.DNA", the Scope of the DNA is Offer/Request for example, while in the case of the Temporal DNA "09142006.06132007.09142007.DNA", the Scope of the DNA is "Neutralize".

Referring now to an example Temporal DNA, Access to Wireless Removable Media Use Case:

Use Case of Temporal DNA within the Scope of Projecting a Remote Presence within the Scope of Enabling Access to Wireless Removable Media within Specified Time Intervals:

A User/Consumer can use Temporal Present/Future settings to determine the Time span/breakdown in intervals (i.e., "1 week, between 9-5 PM") for which his/her mobile phone+Removable Media (e.g., Memory Card) can be used to serve Data for Access through OneMany: 0.06142007.061200700917.DNA The "Present" dimension of this Temporal DNA is Jun. 14, 2007.

The "Future" dimension of this Temporal DNA is Jun. 21, 2007, between 9 AM and 5 PM.

Therefore, the User's Wireless device (based on its ID) will be able to act as an a Server of Data, of Options (just as Dell), in the OneMany Automated Business Center, for one week from June 14$^{th}$ until June 21$^{st}$, between the hours of 9 AM and 5 PM.

NOTE: Business Rules within the system (OneMany) will be able to determine the type of the Temporal settings, and the scope.

For example, a Temporal setting such as this: 0.06142007.062120070917.DNA will imply a Start Date and an End Date with clear intervals between the Dates.

A Temporal setting such as this: 1.11.0.DNA will imply a Sequential/Counter Reference format, with a "Present" set to "11", and a Reference set to the Past Present "1", setting the DNA at "Present=11" Equal to the DNA at "Present=1"

NOTE: The User (e.g., Consumer, Vendor) will be able to format data in real time, and store it for consumption through the Automated Business Center, thus providing for a data-server presence, like any other registered Vendor.

Referring now to an example Temporal Stimulation DNA, Users Interactive Use Case:

Use Case of Temporal Stimulation DNA with Two or More Users Interactive:

There are two Users, User1 and User2, Both have Wireless Devices with access to OneMany.

One of the Users, User1 also has a Mechanical Toy that can plug into her Wireless Device.

The Mechanical Toy has a Factory Robot for "this" specific Toy Model, as the Manufacturer is also registered with OneMany.

User1 tells/sends User2 the Robot ID for the Mechanical Toy.

OneMany Vanity Names

Each OneMany registered Vendor (Consumer) will have its name as a Unique ID (alpha-numerical and/or numerical), and a pointer/shortcut to "the", or to "a" Vendor Top-Level Category.

User1 inputs/executes the Robot ID for the Mechanical Toy as a OneMany Shortcut to the Vendor Top-Level Category.

The User will then be able to create an Active Temporal DNA Stimulation Request Robot for the Mechanical Toy.

User2 executes the Robot ID for the Mechanical Toy as a OneMany Shortcut to the Vendor Top-Level Category (see FIG. 23).

The OneMany Shortcut will take User2 to the Top-Level Category of "this" Mechanical Toy Text Options (with the subtle associated Universal Codes), as defined by "this" Manufacturer.

User2 can have a number of Options for creating Temporal DNA Offer_Stimulation Robots for the Mechanical Toy such as:

Selecting a predetermined Text Story, with the predetermined Sequence of Temporal DNA Robots;

Selecting to create one or more Temporal DNA Robots (a Sequence) by selecting different Text Options.

When User2 is done, he/she will have to Input the OneMany ID for User1.

The Active Offer/Request DNA Stimulation Robots for User1 and User2 will have a Positive Interaction.

Due to the fact that this is a STIMULATION Offer/Request SCOPE, the following Business Rules apply:

The Temporal Offer DNA Robot(s) are sent to User1 Wireless Device/Mechanical Toy.

The Mechanical Toy will have to "know" how to handle/respond to the Temporal DNA Robots.

The Offer-Text Story or Pseudo Natural Language Text is also sent to User1.

In one embodiment, this can be accomplished in the following manner:

User1 receives SMS/Email notification of the Positive Interaction between the Offer/Request Stimulation Robots.

Upon executing the Link in the SMS/Email notification, User1 will be ported to the Offer_Stimulation Web Robot.

The Offer Presentation Web Robot can present the Text Story/Pseudo NLT, along with a Receive Hyperlink.

Upon User1 executing the Receive Hyperlink, OneMany will send the Temporal Stimulation DNA Robot(s) to the Wireless Device/Mechanical Toy of User1.

There can be a number of implementations with respect to the Presentation Web Robot, User1, the Text available for viewing, and the associated Temporal Offer Stimulation DNA Robots:

In one embodiment, through an Automated process, the "Temporal" settings of the DNA Robots can determine the duration of presentation of Text sections, while the associated DNA Stimulation Robots are sent to the Wireless Device, consumed by the Mechanical Toy;

In another embodiment, the User can determine the presentation of Text sections, by executing a Next Hyperlink which will load and present the next Text section, and have the associated DNA Stimulation Robot sent to the Wireless Device, consumed by the Mechanical Toy, and so forth.

Referring now to an example Temporal Stimulation DNA, Virtual Reality, Removable Media Use Case:

Use Cases of Temporal Stimulation DNA with One or More Users Engaging Stimulation-Compatible Remote Sites, Virtual Reality Simulations, and Removable Media:

Virtual Stimulation

A User1 has a OneMany-compatible Mechanical Stimulation Device plugged in a Wireless Device (i.e., mobile phone).

Stimulation-Compatible Remote Sites: With the Wireless Device or the PC/Laptop, the User1 can access sites which can generate OneMany Temporal Stimulation DNA sequence within the scope of driving the Mechanical Stimulation Device.

If accessing the remote site with a PC/Laptop, the User1 can direct Temporal Stimulation DNA sequence to be sent to the Wireless Device hosting the removable OneMany-compatible Mechanical Stimulation Device.

(similar to the Use Case described in the previous section).

Virtual Reality: A User1 can experience Virtual Reality Automated Simulation Sessions, or multiple-Users-interactive Sessions with the Wireless Device and/or the PC/Laptop. The VR Simulations can generate OneMany Temporal Stimulation DNA's, driving the OneMany-compatible Mechanical Stimulation Device plugged in the Wireless Device.

Removable Media: A method and a system for encapsulating the OneMany Temporal Stimulation DNA's, composing a Software and/or a Mechanical Intelligent Robot. The OneMany-compatible Mechanical Stimulation Device can have a Database of OneMany compatible Stimulation Ontologisms stored on a Removable Media (e.g., Memory Card). Once the Removable Media is plugged in the Wireless Device by User1, it can project a presence (like a Database) in the OneMany Automated Business Center. Next, another User2 can interact with it remotely, creating OneMany Temporal Stimulation DNA's, that can be used to drive the behavior of the Mechanical Stimulation Device, turning the device into a OneMany Active Stimulation DNA Mechanical Robot:

A User2 can input the User ID, or Name of another User1. If the other User1 is Active in OneMany, the Remote User2 will be "Wormholed" to the other Users just as if it was Dell. From there, the Remote User2 can interact with the other User1 by "Seeing" what the other User1 is "Offering", courtesy of the Stimulation Ontologies stored on the Removable Media plugged in the Wireless Device:

Example:
Merry Jane (0723750010)
Stimulation
Sexual
etc

Referring now to an example Product Support Use Case:

Phone carriers offer "business support services" based on OneMany technology. For example, you just purchased a Sony Ericsson mobile phone from a Vodafone authorized dealer. A week later, you decide you want to add Vodafone Live/WAP service. You execute Vodafone Services through OneMany. You are presented with a menu of options—you select "Add Vodafone Live". This is a Request for an already active Vodafone Offer for Vodafone Live! There will be a positive interaction followed by and SMS from Vodafone. In the SMS you will be asked to "click" to navigate to the Web Robot. The Web Robot page will collect additional information from you, as well presenting you with information. Upon execution, your transaction is complete, and you can now access the Vodafone Live service. You didn't have to speak to a real person, didn't have to wait, didn't run the risk of having to call again because of human error. Vodafone benefits from automation, with highly more efficient results, at lesser costs.

Reference will now be made to other embodiments of the present invention:

UNIVERSAL CODE (UC): Under some embodiments, OneMany does not look to associate a number to words in the strict sense of the meaning (while associating codes to single words may occur, this may be the result of the fact that a single word will accurately describe an Intention, Event, Action, Category, Sub-Category, Attribute, Behavior, etc.) Under one embodiment, it is the intention of OneMany to associate numbers or string-codes to the least number of words, which when taken together, will accurately describe an Intention, Event, Action, Category, Sub-Category, Attribute, Behavior, etc. OneMany may determine the Universal Codes that will be associated to certain Intentions, Events, Actions, Categories, SubCategories, Attributes, Behaviors, etc, while in other cases, it may be the Consumers/Users who will determine/associate Universal Codes to Events, Actions, Categories, Sub-Categories, Attributes, Behaviors, etc, in doing so, taking into account this general rule as defined by OneMany, and their own personal needs.

A "Universal Code" (UC) may be the lowest form of abstraction that can be associated with a Category, Subcategory, Attribute, Action, Behavior, within the scope of Product/Service.

Example:
DNA=0723750010.1.211.L1311124
2 is a Universal Code

A single Universal Code (UC) may be associated with a single Intention, Event, Action, Category, Sub-Category, Attribute, Behavior, etc, this being the lowest level of abstraction for a UC.

A "Universal Code Sequence" may be the concatenation of two or more UC's within a DNA Field (see "DNA Field" definition below).

Example:
DNA=0723750010.1.211.1.1311124
1112 is a Universal Code Sequence (formed of UC's "1", "1"; "1", "2", each associated with a text option).

The "Universal Code Range" may be a numerical representation of the string, or numerical values that will be assigned to UC's, which will associate with text options for a particular event case. For an Attribute, for example, the Universal Code Range might be 1-100. Therefore, if selecting an option that has UC "5" associated with it, string "DOS" would be inserted in the Universal Code Sequence of the DNA.

A Universal Code (DC) may have Global, Absolute projections in certain cases, and Relative projections in other cases.

Global Universal Codes: Absolute Universal Codes determined by OneMany which are constant in value, association. While the "Absolute" values of Universal Actions, such as "Offer".

Example:
Action "Offer"=UC "1", While the value of "1" may, and can change in the future, the Action "Offer", and the Absolute value of the UC will remain Global.

Relative Universal Codes: Universal Codes which may be determined by 3rd party, Vendors for example, and which mayor may not playa Global role. They are at least Local to the Product/Service offered by the Vendor. There will be a "Global" relationship at least between the Vendor who is offering a Product/Service, and the Consumer, who is requesting the Product/Service. This is because the Vendor will determine the Relative Universal Codes that will define the Product/Service through associating the DC's with the Categories/Attribute Describing and Defining the Product/Service. In projecting a Request for the Product/Service, the Consumer may select through Categories/Sub-Categories/Attributes, using the Vendor's UC's in constructing the Consumer Request DNA.

Consider the following Use Case example: In Defining and Describing an "Apartment" you will get to the Attribute "Floor". The Attribute name "Floor" will have a range of possible Values (e.g., 1-100). The Attribute name "Floor" can take on UC string values that are determined interactively by the user. The Universal Code values may be a string value of the actual value selected/inputted by the user, or it may have an altogether unrelated value with the actual value selected by the user, as this would be a Relative Universal Code. In other words, the user may select 5th floor, which may have Vendor-determined associated UC string value of "78".

OneMany DNA: A "DNA" may be a complete sequence of concatenated UC's, delimited by an IP-like ".". A DNA may contain information representing, for example: Creator ID, Transaction Type, Product/Service Category, Product Identifier, Attributes, Auction/Bidding Min/Max (optional/case dependant), Custom-Vendor AI Behavior, Standard OneMany AI Behavior, Second User ID (optional/case dependant). The following are two examples (with the "." delimited fields described below each DNA:
Offer DNA:
0723750010.1.211.1.1311124.020.000
   Creator ID. Transaction Type. Product/Service Category. Product Identifier. Attributes.
   Custom-Vendor AI Behavior. Standard OneMany AI Behavior
Auction DNA (+active winning Bid ID):
9999999999.4.11.1.040.090150.020.000.7777777777
   Creator ID. Transaction Type. Product/Service Category. Product Identifier. Attributes. Auction/Bidding Min/Max (optional/case dependant).Custom-Vendor AI Behavior. Standard OneMany AI Behavior. Second User ID (optional/case 30 dependant)
   A "DNA Field" is the leading delimiter (".") together with the DC Sequence up to, not including the next delimiter (".").

Example:
DNA=0723750010.1.211.1.1311124.020.000
.1 is the DNA Field "Transaction Type"
A "sub-DNA Sequence" is two or more DNA fields in sequence, separated by delimiters (".")
Example:
DNA=0723750010.1.211.1.1311124.020.000
.1.211.1.1311124 is a sub-DNA Sequence
"DNA Grouping" is two or more DNA Fields that are separated by one or more DNA Fields.
Example:
DNA=0723750010.1.211.1.1311124.020.000
.1 . . . 1311124 is a DNA Grouping
Sample OneMany DNA:
Offer DNA: 0723750010.1.211.1.1311124.020.000
Auction DNA (with active winning Bid ID):
999999999904.11.1.040.090150.000.000.7777777777
Example OneMany DNA, Fields Definition
  1. User ID
  2. Transaction Type (Offer/Request/Auction/Bid/Wireless/Search/Instant DNA Robot/ . . . )
  3. Product Categories
  4. Product Identifier
  5. Product Attributes
  6. Min/Max. Bid (Optional/Auction/Bidding dependant)
  7. Custom-Vendor Intelligent Behavior/Artificial Intelligence
  8. Standard OneMany Intelligent Behavior/Artificial Intelligence
  9. 2nd User ID (Optional/Auction/Bidding dependant)
Sample OneMany DNA:
Offer DNA: 0723750010.1.211.1.1311124.020.000
Auction DNA (with active winning Bid ID):
9999999999.4.11.1.040.090150.000.000.7777777777
   Creator ID (i.e., Auction Vendor ID (999999999))
   Transaction Type (Request/Offer/Auction (4)/Bid/Wireless Voting [ . . . ])
   Product/Service Category (1–n: Consumer Electronics(1), Car Stereo(s))
   Product Identifier (BlauPunkt (1)
   Attributes (1–n: Watts(040))
   Min/Max Bid (Optional/Auction/Bidding dependant) (Min Bid(090), Target Price(150))
   Custom Vendor Intelligent Behavior/Artificial Intelligence (000—No AI setting)
   Special purpose OM Intelligent Behavior/Artificial Intelligence (000—No AI setting)
   Second User ID [Winning Bidding ID(777777777)]
Sample Artificial Intelligence Behavior Fields in DNA Embodiment;
   DNA Fields.000.000
   DNA Fields. 000.AISettings
   DNA Fields. AI Settings.000
   DNA Fields. AI Settings. AI Settings
   DNA Fields. AI Settings. NO=>DNA Fields.AI Settings.000
Sample Path of Execution:
   Loop through Attributes;
   Come across specific Attribute AI Keyword;
   Insert the AI Filed Delimiter;
   Loop through Custom-Vendor AI Options
   Note: If AI Keyword occurs in "Attributes", then those AI options are Custom made (for the Vendor) AI behavior, determined by the Vendor, located in OneMany, in this case.
   Either User_Agent selects whether to entertain additional "OneMany Local" AI Options, if there should be any available.

Note: After the Products Attributes are completed, One-Many may offer additional standard/premium AI Behavior options. If this is the case, and if the User_Agent selects any, the corresponding DC's are introduced in the second AI DNA Field. Otherwise, the second AI DNA Field is set to "000".
Process Attributes, DNA in current State: "0723750010.1.211.1.1311124"
If "Artificial Intelligence Services"=True Then
  Extract DNS, NDL
  GoTo DNS, Execute NDL
  Populate Options
  Select
Loop
When "Loop" complete, Offer DNA="0723750010.1.211.1.1311124.020.000"
In the AI setting "020" above, the user has selected only 1 AI option: "2"
DNA Evolution (thus Active DNA Robot Evolution), Automated Intelligent Behavior
  The DNA in the "Active DNA Robot" State can undergo "Evolution".
  "Evolution" is warranted in the cases where a User-Creator has executed a DNA with Fields containing missing UC-settings. For example, the user might not specify the selling price for his/her house. This field might be left unanswered, 9r a "Make Me an Offer" UC wildcard might be used.
  The Evolution of a DNA will be triggered by another Active DNA Robot, for example.
  An "Evolved" DNA as a consequence of interaction with another Active DNA Robot, will be able to be able to give a clear answer/clarify an issue which was not dealt with, was not covered, was left ambiguous in the previous State.
  An Evolved DNA will offer more information/answer more questions to other Active DNA Robot's in future interactions.
Categories/Products
  In adding a Category/Attribute to the definition of a "Product/Service" DNA, a predetermined UC will take a predetermined location in the OneMany DNA.
  Special purpose "Wild Card" UC symbols associated to the 'Let Me Know What You Need' option for example, can be introduced in the Product/Service DNA as a consequence of selecting an option such as "Let Me Know What You Need".
Sample Rule:
  Upon Activating a Request DNA Robot, "Specific" information with respect to specific Category/item/Attribute and therefore Category/Item/Attribute-specific UC will "force" evolution in a matching Offer DNA's Category/Item/Attribute from an Active Offer DNA Robot, if and only if the corresponding Category/Item/Attribute of the Offer DNA from the Active Offer DNA Robot has "Let Me Know What You Need" UC Wild Card.
  This can entail the following types of functionalities, for example:
    The Offer DNA Creator will Activate one Offer DNA Robot with one or more "Let Me Know What You Need" "Wild Card" UC(s) for specific Categories/Item/Attributes defining the Offer DNA. Upon an Active Request DNA Robot engaging the Activated Offer DNA Robot with "Specific" setting of "Dell" UC for the corresponding "Let Me Know What Yon Need" UC, the Active Offer DNA Robot User-Creator will have a range of options such as:
    Maintaining 1 Active Offer DNA Robot with "Let Me Know What You Need" Wild Card UC, and creating additional Instant Offer DNA Robots with "Specific" Offer-Items upon being able to satisfy "Specific" Requests upon interaction with "Let Me know What You Need" Offer. This will enable the Offer User-Creator to create specific Offers only when there are specific Requests for the items the Offer User-Creator has available.
    OR
    Allowing the initial Active Offer DNA Robot to evolve to an Active Offer DNA Robot with Specific offer-information in place of "Let Me Know What You Need".

| Offer | Request |
| --- | --- |
| Specific | "Make Me an Offer" |
| "Let Me Know What You Need": | Specific ("Dell") |
| "Can I Make U an Offer?" | "What Do You Have? |
| "Can I Make U an Offer?" | "Make Me an Offer" |

OneMany "Wormholes", as it Applies to Data Storage, Data Access: Participating Vendor/Consumer Data in the OneMany solution may reside at the Vendor's location (unless otherwise directed). Participating Data may be formatted in such a way that each Data-selection by a User_Agent accessing the OneMany service, will have a DNS and NDL associated with the selection that will instruct OneMany "Where" (DNS) to get the next set of Data-options from, and "How" (NDL) to get it.

This is where the principle of One Many "Wormholes" becomes evident: A Product/Service is Defined by Categories, Subcategories. Each Category/Subcategory will determine another set (1 or more) Subcategories. Each Category/Subcategory will have associated with it the Data Location of the Subcategories that it implies, and "How" to "Get" this Data. The name of a Stored Procedure can for example be set to NDL, such that in the next State, the Process will "go" to the Specified Data Location, and execute the Specified Stored Procedure.

The Data returned by the Stored Procedure will be consumed/parsed by OneMany, which will present this Data to the User_Agent in the form of set of Text-Options. Upon the User_Agent executing a selection, the procedure will repeat. This enables the OneMany Solution to offer a New Business Model/Solution where there can be Unlimited Data Participation with limited impact on Data Storage. It also enables OneMany to host ONLY Active Offers/Requests, as each Active Offer/Request represents the explicit, and specific interest of a User_Agent.

With respect to Attributes, which "Describe" a Product/Service, most often there is no "Sequential"[1] relationship between the Attributes. More specifically, one Attribute will not imply/determine the next set of Attributes, as is the case with Product/Service Categories, which "Define" the Product/Service. Consequently, when the User_Agent interaction moves to "Attributes", the entire set of Attributes-Data can be copied and reside temporarily in the OneMany Domain. The User_Agent will complete the Offer/Request DNA, with the VendorAttributes being served from OneMany. However, this is not required, and depending on the Vendor option, the Product/Service Attributes Data can also be served from the Vendor's Data, Location.

PRODUCT/SERVICE: A Product or a Service may have Lowest Common Denominator text descriptions that can Define and Describe a Product. A product/device can de DEFINED by one or more Categories and/or DESCRIBED by 1 or more Attributes.

There may be a hierarchy-relationship between the Defining Product Categories/Sub-Categories, and one Category will determine a set of one or more lower level, related subcategories. Each defining Category/Sub-Category may be described by one or more words. The ideal is to use a minimum of words to describe/represent a category without sacrificing clarity, or proper representation. A Product or Service has one or more Attributes describing it.

There may or may not be a hierarchy relationship between the Attributes. Most likely, one Attribute will not determine the next. The Product Categories and Attributes describing it will have UC's (Universal Codes) associated with them. Thus, a UC will be associated with the word/words describing a Category/Sub-Category/Attribute. In effect Pseudo NLT (Natural Language Text) will represent a cumulus/compilation of Categories/Subcategories/Attributes, Defining and Describing a Product/Service. This Pseudo NLT will have a concatenation of UC's associated with it, making up a Product/Service "sub-DNA Sequence". A OneMany DNA will contain a larger/complete concatenation of UC's (Universal Codes) projecting (in addition to the Product/Service) User/Creator ID, Transaction Type, AI Functionality, etc.

Note:
- It is important to realize that the scope is NOT to map a Universal Code to ONE Text Word.
- You map a Universal Code to the least number of words (one or more text words), which when taken together, will accurately describe "that" Action (Ie., "Offer"), or "that" Product/Service Category or Attribute.

Example:
- Attribute Name: "Processor"
- Minimal Text Description: "Pentium 200 MHz"
- UC: "5"
- A segment of the Pseudo NLT projecting the Product: " . . . Processor Pentium 200 MHz . . . "

USER AGENT: A User-Creator is in direct relationship to the Solution. In this example, there has to be a User-Agent in order to have a DNA Robot activated:
- A User initiates an Offer/Request process; The User-Agent selects the Categories/Attributes, defining the Product/Service.
- An Automated process constructs the OneMany DNA, using the DC's associated with each user selection,
- Upon finishing the process, the User-Agent has created a DNA, triggering an Offer/Request/Voting/etc DNA Robot.
- Note: In this example, there is a direct relationship between User_Agent-Intention-Product-UC-DNA-Offer/Request DNA Robot-Intelligent Behavior.

Relationship:
- User: Manifests, Defines, Describes an Intention+Product/Service+Intelligent Behavior by selecting options that will determine Universal Codes; Creates DNA;

Manifests an Intention by Activating an Offer/Request DNA Robot;
- Product:
- Is Offered/Requested;
- Is defined by UC;
- Is described by UC;
- Is projected by DNA;
- Has Behavior added to it, being transformed into a Cyber Active Offer/Request DNA Robot;

Offer|Request:
- Takes the Intention of the User_Agent with respect to a Product/Service, and projects this into an Active Cyber Presence, where speed and efficiency, (among other things) become a defining characteristic.
- UC (Universal Codes)
- Codes associated with Intention, Categories, Attributes, Intelligent Behavior, composing a DNA
- DNA: Is the coded logical representation of an Intention+Product/Service+Intelligent Behavior;
- Active Offer/Request DNA Robot:
- Required "Element/Entity" to Activate an Offer/Request DNA.

Robot:
A Robot can be a "server", a process, a software executable. A Robot can also be a server process extended with a mechanical device. A Robot functionality without the OneMany DNA is considered a Potential Robot. A Robot functionality with a OneMany DNA is considered a Active Robot. A "Live" Robot is a Server Process/Mechanical Device that was "born" when a DNA was created by a "Creator" for "this" Robot. A Robot functionality with a neutralized DNA is considered a Passive Robot; A "High Level Robot" will include all that it needs to function, such as: Database, Hardware, Intelligent Behavior, etc. A "High Level Robot" will also include Intelligent Behavior, which can be special purpose Robots that will have specific goals within the scope of the General Robot Scope.

Sample Top Level Robots
- Offer;
- Request;
- Instant;
- Wireless;
- Auction;
- Counterfeit;
- Search;
- Voting;
- Etc.

Note: In many cases, everything may be rationalized as an "Offer" or "Request", whether it is for a Product or a Service.

Sample High Level Robots
- Real Estate
- Social Networking;
- Consumer Electronics;

Artificial Intelligence Robots
Special purpose Intelligent Behavior, within the scope of Higher Level Robots, triggered by special purpose settings in the OneMany DNA.

For example:
The "Get the Number of Average Offers per Hour" Robot-Scope. This is a special purpose, "Intelligent Behavior", lower level Robot, Activated by a higher level Robot due to a specific setting in the DNA. This Robot-Within-a-Robot is "Intelligent Behavior", Sample Robot Intelligent Behavior
- Life span
- Matching preferences
- Contact Information
- Bidding
- Bidding target
- Programmed Behavior: Unique special purpose "DNA" within the Robot will enable custom made, programmed behavior stored in the Intelligent Business Domain.

Notes Regarding Various Embodiments of the Present Invention:
- Relation between all Active Robot DNA's: They will all have an ID, Offer/Request (Transaction Type) setting in common;

Relation between an Offer/Request Creator, and an Active Robot DNA: for example, there can't be one without the other;

Relation between and Active Robot, and a Product/Service: a DNA will define, describe a product in harmony with other DNA's in the same higher-level Category, while an Active Robot will add 3-dimensional characteristics, Distinction between DNA, and Active Robot: Robot will encapsulate/host DNA;

Relation between User-Creator, DNA, Robot: User-Creator will determine lifespan (birth, death). DNA+Active Robot triggered to life by an Active User Offer/Request;

Universal Codes mapped to a specific category (1 or more) defining the product;

Universal Codes mapped to a specific attribute (1 or more) describing the product;

Universal Codes form Product/Service DNA;

Delimiters identical to IP delimiters used to delimit distinct-in-scope Fields of UC's making up the Product/Service DNA;

The creation of a virtual Borg-like Robot environment made up of distinct IP-DNA's;

Intelligent Virtual Reality Universe defined by Borg-like Active Robots+DNA's;

The ability to express the Pseudo NLT of a DNA in the language of a corresponding DNA-Creator's without performing a translation.

Intelligent Automated Virtual Reality Environment
- A DNA Code has an IP-like structure (9999999999.4.11.1.040.090150.020.000);
- A DNA Code can be the unique name of a web page in a web environment: 9999999999.4.11.1.040.090150.020.000.asp Consider the Following Virtual Reality Example Case Scenario:
- VR Universe simulating streets in NYC as they are in reality;
- Real life vendors can elect to populate VR environment;
- A User from any part of the world can enter and navigate the virtual streets of Manhattan, able to enter the VR environment at any virtual location;
- A User entering at 48th & 5th navigates up 5th Avenue;
- The User approaches Sack's 5th Avenue location, using VR LOD methodology. Sack's becomes visible to the user;
- As Sack's becomes visible, distinct vendors advertisements can become visible to the User, as the User approaches, and relative to the User;
- The User can navigate to enter the store through any portals designed to be available to the user;
- The User sees an advertisement in a window for Armani suits;
- The advertisement is a portal. The User enters.

Note: Up to this point, if considering a 2-D environment, Sack's 5th Avenue would be an option from a dynamic selection box. As in a 2-D environment an "Offer/Request" selection would have to precede the "selection" of Sack's. In a 3-D VR environment, selection of "Offer/Request" is done automatically by the "system", as selecting Sack's would imply categorically a "Request", as Users can only "Request" items from Sack's.

Therefore, when the user enters Sack's by navigating through the Portal "Armani Advertisement", the following occurs, invisible to the user, and comparable to making successive selections from an Options Select Box:

Because in Sack's a User can only Buy/Request, a "Request" UC is inserted in the DNA.

Because the "Armani" advertisement was on Sack's window, a "Sack's 5th Avenue" UC is inserted in the DNA.

Therefore, up to this point you have a sub-DNA Sequence composed of UC's "User ID" (as the User ID was inserted in the DNA when the User entered VR world), "Request", "Sack's 5th Avenue", "Armani Suits":

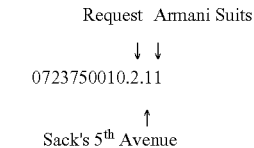

Upon entering through the Portal, the User is introduced in a new VR World, as defined by "Armani Suits";

A range of options may be available, as determined by the design of "this" VR store, as you can have different designs with different functionalities at different prices;

The User can view different suits in 3-D, navigating around a suit in all directions;

Once inside the Store, another premium feature of the design of this example, at a cost, is that the Store can be "as big" as it needs to be, in order to expose as many items as necessary (this being an illusion achievable through programming). The flipside of this is having a finite-size store for the vendors with a budget;

Each suit has a UC associated, with it, equivalent to associating a UC to a "Product Identifier";

The User can execute buying a suit with specific measurements;

Note: At this point, a range of solution-options are available.

For the sake of this example, we will depict the following procedure:
- The User executes buying a suit;
- The User selects to have the suit sent to the address associated with his/her ID;
- The User selects to have charge apply to the wireless device account;
- The VR "store assistant" will process payment while the User is "waiting in the store";
- Charge was approved, the Transaction is committed, the User is ported outside the Store, at the point where he/she initially entered (or at another promotional place within Sack's 5th 5 Avenue).

Note: At this point you have the following Request DNA fired by the User:

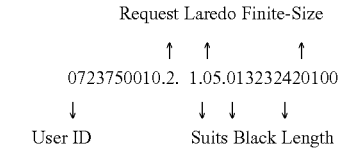

WIRELESS DEVICE, NETWORKED ROBOT FUNCTIONALITY: Use of current wireless devices or new, enhanced AI-enabled wireless devices. Upon a User/Vendor executing an Offer/Request, the User will have the option of selecting, and downloading (on its wireless device) special purpose AI Robot Functionality specific/within the scope of the Offer/Request.

There may be a premium fee charged to the User for this added service/leased advanced functionality, and a determined temporary period that this AI functionality/AI Module will reside on the User's device.

Take the example case when the User is a Real Estate Agent. The Agent executes an Offer for a client's property. The leased intelligent behavior residing on the Agent's wireless device will enable the Agent to obtain added functionality such as (for example):

Every time the Agent's Offer DNA Robot is engaged by a Request DNA Robot, the "Flag" for "Extended AI Functionality" associated with the Offer DNA Robot in the OneMany domain will be raised.

Consequently, regardless of the matching truth-value of the Request DNA, the Request DNA will be forwarded by the OneMany domain to the Agent's wireless device.

The Intelligent functionality residing on the wireless device will analyze (by interacting with 5 the OneMany domain) the Request DNA. Using the Request DNA, the Intelligent functionality resident on the wireless device will obtain information of interest to the Agent, from the OneMany Request DNA Robot, regardless if there is a match.

The Agent wireless device-resident AI functionality will interact with the OneMany domain, independent of the User Agent. The information that can be of interest to the Agent such as what specifically the Request-Creator is interested/looking for and details describing the property the Request-Creator is looking for.

The Real Estate Agent may be able to exploit this information in the future, if aware of it 15 sooner rather than later.

The Agent wireless device-resident AI functionality may be able to communicate with other distinct servers (software/mechanical) to store the information for example. As a case scenario, the wireless device will communicate with a laptop, sending the information obtained from the Request DNA Robot for storage in a desired format.

The communication with the laptop can be done in a number of ways.

OneMany Anti-Counterfeit Functionality, Case Scenario Example 1:

Street vendor selling brand perfumes at the open marketplace.

Well-intended, "educated and informed" consumer wishing to purchase.

The price is a bargain, but the consumer is more interested in the authenticity.

Under OneMany solution, the package will be accoll.ll-panied by a OneMany intelligent Robot (either as a distinct certificate label, overt printing, ad-on sticker . . . ).

The Consumer will be able to "execute" the Robot on his/her wireless device prior to purchasing.

The absence of this Robot certificate is a clear sign of danger.

Upon executing the Robot, the Consumer will instantly get matching Robot information, such as (for example): picture, description, whether "this" item was already sold, whether there were more inquiries about "this" item, and the number of distinct inquiries; the authorized "owner" (retailer) of this item . . . suggestion to avoid (or not) buying "this" item.

Other potential ramifications as a result of Consumer participation in deterring counterfeit products: Material gratification for the consumers participating in the Global 0-tolerance for Counterfeit Products.

OneMany Anti-Counterfeit Functionality, OneMany, Case Scenario Example 2:

Brand Company turns over to manufacturer.

Intelligent Evolution-Robots become part of the process. This at a micro (per item) an/or macro (batch, case, . . . ) depending on the determined needs.

Manufacturer turns over to wholesaler/distributor. Robot Evolution occurs, reflecting current state.

Distributor turns over to retailer. Robot Evolution occurs, reflecting state (as state needs to be defined, as determined by applying needs).

Consumer purchases Nike footwear from Retailer.

Nike footwear has OM Partial-Robot branded on its bottom, or an item-specific Robot certificate is inside the box.

Consumer executes Robot (Partial-Robot from Nike footwear+Vendor ID) and receives 10% (more, or less, determined dynamically in real time by the Brand-Company) discount from the Brand Company.

The 10% discount is activated, and taken off the total when, and only if Vendor also executes Vendor-specific Robot (Vendor TD+Partial-Robot from Nike Footwear) discount.

The consumer gets discount from Vendor, and the Vendor receives reimbursement from Brand-Company.

Figure 24A:
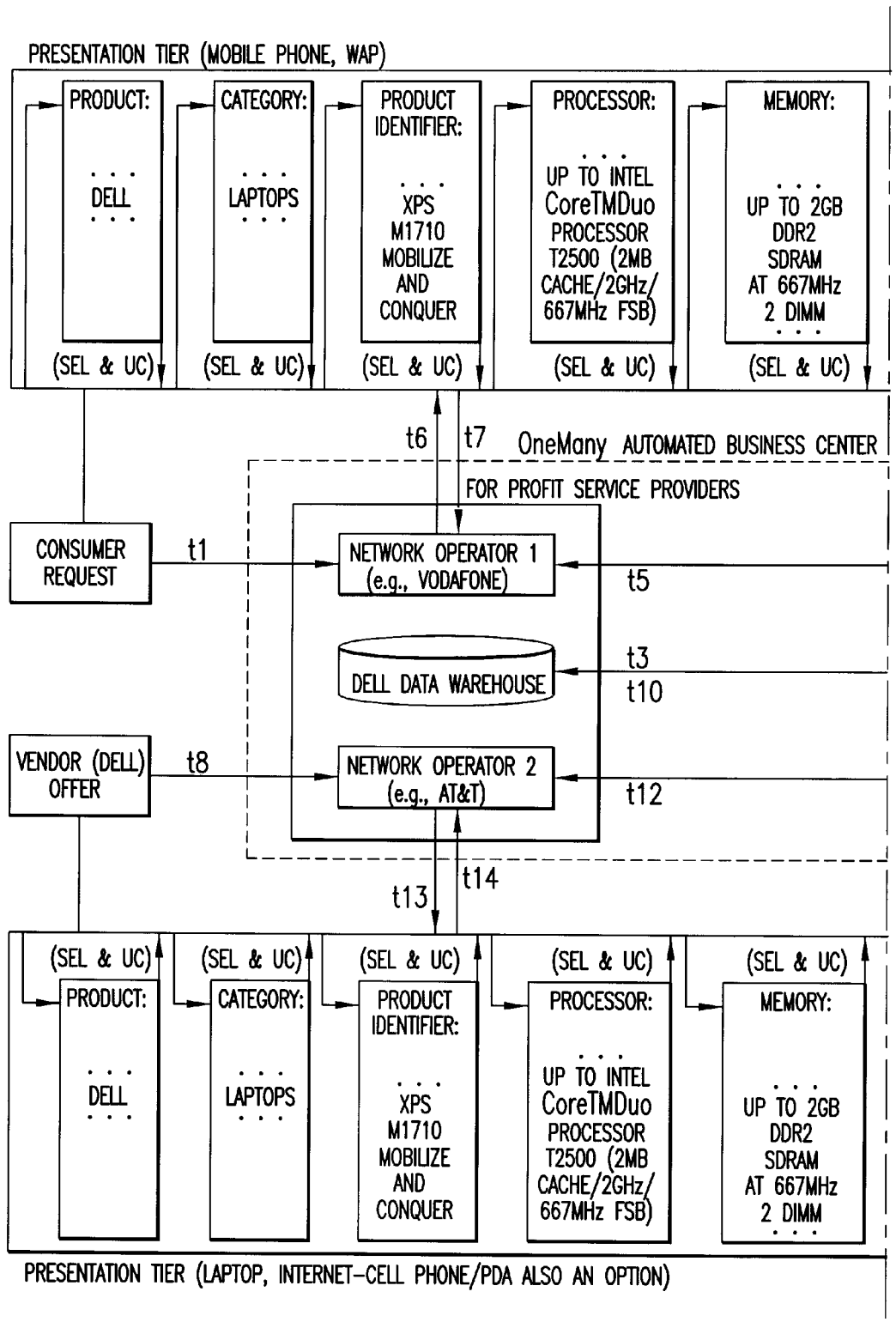
Figure 24B:
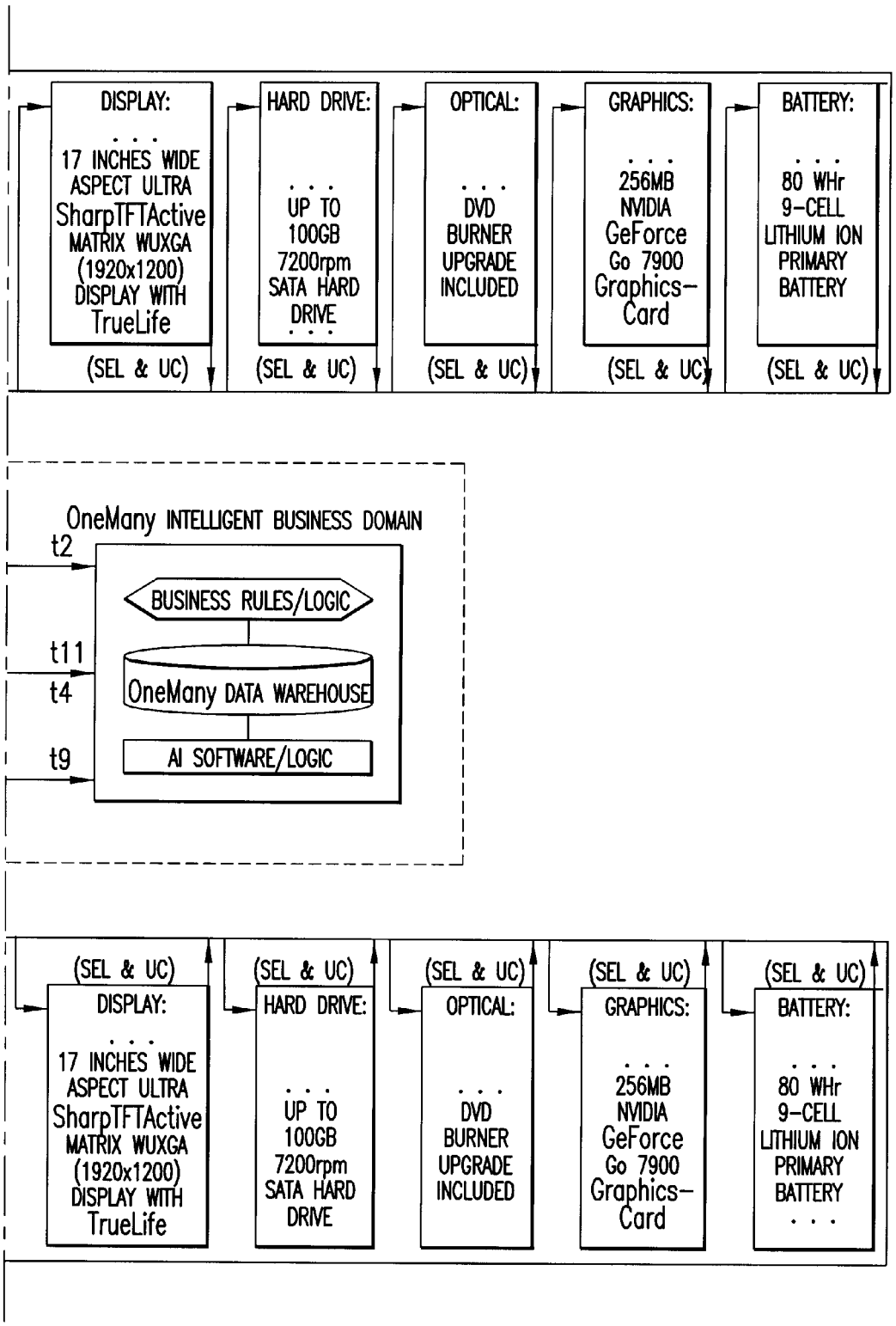
Figure 26:
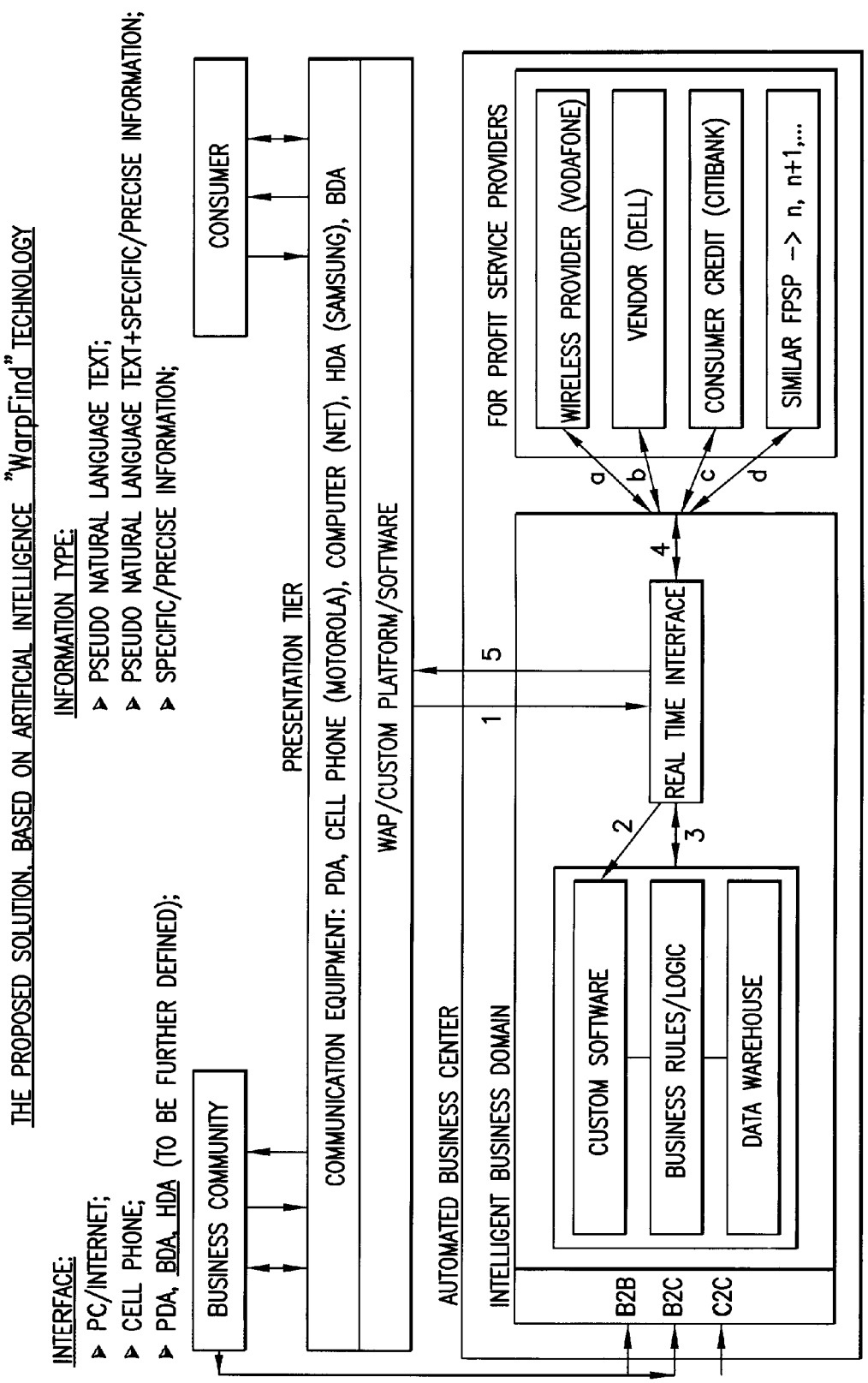
FIGS. 26-32 show additional various architecture concepts as may be applied in the context of various embodiments of the present invention.
Figure 27:
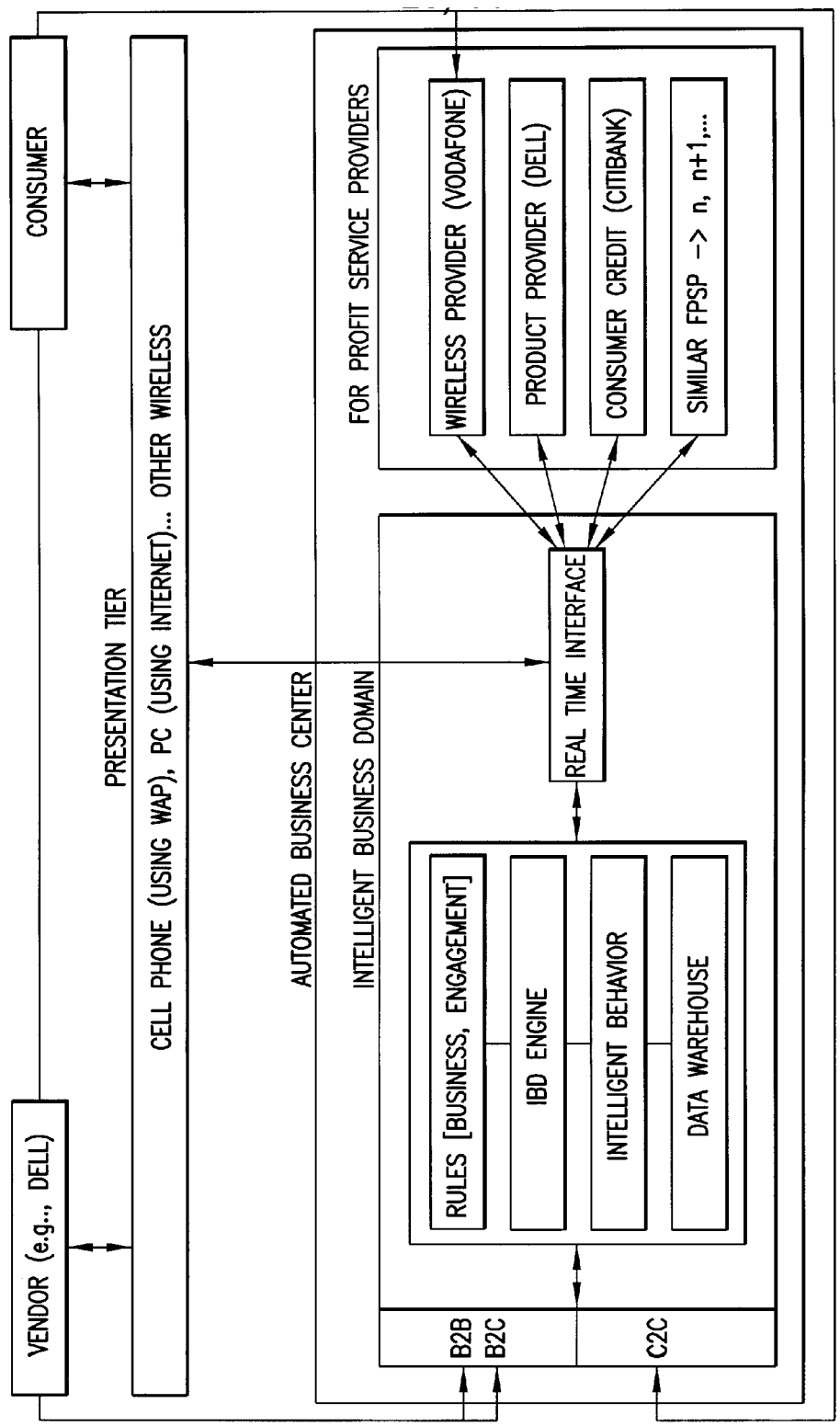
Figure 28:
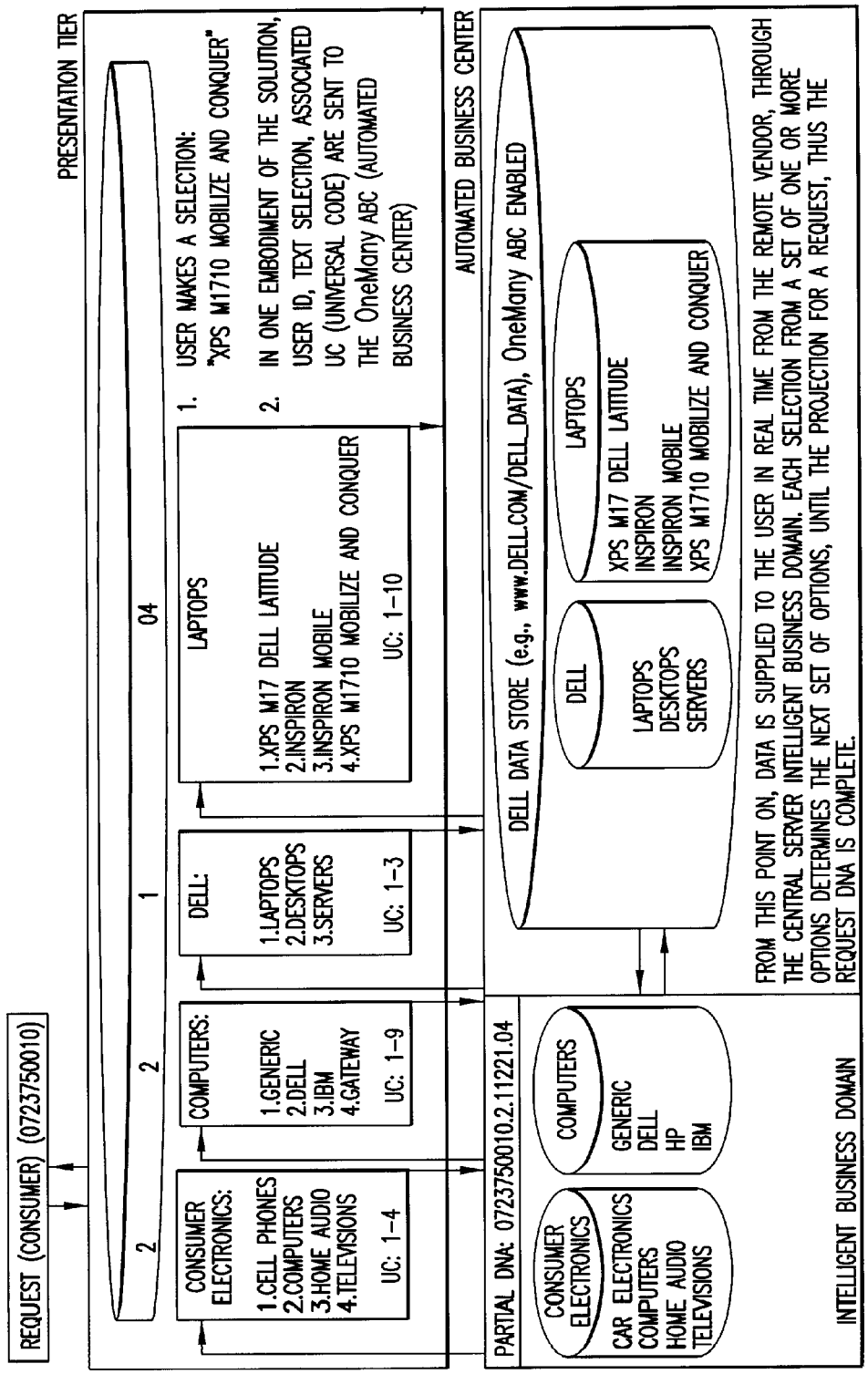
Figure 29:
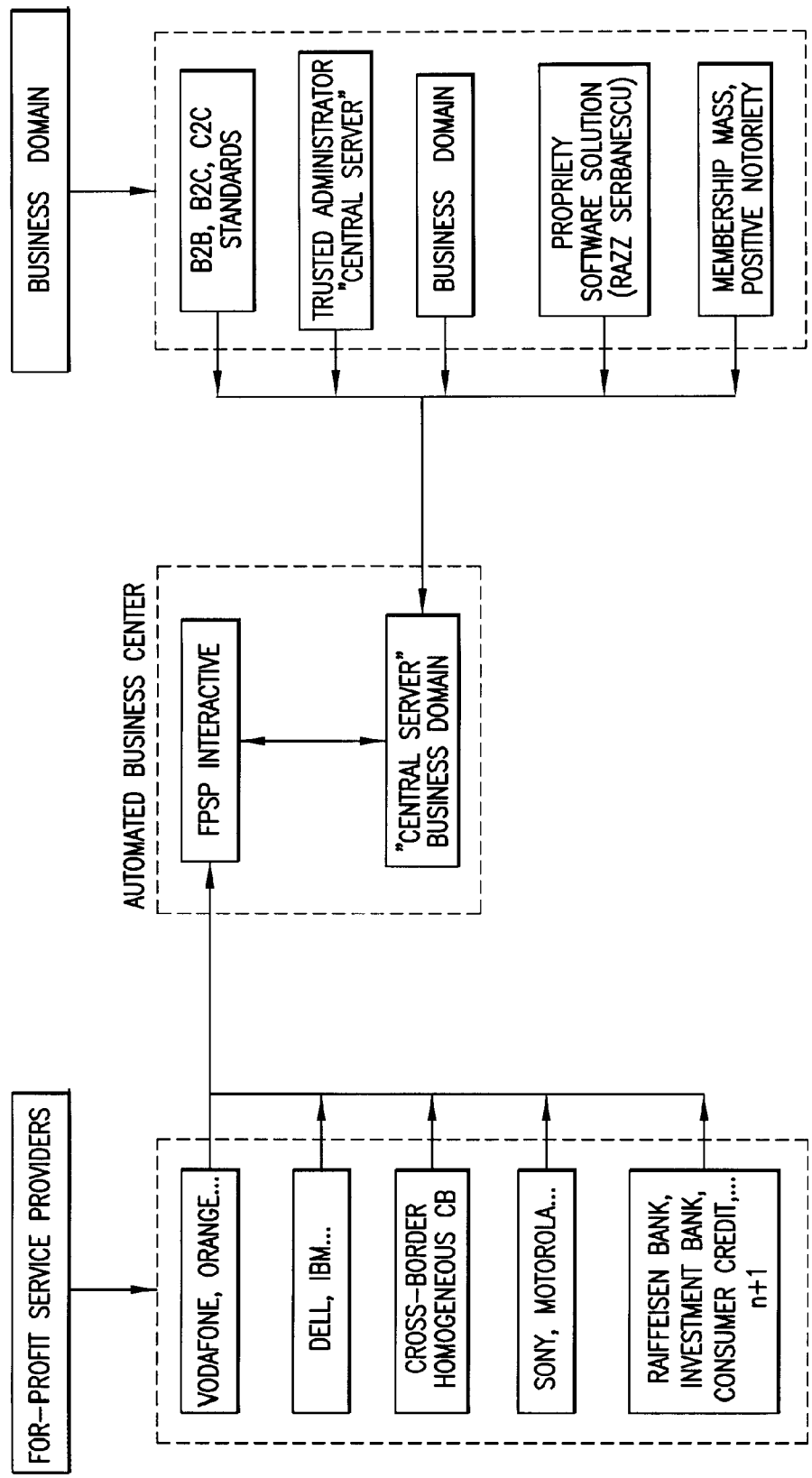
Figure 30:
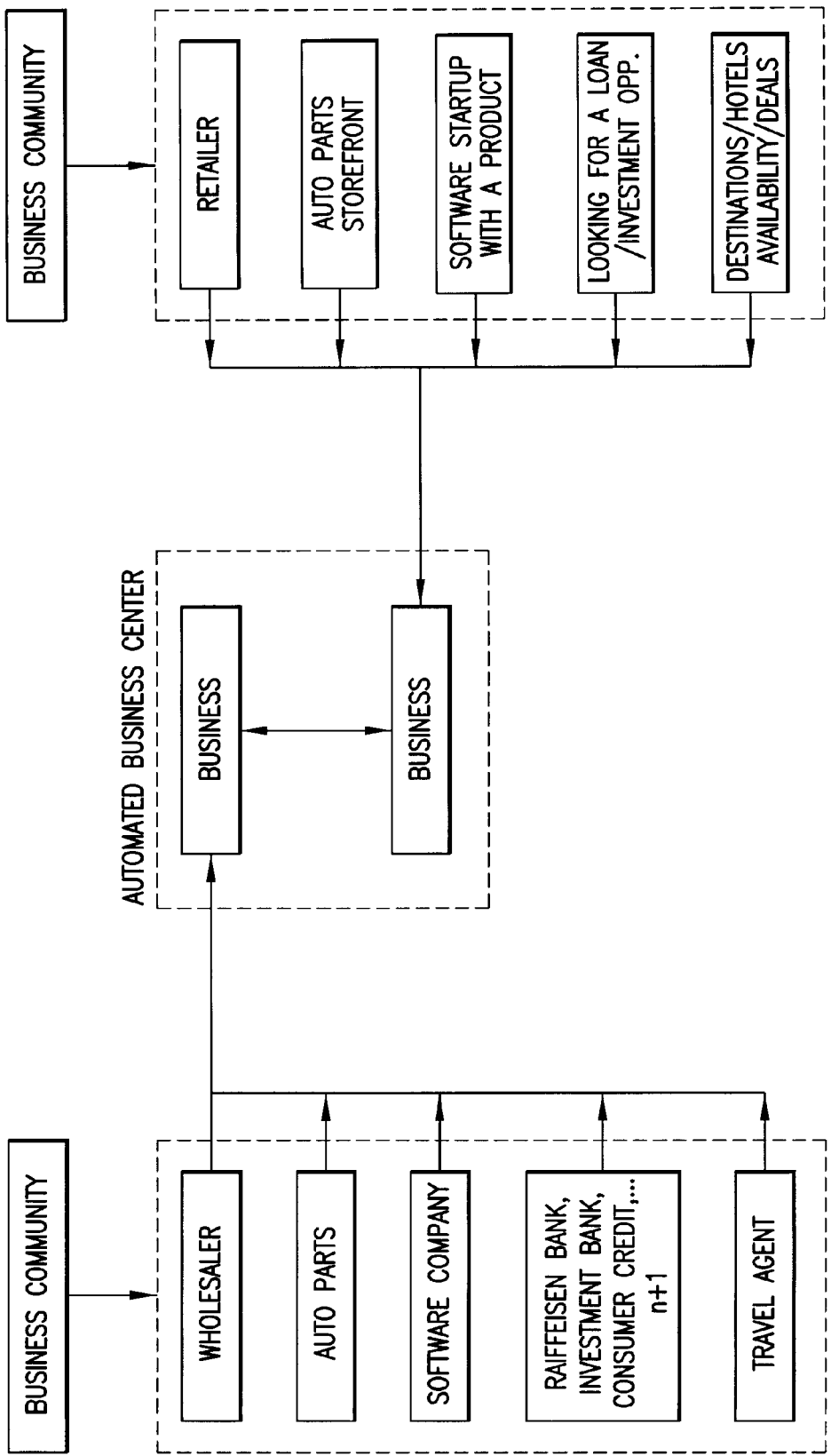
Figure 31:
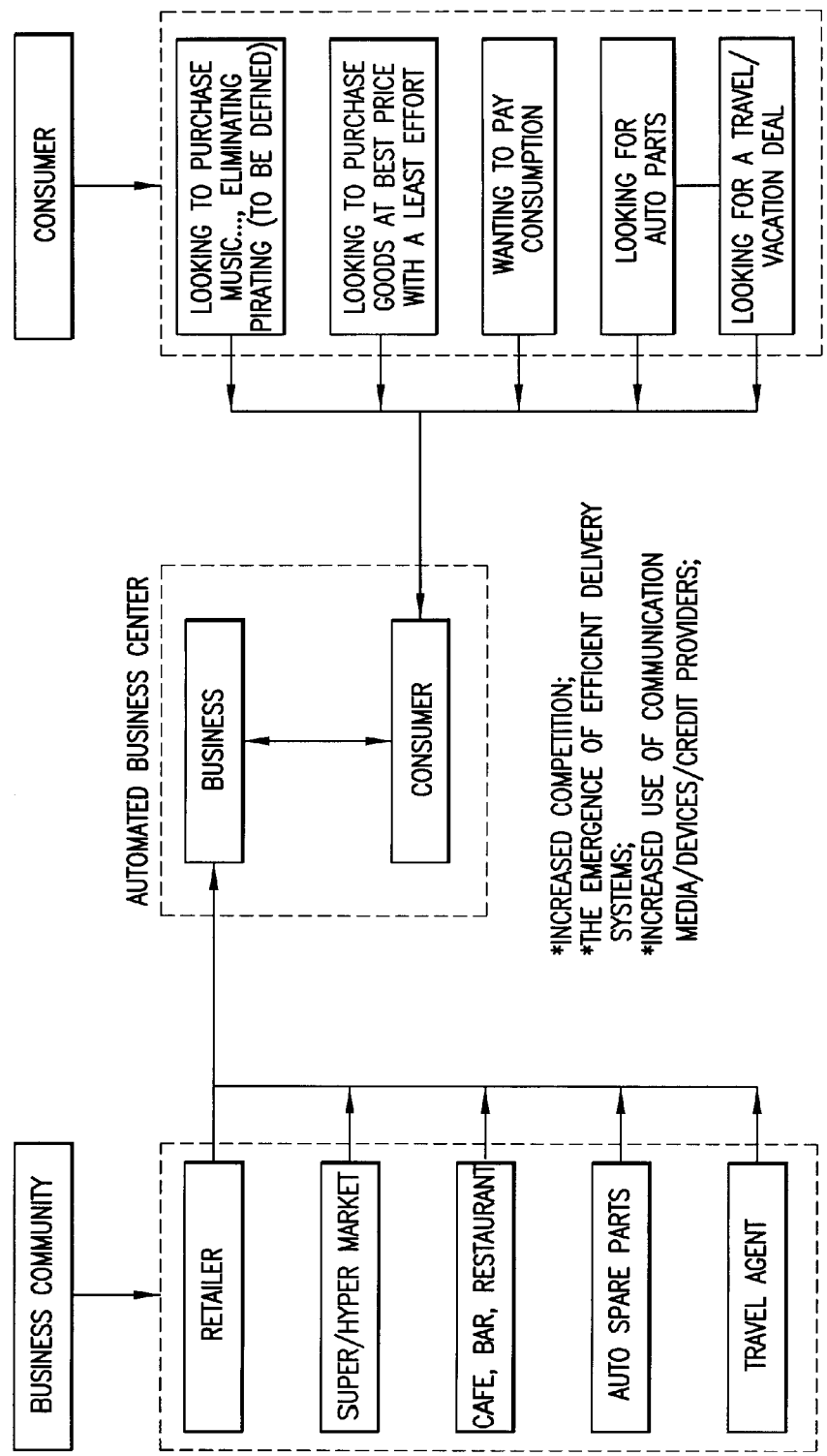
Figure 32:
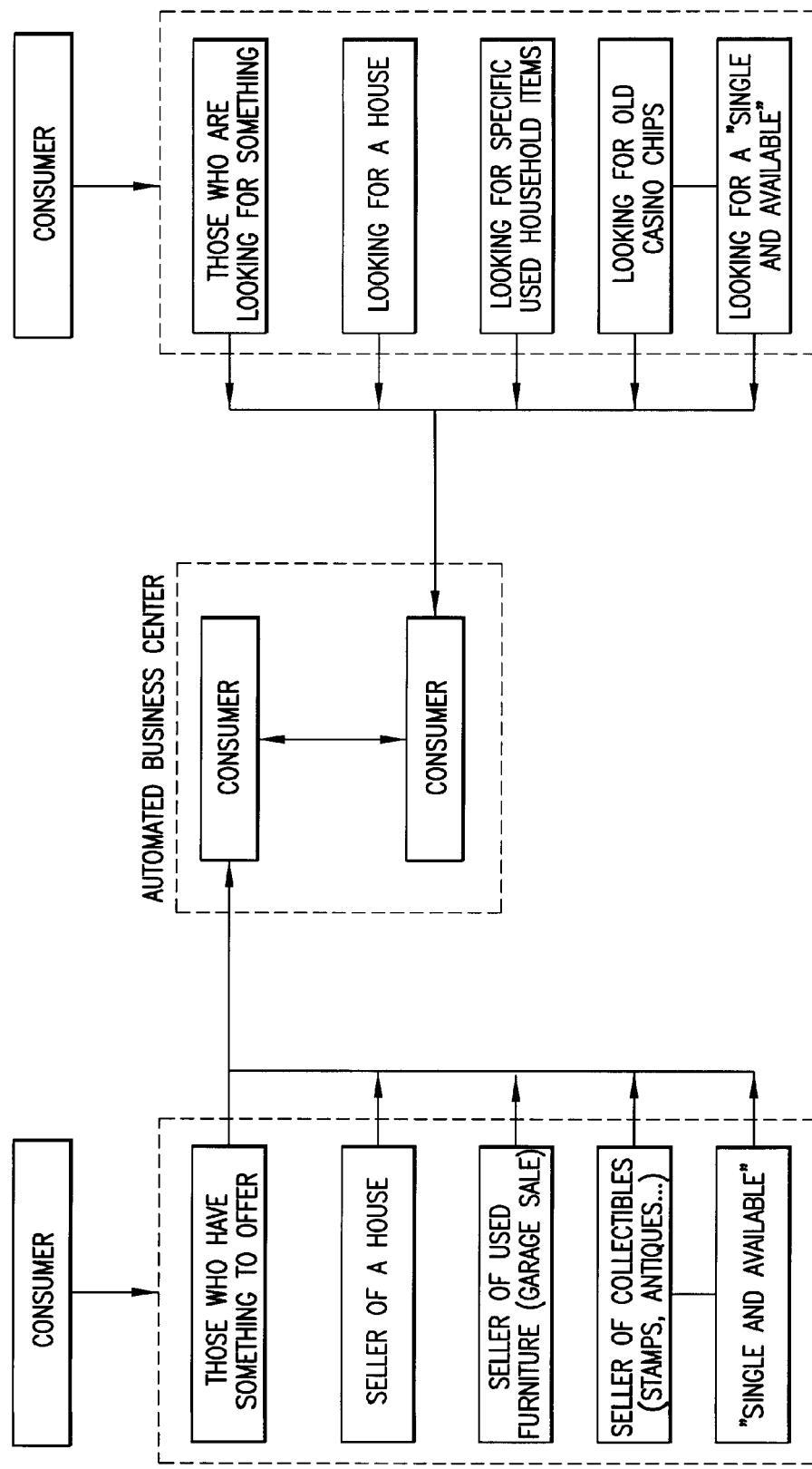

Referring now to FIGS. 24 and 25, an example Offer/Request Prototype for Network Operator is shown:

Offer/Request with Brand-Consumer Participation within the Scope of B2C:

A Vendor is registered with the OneMany Intelligent Business Domain (OneMany Data Warehouse), thus able to Offer through OneMany to other Vendors/Consumers as a "For Profit Service/Product Provider".

A Vendor will have an initialize DNS (e.g., DNS="Dell") registered with the Intelligent Business Domain (e.g., OneMany Data Warehouse).

The Vendor will have an initialize Rule (e.g., Stored Procedure name: NDL=Initialize B2C Request) registered with the OneMany IBD (e.g., OneMany Data Warehouse).

As a participant in the OneMany Automated Business Center, the Vendor will also have its top-level Category Data in Natural Language Text (for initialize-consumption by the Consumer: Dell), with an associated Universal Code (e.g., "1") hosted in the OneMany Intelligent Business Domain (OneMany Data Warehouse).

Using his/her local Network Operator (e.g., AT&T, Vodafone) in the process of Defining and Describing the Offer/Request, the Consumer will be able to select the Vendor (e.g., Dell) from the OneMany Presentation Tier (e.g., Cell Phone, WAP). Upon selecting a Text-Option, the Presentation Tier will return to the OneMany Intelligent Business Domain (through the Network Operator) the Text-Selection and the UC (Universal Code) associated with the selection, and the Consumer ID implicitly (e.g., Cell Phone number).

Subsequently, the Consumer will select an option from the set of options available, which upon selection, will determine the next set of selection options through interaction with the OneMany Intelligent Business Domain, Each selected Option will have:

A Natural Language Text Description (e.g., "Laptops");

An associated Universal Code (e.g., "1");

An associated OneMany "WormHole" NDL "Next Data Location"

(e.g., |DNS=Dell|NDL=Initialize Laptops Request|ATT=DNA)

The Consumer will be able to project a "Request" by successively selecting specific Options Defining and Describing the Product. Upon completing the projection of an Offer, Request, the participants—Vendor (e.g., Dell in the slide projection above) and Consumer, will have projected their Offer, respectively Request in Pseudo NLT (Pseudo Natural Language Text) with associated Universal Codes following specific rules, forming Offer, Request DNA's such as:

Offer DNA: 0723750010.1.211.1.1111111
Request DNA: 9999999999.211.1.1111111

At this point, we will have a summary recap of demo-functionality as projected in FIG. 24:

t1: Consumer initiates OneMany interaction by making a Request through network operator Vodafone.

t2: Either through a shortcut or by selecting a text-option, the Consumer will target the Request for Dell.

NOTE: Up to this point, the interaction is Consumer-OneMany exclusively.

t3: Following selection of "Dell" by the Consumer, OneMany requests the next set of options-data from Dell (Dell Data Warehouse).

t4: Dell returns to OneMany the next block of Data "determined" by the previous Consumer-selection "Dell": " . . . Laptops, Desktops, Servers . . . "

t5,6: Using the Intelligent Business Domain Engine, OneMany Intelligent Business Domain formats the Data for WAP consumption, and sends the Data (e.g., Laptops, Desktops, Servers, . . . ) to the Presentation Tier (e.g., Cell Phone/WAP) through the Network Operator Vodafone.

t7(2): Upon the Consumer selecting an Option (e.g., "Laptops"), the text-selection, along with the UC (Universal Code), along with the Consumer ID implicitly (e.g., Consumer phone number) are returned by the Presentation Tier through the Network Operator to the OneMany Intelligent Business Domain. The UC is used by the OM IBD to form the DNA for "this" Product-Request.

At this point, following the selection of "Laptops" by the Consumer, steps t3-t7(2) repeat, until the process of Requesting, Defining and Describing for "this" Product is complete. When the process is complete, the following is true:

A OneMany DNA is formed, projecting Identity (Consumer ID), Scope (Request), Product Definition (Categories-Dell, Laptops . . . ), Product Description (Attributes), Intelligent Behavior Settings (OneMany, Vendor-specific)

Request   Attributes: All settings in blue are Attributes describing Processor, Memory, etc.
          ↑           ↑
9999999999.2.21   .1.1111111.010.101 →   The last six settings representing Intelligent Behavior
    ↓         ↓ ↓      ↓
Dell ID    B2C Dell XPS M1710 Mobilize and Conquer In addition to the formation of a OneMany DNA, there will be a OneMany Pseudo NLT (Natural Language Text) formed, associated to the OneMany DNA:

Request a Product or a Service-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery Consider the OneMany formatting of Attributes Data below. This is the "Describing" data which was used to serve the Attribute Names and Options forming the Pseudo NLT for the Request projected above. This is a multi-dimensional relation-based projection, a requirement for AI semantic web, which can be further projected in higher-level formatting. This data will be served to the user in the slide-projection above, through the OneMany Intelligent Business Domain, but it will be hosted on a Dell server, in the Dell Data Warehouse! In effect, the number of Vendors participating in the OneMany Automated Business Center, and transacting with the Consumer through the OneMany Intelligent Business Domain can be unlimited, with little or no impact on Data storage in the OneMany Intelligent Business Domain!

This is a quantum leap from SEAMINLGY-similar functionality from competitors that is enabled today:

|ATT: [Num_Of_Attributes=7][Attributes_Total_Num_Of_Digits=7]|1[Name=Processor][V alues=Up to Intel Core™ Duo Processor T2500 (2 MB Cache/2 GHz/4667 MHz FSB),Up to Intel Pentium M Processor 765 (2.10 GHz 2 MB Cache 400 MHz FSB) with Intel Centrino Mobile Technology, Up to Intel Dual Core Processor T2500 (2 GHz 2 MB Cache 667 MHz FSB) with Intel Centrino Mobile Technology, Up to Intel Pentium M 745 Processor (1.730 Hz 2 MB Cache 533 MHz),Others,][Units=String][UC_Order_In_String=1][UC_Length_In_Digits=] L[Num_Of_Digits_Before_This_UC=0][UC_Range_Values 1-5]|2 [Name=Memory][Values=Up to 2 GB DDR2 SDRAM at 667 MHz 2 DIMM, 1 GB shared DDR2 SDRAM standard Memory upgradable to 2 GB, 512 MB shared DDR2 SDRAM standard memory upgradable to 2 GB, 256 MB Shared DDR SDRAM standard upgradable to 1 GB,Others,] [Units=String][UC_Order_In_String=2][UC_Length_In_Digits=][Num_Of Digits_Before_This_UC=1][UC_Range_Values=1-5]|3 [Name=Display][Values=17 inches Wide-Aspect UltraSharp TFT Active Matrix WUXGA (1920×1200) display with TrueLife, 12.1 inches Wide Screen XGA display with TrueLife, 17 inches Wide Screen display up to an UltraSharp WUXGA resolution with TrueLife, Up to 15.4 inches Wide Screen WSXGA+Display with TrueLife, Others,][Units=String][UC_Order_In_String=3][UC_Length_In_Digits=1][Num_Of_D igits_Before_This_UC=2] [UC_Range_Values=1-5] 4[Name=Hard drive][Values=Up to 100 GB 7200 rpm SATA Hard Drive, Up to 80 GB Ultra ATA hard drive,Up to 120 GB Ultra ATA hard drive,40 GB Ultra ATA hard drive,Others,][Units=String][UC_Order_In_String=4][UC_Length_In_Digits=1][Num_Of_Digit s_Before_This_UC=3][UC_Range_Values=1-5] |5[Name=Optical][Values=DVD Burner Upgrade Included, 8× CD/PVD burner (DVD+/−RW) with double-layer DVD+R write capability,24×DVD/CD-RW Drive,24×/10×/24×CD-RW and 8× DVD-ROM,Others,][Units=String] [UC_Order_In_String=5][UC_Length_In_Digits=1][Num_Of Digits_Before_This_UC=4][UC_Range_Values=1-5] |6[Name=Graphics][Values=256 MB NVIDIA GeForce Go 7900 Graphics Card,Intel Extreme Graphics,Up to 256 MB ATI MOBILITY RADEON X1400 HyperMemory,lntel Graphics Media Accelerator 950 (with up to 256 MB of shared memory),Others,][Units=String][UC_Order_In_String=6][UC_Length_In_Digits=1][Num_Of_Digits-_Before_This_UC=5][UC_Range_Values=1-5]|7 [Name=Battery][Values=80 WHr 9-cell Lithium Ion Primary Battery,4 cell (32 Whr) Smart Lithium Ion battery,Up to 9-cell Lithium Ion Primary Battery (80 WHr),4-Cell LiIon (29 Whr),Others,][Units=String][UC_Order_In_String=7] [UC_Length_In_Digits=1][Num_Of_D igits_Before_This_UC=6][UC_Range_Values=1-5]|

In one embodiment of the solution, you will have the Vendor (e.g., Dell) activating an Offer DNA Robot, and the Consumer activating a Request DNA Robot, such as the Offer DNA Robot AND the associated Pseudo Natural Language Text below:

OneMany Product DNA: 0723750010.1.211.1.1111111
OneMany Product Pseudo NLT (Natural Language Text):
Offer a Product or a Service-Business to Consumer-Dell-Laptops-XPS M1710 Mobilize and Conquer-Processor Up to Intel Core™ Duo Processor T2500 (2 MB Cache/2 GHz/667 MHz FSB)-Memory Up to 2 GB DDR2 SDRAM at 667 MHz 2 DIMM-Display 17 inches Wide-Aspect UltraSharp TFT Active Matrix WUXGA (1920×1200) display with TrueLife-Hard drive Up to 100 GB 7200 rpm SATA Hard Drive-Optical DVD Burner Upgrade Included-Graphics 256 MB NVIDIA GeForce Go 7900 Graphics Card-Battery 80 WHr 9-cell Lithium Ion Primary Battery Please note the relationship between the keywords in blue in the Pseudo NLT above, as they are the Name of the Attributes Describing the Product in the Attributed Data Block above:

NOTE: Metadata is a powerful component of Artificial Intelligence. Metadata is a natural component of OneMany solutions. The name of the Attributes in the Pseudo NLT above (e.g., Processor, Memory . . . "), along with the sections of text describing each, are powerful descriptors that will have determinant impact on the relation Precision-Recall when applied to searching. OneMany may provide the only solution where the rate of Precision will remain as high with variable Recall, where the degree of Recall is determined by the User doing the searching.

```
Offer    Attributes: All settings in blue are Attributes describing
                     Processor, Memory, etc.
  ↑        ↑
0723750010.1.21  .1.1111111.010.101  →    The last six settings
                                           representing A.I. Behavior
  ↓        ↓       ↓
Dell ID  B2C Dell XPSM1710 Mobilize and Conquer
```

Note the IP-like projection of a Product or a Service through a OneMany DNA such as 0723750010.1.21.1.1111111.010.101 In the case of an "Offer", the user (Vendor Dell in this example) will be able to automatically form a web page (a OneMany Web Robot) to further present through media (images, videos) the Product it is Offering.

More specifically, in one embodiment, upon completing the Defining and Describing steps for a Product that is being Offered, the Vendor (e.g., Dell) will be enabled to upload media files related to the Product it is Offering. The name of the web page in this example will be 0723750010.1.211.1.1111111.asp Example of DNA Web Robot from current functionality (see also, FIG. 25):
http://dev/dev/bds/demo/RobotsWeb/
0723750010.1.211.1.11111111.asp?sCummulate-
diUC=0723 750010.1.211.1.1111111&sUser_ID=0723750010

TABLE 8

| Vendor name is: | Dell |
|---|---|
| Vendor email address is: | Dell@OneMany.com |
| Vendor mobile phone number is: | 0723750010 |
| This Robot was created on Jun. 21, 2007: | 3:42:22 AM |

TABLE 9

Robot Scope:

Offer a Product - Business to Consumer - Dell - Laptops - XPS M1710 Mobilize and Conquer - Processor Up to Intel CoreTM Duo Processor T2500 (2 MB Cache/2 GHz/667 MHz FSB) - Memory Up to 2 GB DDR2 SDRAM at 667 MHz 2 DIMM - Display 17 inches Wide-Aspect UltraSharp TFT Active Matrix WUXGA (1920 × 1200) display with TrueLife - Hard drive Up to 100 GB 7200 rpm SATA Hard Drive - Optical DVD Burner Upgrade Included - Graphics 256 MB NVIDIA GeForce Go 7900 Graphics Card - Battery 80 WHr 9-cell Lithium Ion Primary Battery NOTE: It is very important to understand the added dimension of a Product Web Robot. Below is a high level outline of some of the functionalities and added benefits A Web Robot will enable the Vendor to associate a visual power summary to its Offer projection for a Product/Service.

A Web Robot will enable the Vendor to project a web-like presence for its Product along with most powerful and relevant keywords Defining and Describing the Product.

A OneMany Web Robot will make the Product SEARCHABLE! There will be the cases when potential clients will not launch Requests for a Product. However, they may engage in Searches. OneMany Searching will enable powerful, no non-sense results.

A OneMany Web Robot can enable the User to instantiate a DNA Request Robot just by clicking on a link or on a button!

OneMany Web Robots will project ONLY Active Offers/Requests! This will make OneMany Web Robots the most Dynamic, living "entities" on the web.

A OneMany Web Robot can have Intelligent Behavior associated with it—this a function of User DNA creation.

A founding, block of Artificial Intelligence as it relates to the Internet, is the principle of "Findability". OneMany Offer/Request Web Robots satisfy the following components of Findability:

The quality of being locatable or navigable;
The degree of ease for a Product/Service can be discovered/located,
The degree to which the environment supports navigation;
The degree to which the environment supports retrieval.

NOTE: OneMany Web Robots is just one of the solutions-implementation where the Intelligent, Semantic Web characteristics apply with a high degree of value.

OneMany will give you the possibility to project a product or a service to a multi-functionality common denominator form (a OneMany DNA such as 0723750010.1.211.1.1111111), where it can interact with other products/services. In the simplest form, at a minimum you can have matching capabilities. In more advanced embodiments, there can be a range of functionalities, utilizing advanced Business Rules, wild cards, 3-D time, intelligent behavior, user-vendor interaction at multiple stages.

Considering our current example projected by Slide 43A, we will assume the following rules of engagement:

With respect to the OneMany DNA, at this point there will be "Matching" functionality;
With respect to Vendor "Offer"—creation for a Product DNA Robot—The moment a consumer projects a "Request" for a Product using the Vendor-Data, the moment the Consumer finalizes Defining/Describing, and is able to instantiate a Request DNA Robot for "this" Product, a compatible "Offer" DNA Robot will be instantiated by the OneMany IBD for the Vendor (under the Vendor-Rule that if the Consumer is able to create a Request for "this" Product, the Product is available, and there should be an Offer for "this" Request).

Considering our current example projected by FIG. 24, and the engagement Rules outlined above, the Consumer projects a Request for a Product represented by the following One-Many Request DNA:
9999999999.2.211.1.1111111

Consequently, the OneMany Intelligent Business Domain Engine will instantiate a Vendor Offer for the Product, represented by the following Offer DNA:
0723750010.1.211.1.1111111

Employing "Matching" functionality for this example, the Offer/Request DNA Robots will engage under OneMany IBD guidelines.

Following positive interaction between the Offer/Request DNA Robots, the Consumer and the Vendor will be notified. Below is a sample SMS notification to Vendor/Consumer after a Positive Interaction has occurred:
To: 9999999999
Message:
Dear Razz,
Active Offer(s) for your Request!
Your following transaction triggered the match:
Request: Dell, Laptops-XPS M1710 Mobilize and Conquer-[ . . . ]
Select Dell to review the details of the Offer Robot.
To: 0723750010
Message:
Greetings Dell,
Active Request(s) for your Offer within the scope of: Dell
Your following Offer was engaged in the match:
Dell, XPS M1710 Mobilize and Conquer
Select Razz Van Serbanescu to review the details of the Request Robot.
NOTE: Considering Intelligent Behavior settings that call be associated with Offer/Request DNA's, and thus with Offer/Request DNA Robots, there is a range of extended intelligent and Automated Behavior/Functionality that can be enabled to work for the Consumer, and for the Vendor under the OneMany Intelligent Business Domain, and/or Vendor-location resident.

Referring now to FIGS. 26-32, additional various architecture concepts as may be applied in the context of various embodiments of the present invention are shown.

Reference will now be made to a sample representation of Attributes Data String in low-level Text format (Auction/Bidding Scenario):
|ATT:[Num_Of_Attributes=4][Attributes_Total_Num_Of_Digits=10]|1[Name=Brand][Val ues=Blaupunkt,Pioneer,Sony,Kenwood,][Units=Int][UC_Order_In_String=1][UC_Length_In_Digits=1][Num_Of_Digits_Before_This_UC=0][UC_Range_Values=1-4]|1[Name=Watts][Values=40-150][Units=Watts][UC_Order_In_String=2][UC_Length_In_Digits=3][Num_Of_Digits_Be fore_This_UC=1][UC_Range_Values=40-150]|3[Name=Starting Bid][Values=Blaupunkt:169+50,Pioneer:95-115,Sony: 100-120, Kenwood: 105-125,][Units=Dollars][UC_Order_In_String=3][UC_Length_In_Digits=3][Num_Of_Digits_Before_This_UC=4][UC_Range_Values=Same_As_Values]|4[Name=Maximum Bid][Values=90-170][Units=Dollars][UC_Order In_String=4][UC_Length_In_Digits=3][Num_Of_Digits_Before_This_UC=7][UC-Range-Values=90-170]|

Breakdown of Sample Attributes Data String in Low-Level Text Format (Auction/Bidding Scenario):
Attributes
|ATT:[Num_Of_Attributes=4][Attributes_Total_Num_Of_Digits=10]|
1 [Name=Brand]
[Values=Blaupunkt,Pioneer,Sony,Kenwood,][Units=Int]
[UC_Order_In_String=1][UC_Length_In_Digits=1][Num_Of_Digits_Before_This_UC=0][UC_Range_Values=1-4]|
2[Name=Watts]
[Values=40-150][Units=Watts][UC_Order_In_String=2]
[UC_Length_In_Digits=3] [Num_Of_Digits_Before_This_UC=1][UC_Range_Values=40-150]|
3[Name=Starting Bid]
[Values=Blaupunkt:169+50,Pioneer:95-115,Sony: 100-120, Kenwood: 105-125,][Units=Dollars][UC_Order_In_String=3][UC_Length_In_Digits=3][Num_Of_Digits_Before_This_UC=4][UC_Range-Values=Same_As_Values]|
4[Name=Maximum Bid]
[Values=90-170][Units=Dollars][UC_Order_In_String=4]
[UC_Length_In_Digits=3] [Num_Of_Digits_Before_This_UC=7][UC_Rang_Values=90-170]|

In another embodiment, a computer implemented method is provided, comprising: storing, at a central server, an initialize business rule associated with a vendor and a DNS associated with the vendor (in one example, "DNS" may an acronym for the Connection String—DNS or DSN, DNS-Less or DSN-Less . . . or any other customized form of Data Access/Connection string decided in conjunction with the Vendor who registers with OM; in another example, it may ultimately be the Vendor who may have the last word on how it wants its data accessed . . . so in this example DNS can be set to "anything", from Vendor to Vendor, or internally for OM-Local data access . . . it may not necessarily be predicted in advance), wherein the DNS comprises an address of a data store of the vendor (in one example, it can be defined/set to a hostname/IP address, server name, database name, User ID, Password . . . to a file name . . . it can vary from case to case . . . but by and large, a "Connection String"); receiving, from a user, at the central server, a first user query (in one example, the User ID (e.g. phone number) which is/can be a Universal Code for example, is in most cases received by the Central Server the moment the user initiates a transaction/query; this User ID may be received in a background event, and may be the first integrated in the DNA, in the DNA Field "Identity", perhaps at/during the same cycle when the User contacts the central server with the first user-query), wherein the first user query requests a product or service of the vendor; dynamically forming in real-time at the central server a universal code sequence forming a DNA field (in one example, a Universal Code is associated with one selection; a DNA Field is formed of one or more Universal Codes (a Universal Code Sequence of one or more Universal Codes); a Partial DNA is one or more DNA Fields separated by a delimiter "."; a DNA is the "totality" (as it applies) of DNA Fields in their logical order, separated by an IP-like delimiter "."), wherein the universal code sequence is associated with the first query, at least a part of the sequence being hierarchal (in one example, the first User query will generate at most: Temporal settings with associated UC; User Identity; Transaction Scope; Transaction Type; User Selection—the first 4 except User Selection may be in the background/invisible to the User; they will have Universal Codes in distinct DNA Fields (e.g., Temporal Past Field, Present, Future; Identity DNA Field, Transaction Scope Field, Categories Field)—therefore, these Universal Codes may not be in sequence, they may be in individual DNA Fields ... in the same cycle, the User will/may make an initial selection/query—IF and ONLY IF the other settings were part of a automated process in the background—in this case, the user will be able to make a first-user-selection in the same user-central server cycle where the other 4 background settings have taken place; in this case only will the user selection generate a 5th UC which will also be inserted in the Categories DNA Field—thus forming a Hierarchical Universal Code Sequence with the first setting in the Categories Field, the Transaction Type); wherein the universal codes comprise at least a field projecting a user identity (in one example, one Universal Code will be the setting of the DNA Identity Field, one UC will be the setting of the DNA Transaction Scope Field, and one Universal Code will be the setting of the DNA Categories Field), a-field projecting a transaction scope and a field projecting a product definition; sending (in one example, in parallel to forming the DNA dynamically, the Central Server is also forming the Pseudo NLT (Natural Language Text) associated with the DNA ... in practice, each user-selection may have an associated Universal Code making up the DNA, and the selection-text itself will become part of the Pseudo NLT, composing the Pseudo NLT) the initialize business rule from the central server to the DNS, wherein the initialize business rule causes the vendor to execute the initialize business rule; receiving, from the vendor, at the central server, a first vendor response, wherein the first vendor response is based at least in part upon execution by the vendor of the initialize business rule and the first vendor response includes at least one next business rule (in one example, the first Vendor Response, and any other subsequent Vendor responses MAY also include a new DNS definition, as DNS was described at the beginning of this section); receiving, from the user, at the central server, a second user query (in another example, following the first Vendor response above, there has to be a processing and presentation of at least some of the vendor-response-data to the User by the Central Server, before the Central Server will receive from the user a Second Vendor Response), wherein the second user query is a selection from a choice based upon the first vendor response (in another example, in addition to the user-selection, there may be the User ID, Universal Code associated with the selection; e.g., there are ways where it could be programmed such that the Universal Codes associated with selection would be maintained in-state on Central Server side ... in other words, there are ways to get around one procedure or another which would make more or less sense and which are intended to be covered herein (e.g., the User ID, Universal Code); dynamically adding to the universal code sequence (in another example, one Universal Code Sequence can be contained by one DNA Field, while another UC Sequence can be contained by another; Universal Codes may compose DNA Fields, while DNA Fields may compose a DNA; in this regard, another example may comprise "dynamnically adding universal codes in real time) in real-time at the central server to form a request DNA (in another example, there can Request, Offer, Stimulation DNA ... and maybe other(s)); wherein the addition comprises a universal code associated with the selection; sending at least one of the at least one next business rules from the central server to the DNS, wherein the next business rule that is sent is associated with the selection and wherein the next business rule that is sent causes the vendor to execute the next business rule that is sent; receiving from the vendor, at the central server, a second vendor response, wherein the second vendor response is based at least in part upon execution by the vendor of the next business rule that is sent (e.g., received by the Vendor); dynamically forming in real-time, at the central server, an offer DNA, wherein the offer DNA is based at least in part upon the request DNA and the second vendor response (in one example, two Vendor-responses are over the minimum required to form a Vendor-Offer, following user interaction; in another example, a one Vendor-response can suffice. Consider the following use-case involving a User, Central Server, and Dell: User initiates the first query to Central Server. In response, Central Server enables User to select "Dell" without having to query Dell, as Dell is registered with Central Server, therefore Central Server is able to allow someone to select Dell without the Central Server having to query Dell, After the User selects Dell will the Central Server query Dell using the registered DNS and NDL. If we are looking to project a minimum DNA Offer by the Vendor, then after the Central Server queries the Vendor the first time, and after the vendor returns data (e.g., Desktops, Laptops) to Central Server, and Central Server presenting this data (Desktops. Laptops) to the User, and the User selecting "Laptops" sending selection and UC back to Central Server—at this point we have accomplished the minimum required in creating an Offer DNA involving the Vendor, and there is no need to query the Vendor a second time, considering that a very vague request for Dell Laptops is all that the user wants to request. This can be accomplished in even less steps if considering the following most simplistic/exaggerated embodiment of the solution: 1st, we'll imagine that Central Server is only enabling access to vendor Dell. Therefore any user accessing Central Server is assumed to be interested in Dell only. Therefore, when the User 1st queries the Central Server, Central Server knows the user is requesting Dell. The proper UC's are added to DNA, and then Central Server queries Dell, using registered DNS and NDL. Dell returns first set of options and next business rule to Central Server, and Central Server returns first set of options to User. User select "Laptops" for example, returns selection User ID and UC to Central Server, Central Server completes the DNA Field and the most simplistic Offer/Request DNA's are formed); and wherein the offer DNA comprises universal codes including at least a field projecting a vendor identity, a field projecting a transaction scope and a field projecting a product definition; determining, at the central server, that the offer DNA matches (in another example, "matching" may not necessarily be in terms of what the word implies ... rather the matching rules may be defined internally at Central Server ... such that theoretically "7" could match "*") the request DNA as to at least the field projecting a product definition; and sending to at least one of the user and to the vendor, from the central server, a notification that the offer DNA matches the request DNA.

In one example, the determining may comprise determining that the offer DNA exactly matches the request DNA as to at least the field (in one example, a DNA Field can be made up of one or more UC settings; The DNA Field "Categories" is where a Product is "Defined"; a Product is defined by one or more Categories (in one example, never just one); in this case, all the Categories in the DNA Field Categories are being referred to) projecting a product definition.

In another example, the determining may comprise determining that the offer DNA exactly matches the request DNA as to at least the field projecting a product definition and taking into account at least one wildcard field (in another example, there are no Wildcard Fields; there are Wildcards and Wildcard Settings; Intelligent Behavior and Intelligent Behavior settings) in at least one of the offer DNA and the request DNA.

In another example, the business rule may comprise at least one store procedure.

In another example, the DNS may further comprise at least one credential necessary to access the data store.

In another example, the data store may comprise at least one database (in another example, there is also the possibility that data can be formatted in text files, and accessed from text files; in another example, there is also the possibility that a Consumer can Offer products and services (e.g., and turn his cell phone memory card into a server-of-data); in another example, the database/data system used by a vendor or other type of participator in OneMany is not restricted to any one predetermined notion—it is up to them how they want to centralize their data . . . as long as central server can communicate, access, send, receive . . . it may be up to the vendor to architect their data structure format).

In another example, the method may further comprise sending to each of the user and to the vendor, from the central server, a notification that the offer DNA matches the request DNA.

In another example, the method may be carried out in the order recited.

Finally, the present invention may, of course, be implemented using any appropriate computer hardware and/or computer software. In this regard, those of ordinary skill in the art are well versed in the type of computer hardware that may be used (e.g., mainframe(s), mini-computer(s), server(s), personal computer(s), mobile computing devices (e.g., telephones, PDA's) one or more networks (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, any steps described herein may be carried out in any desired order (and any steps may be added and/or deleted).

What is claimed is:

1. A computer implemented method, comprising:
storing, at a central server, an initialize business rule associated with a vendor and a DNS associated with the vendor, wherein the DNS comprises an address of a data store of the vendor;
receiving, from a user, at the central server, a first user query, wherein the first user query requests a product or service of the vendor;
dynamically forming in real-time at the central server a universal code sequence forming a DNA field, wherein the universal code sequence is associated with the first query, at least a part of the sequence being hierarchal;
wherein the universal codes comprise at least a field projecting a user identity, a-field projecting a transaction scope and a field projecting a product definition;
sending the initialize business rule from the central server to the DNS, wherein the initialize business rule causes the vendor to execute the initialize business rule;
receiving, from the vendor, at the central server, a first vendor response, wherein the first vendor response is based at least in part upon execution by the vendor of the initialize business rule and the first vendor response includes at least one next business rule;
receiving, from the user, at the central server, a second user query, wherein the second user query is a selection from a choice based upon the first vendor response;
dynamically adding to the universal code sequence in real-time at the central server to form a request DNA, wherein the addition comprises a universal code associated with the selection;
sending at least one of the at least one next business rules from the central server to the DNS, wherein the next business rule that is sent is associated with the selection and wherein the next business rule that is sent causes the vendor to execute the next business rule that is sent;
receiving from the vendor, at the central server, a second vendor response, wherein the second vendor response is based at least in part upon execution by the vendor of the next business rule that is sent;
dynamically forming in real-time, at the central server, an offer DNA, wherein the offer DNA is based at least in part upon the request DNA and the second vendor response; and
wherein the offer DNA comprises universal codes including at least a field projecting a vendor identity, a field projecting a transaction scope and a field projecting a product definition;
determining, at the central server, that the offer DNA matches the request DNA as to at least the field projecting a product definition; and
sending to at least one of the user and to the vendor, from the central server, a notification that the offer DNA matches the request DNA.

2. The method of claim 1, wherein the determining comprises determining that the offer DNA exactly matches the request DNA as to at least the field projecting a product definition.

3. The method of claim 1, wherein the determining comprises determining that the offer DNA exactly matches the request DNA as to at least the field projecting a product definition and taking into account at least one wildcard field in at least one of the offer DNA and the request DNA.

4. The method of claim 1, wherein the business rule comprises at least one store procedure.

5. The method of claim 1, wherein the DNS further comprises at least one credential necessary to access the data store.

6. The method of claim 1, wherein the data store comprise at least one database.

7. The method of claim 1, further comprising sending to each of the user and to the vendor, from the central server, a notification that the offer DNA matches the request DNA.

8. The method of claim 1, wherein the method is carried out in the order recited.

* * * * *